(12) United States Patent
Akamatsu et al.

(10) Patent No.: US 6,619,613 B1
(45) Date of Patent: Sep. 16, 2003

(54) GAS FLOW RATE CONTROLLER AND GAS APPLIANCE USING THE SAME

(75) Inventors: Yoshio Akamatsu, Nara (JP); Naoto Naganuma, Tenri (JP); Mitsumasa Matsumura, Kitakatsuragi-gun (JP); Yoshiteru Kagomoto, Kashihara (JP); Hiroyuki Senda, Ikoma (JP); Mitsuo Yokohata, Habikino (JP); Kazuyoshi Hatano, Kitakatsuragi-gun (JP); Tadashi Yanagisawa, Yamatokoriyama (JP); Kouichi Murakami, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/831,889
(22) PCT Filed: Nov. 22, 1999
(86) PCT No.: PCT/JP99/06510
§ 371 (c)(1),
(2), (4) Date: May 23, 2001
(87) PCT Pub. No.: WO00/31471
PCT Pub. Date: Jun. 2, 2000

(30) Foreign Application Priority Data

Dec. 14, 1998 (JP) .......................... 10/354279
Dec. 14, 1998 (JP) .......................... 10/354281
Nov. 24, 1998 (JP) .......................... 10/332433

(51) Int. Cl.$^7$ .......................... F16K 31/02
(52) U.S. Cl. .................... 251/129.04; 251/129.05; 137/625.13; 126/39 E
(58) Field of Search .................... 251/129.04, 129.05; 137/625.13; 126/39 E

(56) References Cited

U.S. PATENT DOCUMENTS

| | | | | | |
|---|---|---|---|---|---|
| 3,744,029 A | * | 7/1973 | Nyman | .................. | 137/624.18 |
| 3,822,039 A | * | 7/1974 | Mori et al. | ............ | 251/129.04 |
| 3,954,383 A | * | 5/1976 | Bryant | .................. | 251/129.04 |

(List continued on next page.)

FOREIGN PATENT DOCUMENTS

| | | |
|---|---|---|
| JP | 61146667 | 9/1986 |
| JP | 61286677 | 12/1986 |
| JP | 3-25210 | 2/1991 |

(List continued on next page.)

OTHER PUBLICATIONS

English Language Abstract of JP 7–35335.
English Language Abstract of JP 61–146667.
English Language Abstract of JP 61–286677.
English Language Abstract of JP 10–47682.

(List continued on next page.)

Primary Examiner—Gene Mancene
Assistant Examiner—John Bastianelli
(74) Attorney, Agent, or Firm—Greenblum & Bernstein, P.L.C.

(57) ABSTRACT

Gas flow control apparatus that includes a gas flow control unit having a gas flow adjusting capability and a gas closing capability of selectively opening and closing a gas. A stepping motor is used for driving the gas flow control unit. A drive control unit is provided for controlling the stepping motor. The gas flow control unit is capable of adjusting the gas flow in multiple stages by selectively opening and closing one of a plurality of gas flow adjusting holes and also capable of varying the gas flow in multiple stages by selectively opening and closing one of the plural gas flow adjusting holes according to a number of pulses of the stepping motor.

32 Claims, 42 Drawing Sheets

U.S. PATENT DOCUMENTS

| | | | | |
|---|---|---|---|---|
| 4,794,907 A | * | 1/1989 | Corliss et al. | 126/39 R |
| 4,796,651 A | * | 1/1989 | Ginn et al. | 137/487 |
| 5,085,574 A | * | 2/1992 | Wilson | 251/129.04 |
| 5,234,196 A | * | 8/1993 | Harris | 126/39 R |
| 5,238,398 A | * | 8/1993 | Harris | 126/39 R |
| 5,716,203 A | * | 2/1998 | Sirand | 431/62 |
| 5,938,425 A | * | 8/1999 | Damrath et al. | 126/39 E |
| 5,996,687 A | * | 12/1999 | Pringle et al. | 251/117 |

FOREIGN PATENT DOCUMENTS

| | | |
|---|---|---|
| JP | 5-71656 | 3/1993 |
| JP | 5-83993 | 4/1993 |
| JP | 7-35335 | 2/1995 |
| JP | 7-119194 | 5/1995 |
| JP | 10-47682 | 2/1998 |
| JP | 11235092 | 8/1999 |

OTHER PUBLICATIONS

English Language Abstract of JP 5–83993.
English Language Abstract of JP 5–71656.
English Language Abstract of JP 7–11914.
English Language Abstract of JP 11–235092.
English Language Abstract of JP 3–25210.

* cited by examiner

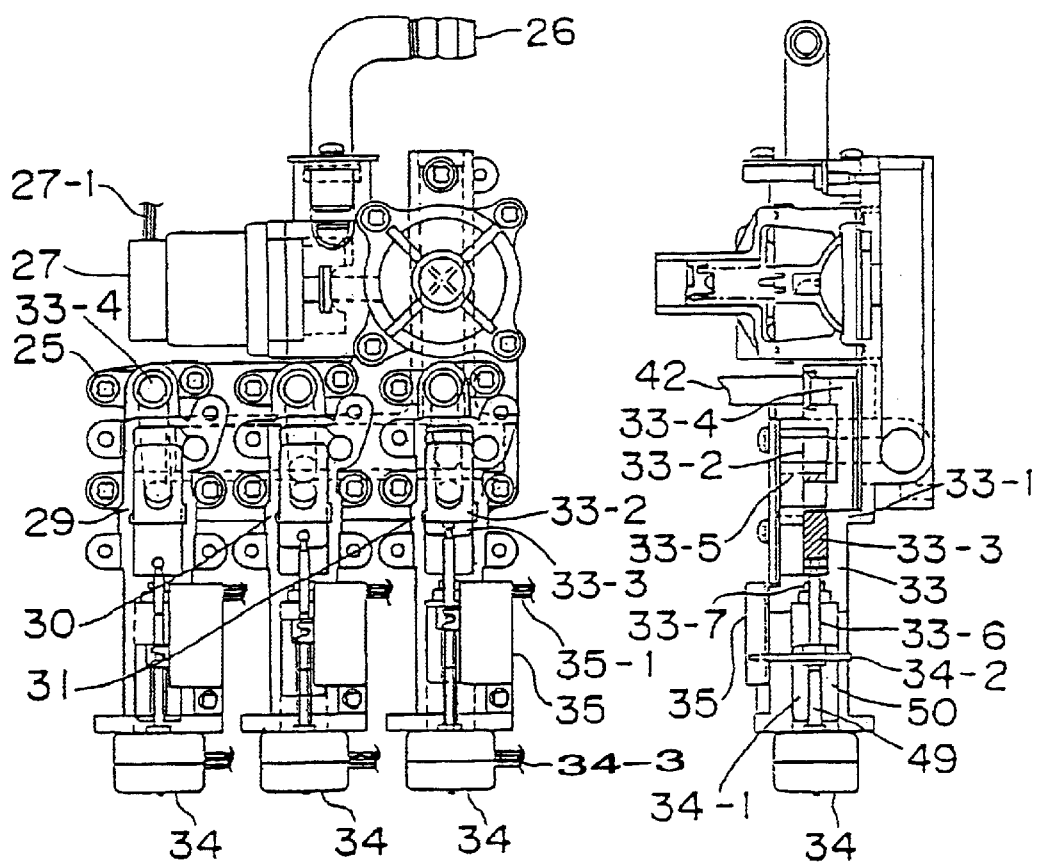

|  | A |  | C | D | E | F | G |
|---|---|---|---|---|---|---|---|
| Flame Position | Close | B-zone | Low | Md.Low | Medium | Md.Hi | High |
| Track signal | 100 | 000 | 001 | 011 | 011 | 010 | 011 |
| Track 1 | ON | OFF | OFF | OFF | OFF | OFF | OFF |
| Track 2 | OFF | OFF | OFF | ON | ON | ON | ON |
| Track 3 | OFF | OFF | ON | ON | ON | OFF | ON |
| Pulse Number | 0 |  | 45 | 65 | 84 | 102 | 143 |

|  | A |  | C | D | E | F | G |
|---|---|---|---|---|---|---|---|
| Flame Position | Close | B-zone | Low | Md.Low | Medium | Md.Hi | High |
| Track signal | 100 | 000 | 001 | 011 | 011 | 010 | 011 |
| Track 1 | ON | OFF | OFF | OFF | OFF | OFF | OFF |
| Track 2 | OFF | OFF | OFF | ON | ON | ON | ON |
| Track 3 | OFF | OFF | ON | ON | ON | OFF | ON |
| Pulse Number | 0 |  | 45+2 | 65+3 | 84+2 | 84+21 | 143 |

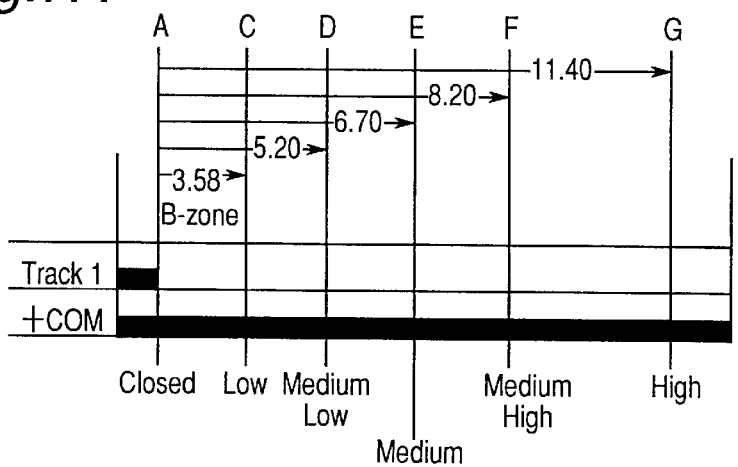

|  | A |  | C | D | E | F | G |
|---|---|---|---|---|---|---|---|
| Flame Position | Close | B-zone | Low | Md.Low | Medium | Md.Hi | High |
| Track signal | 10 | 00 | 00 | 00 | 00 | 00 | 01 |
| Track 1 | ON | OFF | OFF | OFF | OFF | OFF | OFF |
| Track 2 | OFF | OFF | OFF | OFF | OFF | OFF | ON |
| Pulse Number | 0 |  | 47 | 65 | 84 | 102 | 143 |

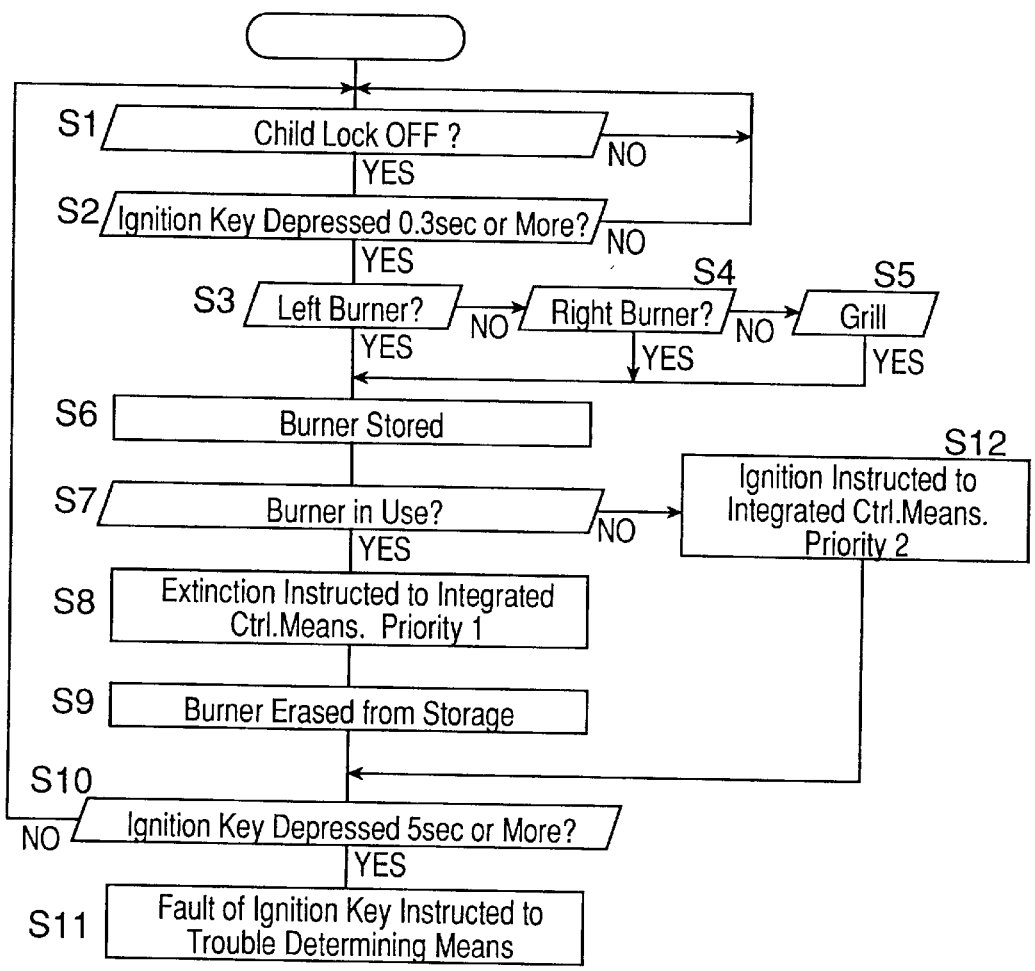

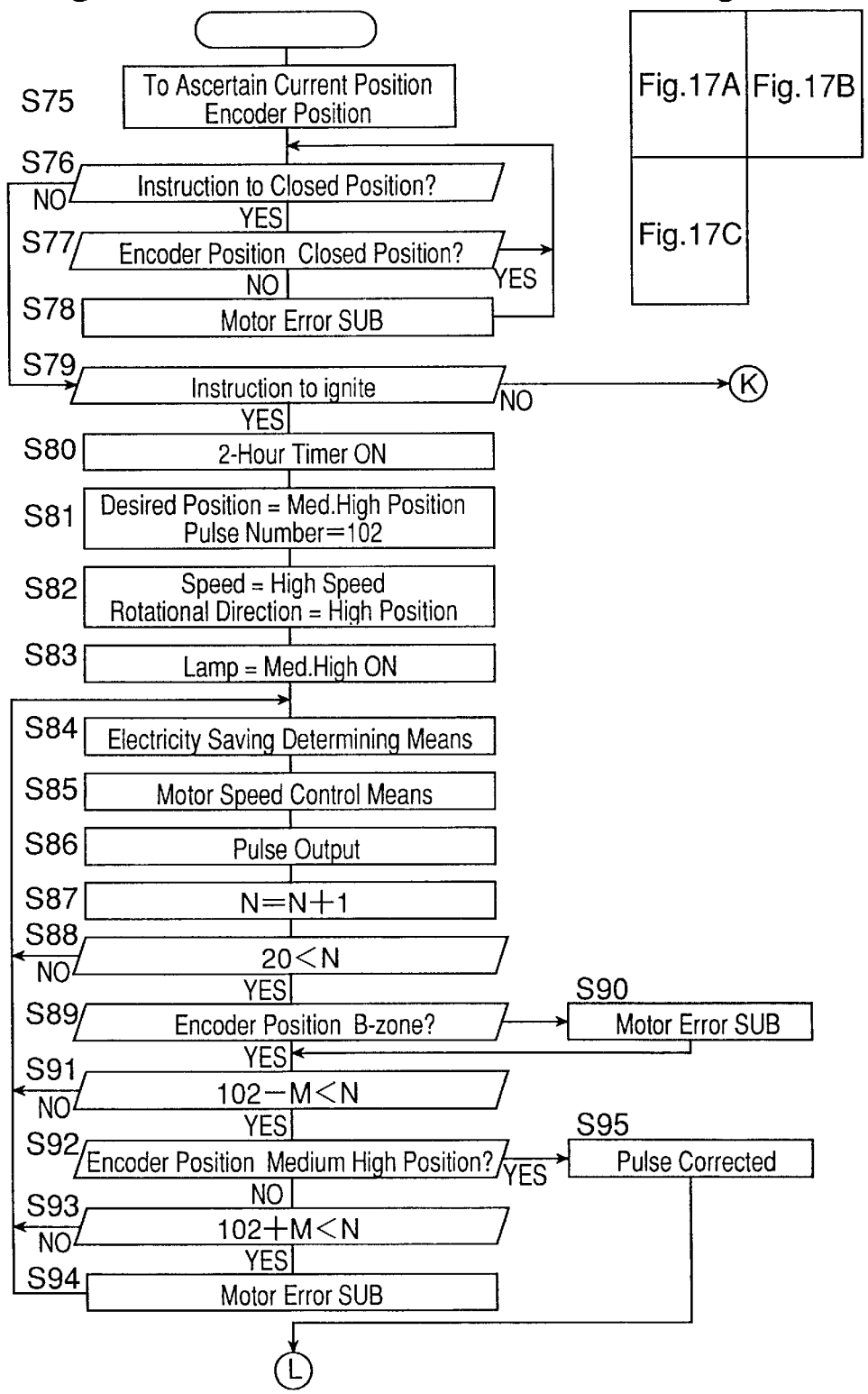

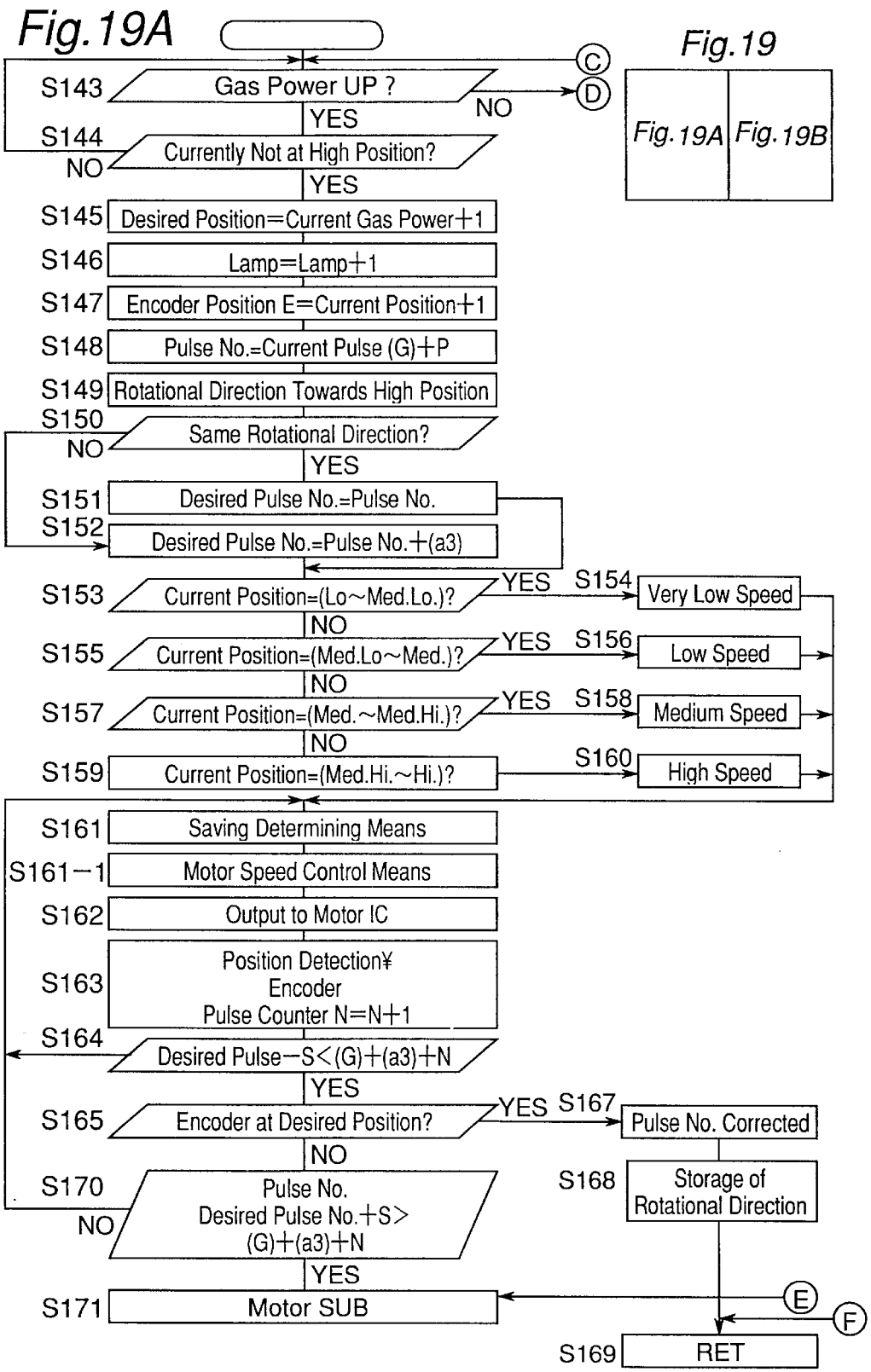

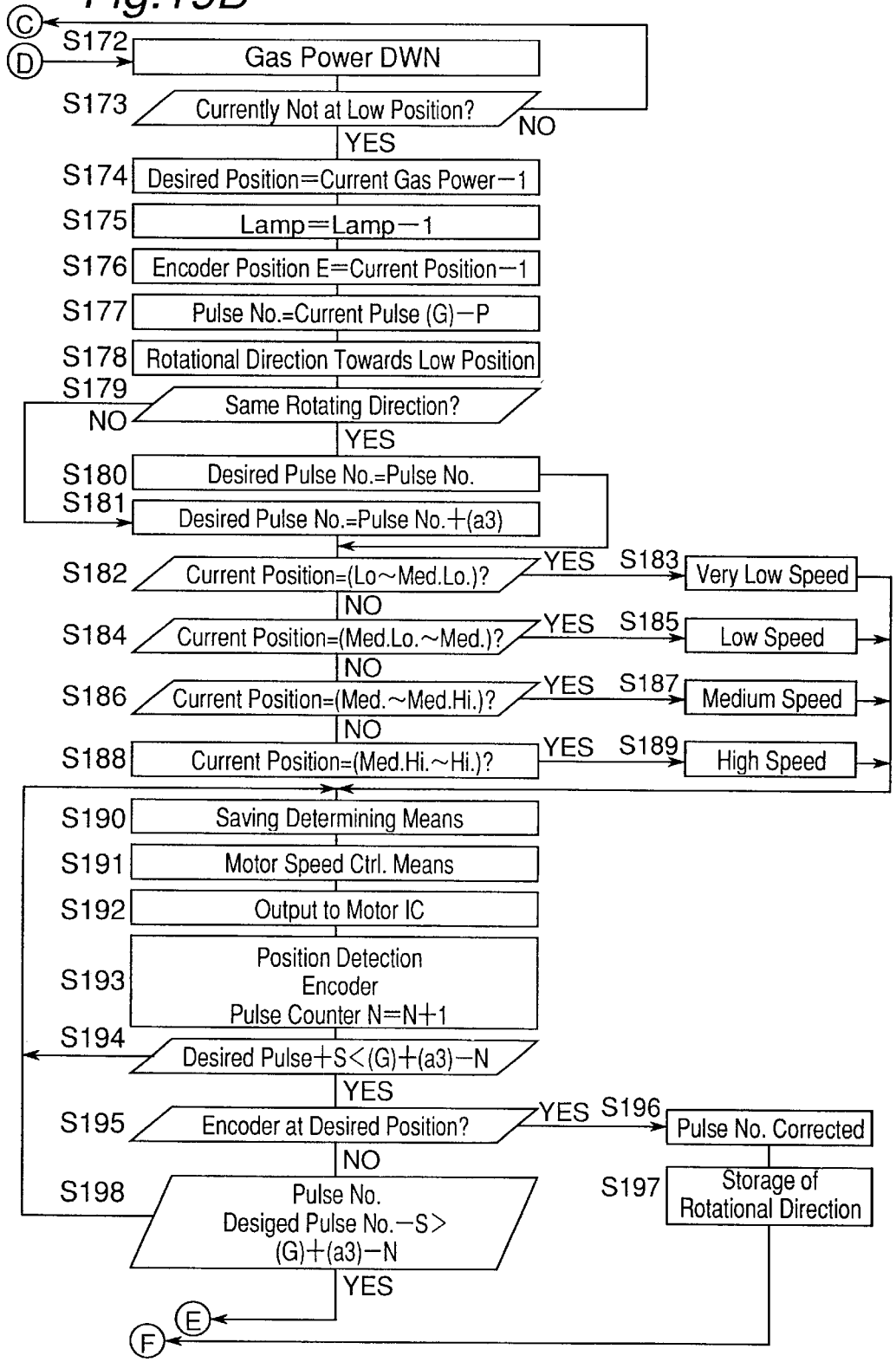

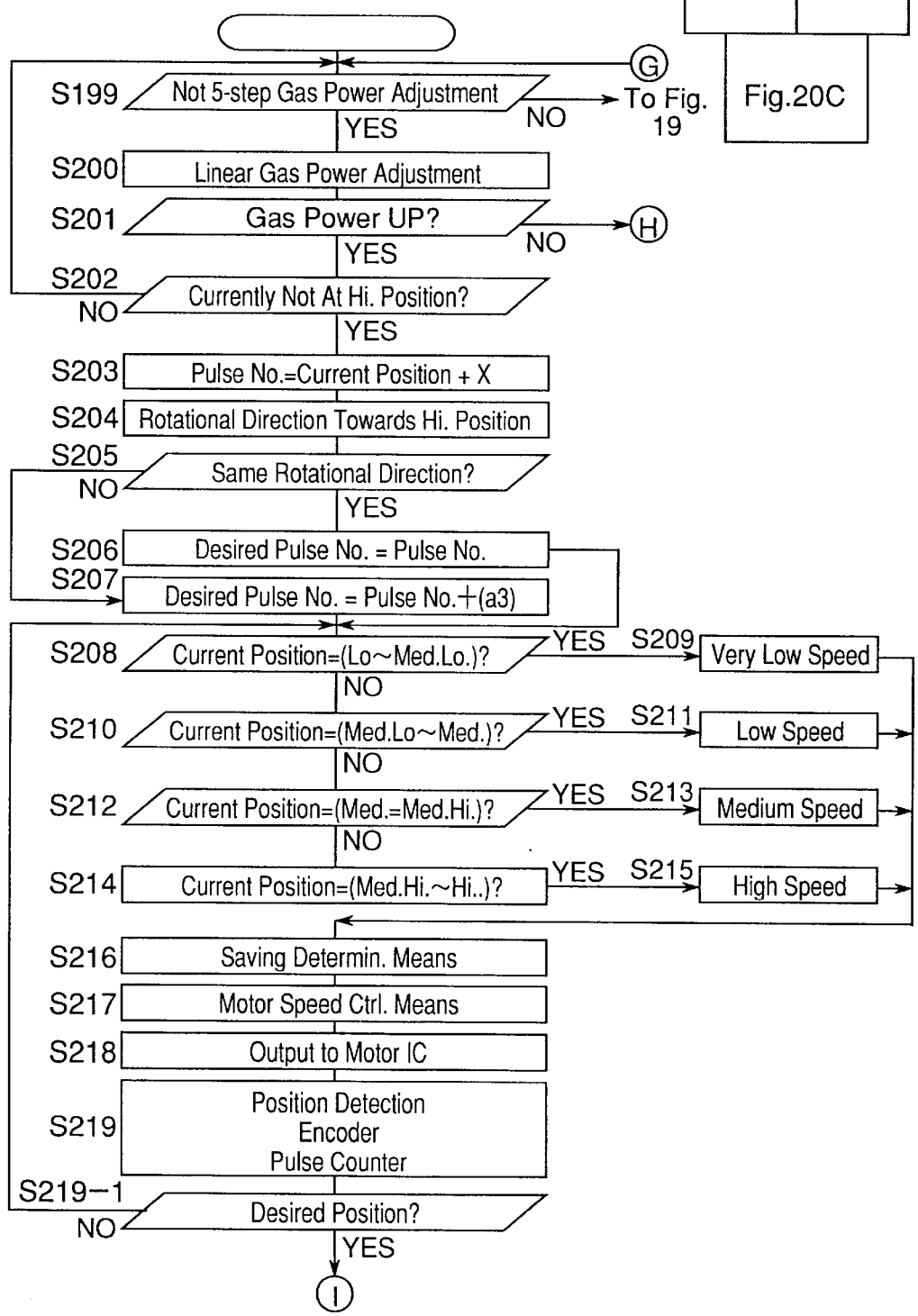

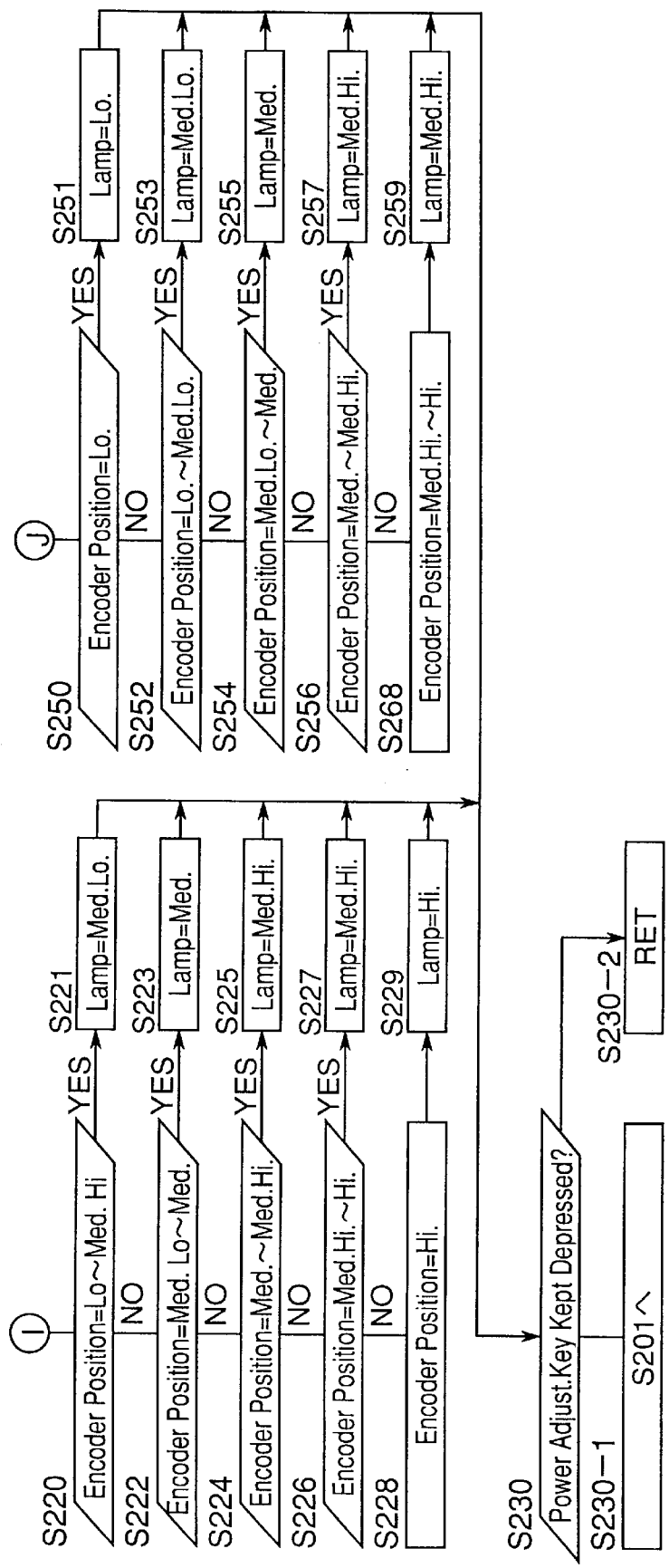

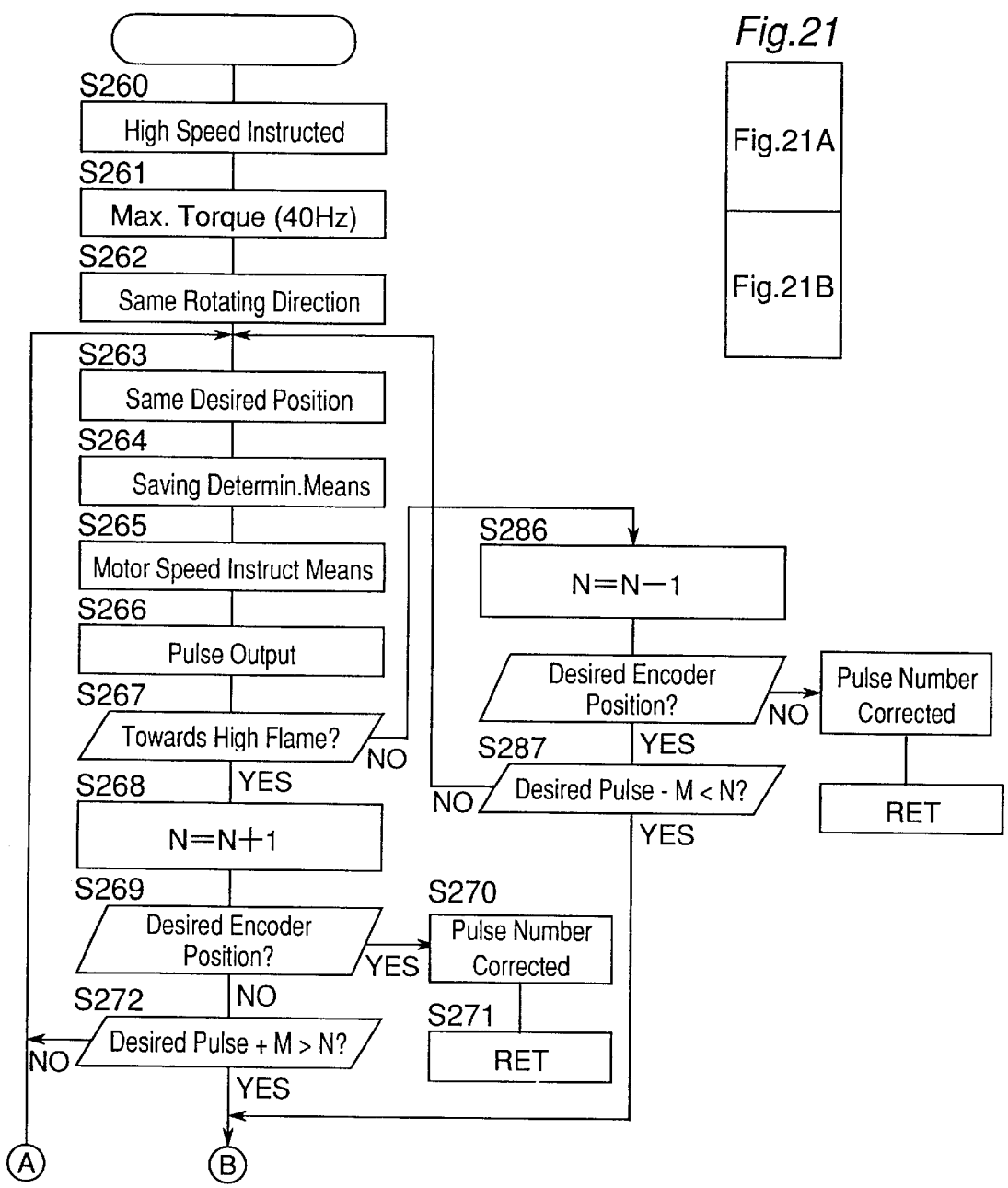

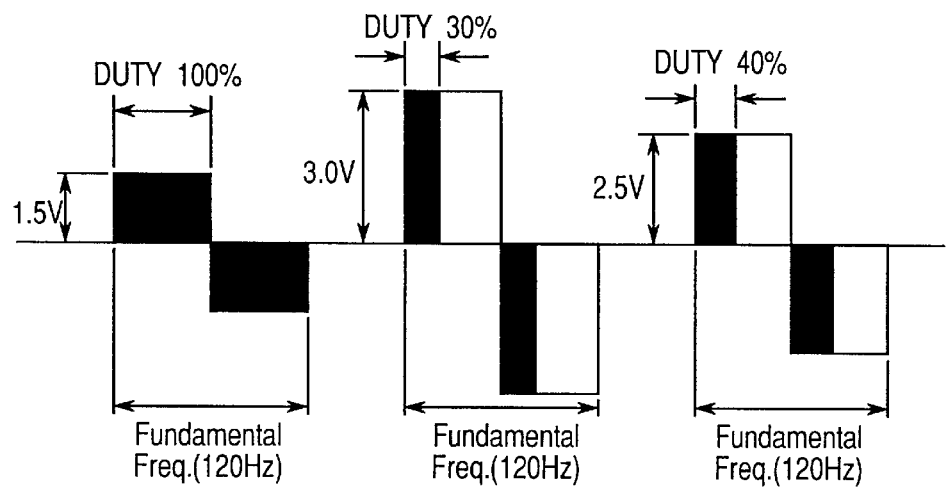

High Speed 100%

Low Speed 1/2%

Medium Speed 2/3%

Very Low Speed 1/3%

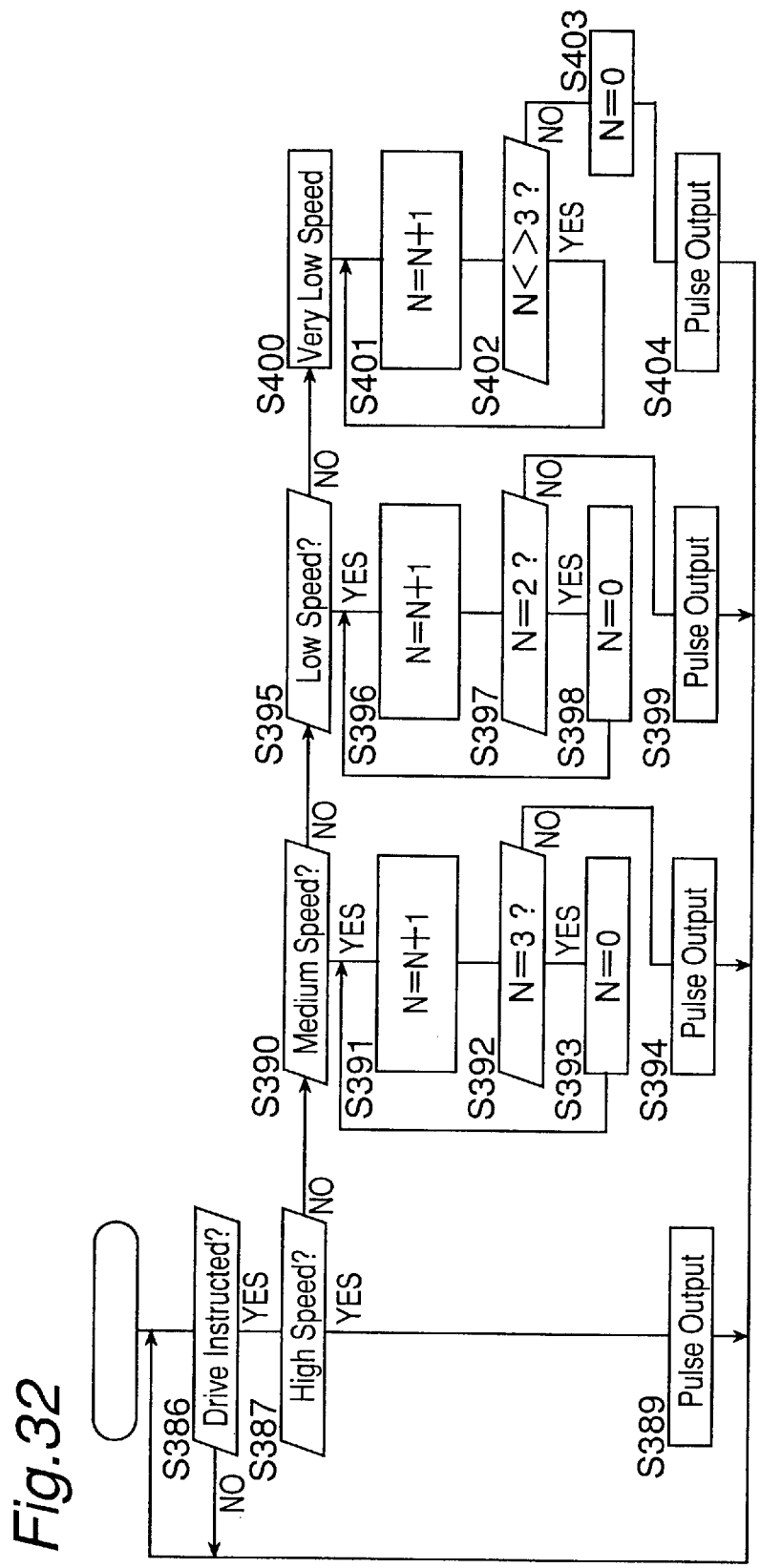

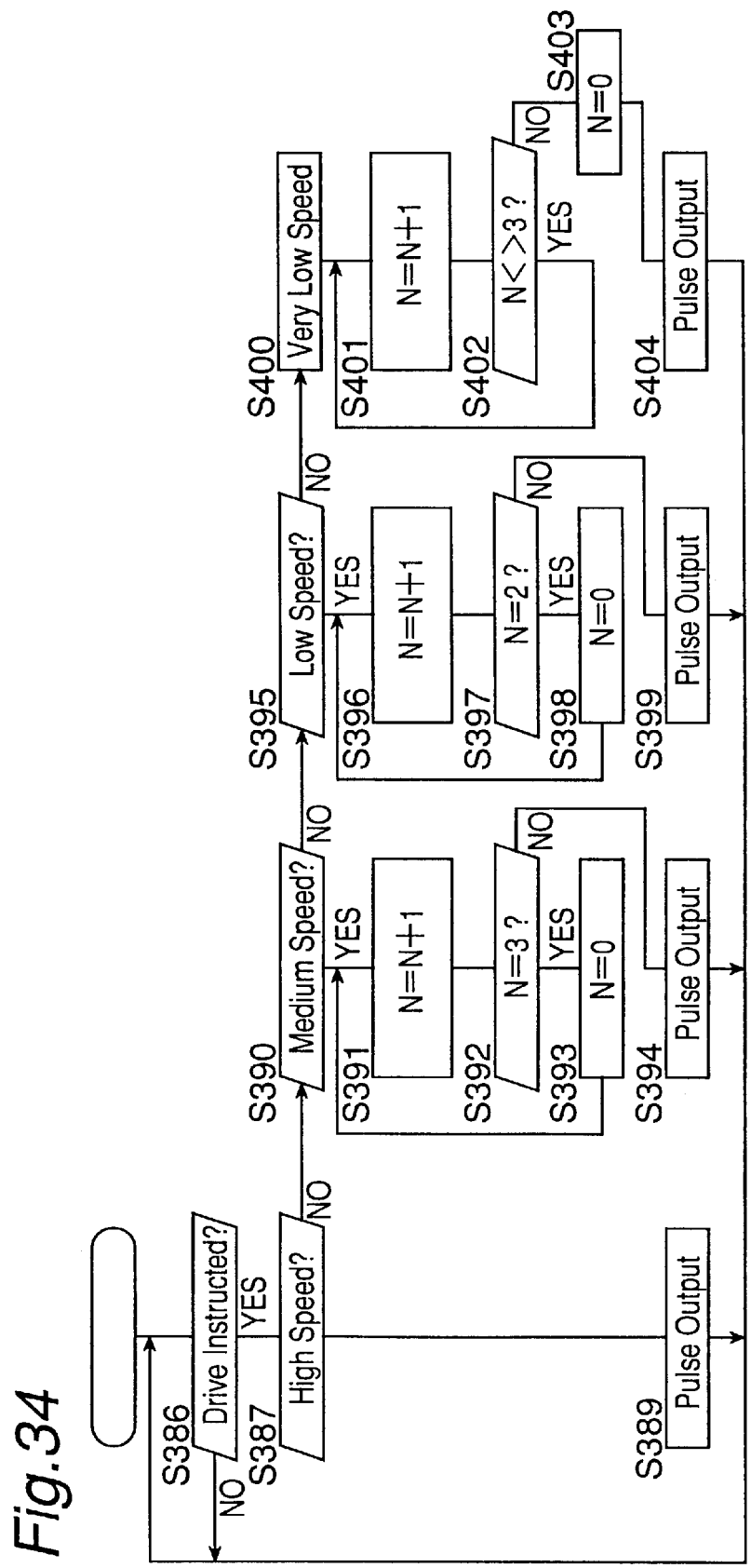

GAS FLOW RATE CONTROLLER AND GAS APPLIANCE USING THE SAME

FIELD OF THE INVENTION

The present invention relates to an electrically driven gas flow control apparatus in a gas appliance such as, for example, a gas cooking range.

BACKGROUND ART

The conventional gas flow control apparatus of a kind having this type of function employs a geared motor for controlling the flow of gas. However, the conventional gas flow control apparatus employing the geared motor has problems in that it is difficult to accomplish even a slight control, that is, to control the gas flow in a slight quantity. In addition, with the conventional gas flow control apparatus, the flow control characteristic is such that the gas power can be adjustable stepwise, the number of stepwise adjustable positions available being limited. Not only is the number of the available stepwise adjustable positions limited, but also the speed at which the gas power can be adjusted is not controllable, accompanied by such a problem that if the gas power is abruptly adjusted down to a low flame position, the gas flame tends to be extinguished.

The present invention has been devised to substantially eliminate the above discussed problems inherent in the prior art gas flow control apparatus and is intended to provide an improved gas flow control apparatus capable of providing a white-gloved fine adjustment of the gas power. Disclosure of the Invention To this end, the present invention provides a gas flow control apparatus comprising a gas flow control unit having a gas flow control function of adjusting the flow of gas and a stopping function of selectively initiating and interrupting the supply of gas, a stepping motor for driving the gas flow control unit and a drive control unit for controlling the stepping motor. The gas flow can be adjusted according to the number of pulses applied to the stepping motor, thereby to accomplish the white-gloved fine adjustment.

The gas flow control apparatus is preferably of a structure wherein a variable flow control in which the flow of gas is varied stepwise according to the number of pulses applied to the stepping motor, a flat flow control in which the flow of gas is not varied and a gas interrupting control are performed. This feature makes it possible to allow the gas flow to adjusted finely and in one of a plurality of stepwise gas flows according to the number of pulses applied to the stepping motor.

The gas flow control unit may comprises a slide shutter having an adjusting portion for the flow of gas; a cock body accommodating the slide shutter; a flow control plate having a gas flow adjusting portion; and a drive connecting unit for connecting the slide shutter to the stepping motor, whereby a relative position between the adjusting portion of the slide shutter and the gas flow adjusting portion of the flow control plate is varied by a pulsed drive of the stepping motor to thereby accomplish a gas flow adjustment and interruption. In such case, since a linear sliding motion of the slide shutter suffices, the driving torque required can be reduced as compared with a rotary shutter and, also, the gas interrupting capability when the slide shutter is moved to a closed position can be improved.

The gas flow control apparatus may further comprise a position detecting means for detecting a gas flow control position and wherein the drive control unit includes a position determining means for determining the gas flow control position based on at least a signal from the position detecting means. Even this feature makes it possible to accomplish the gas flow control and interruption.

The drive control unit may be so designed as to ascertain a position based on both the number of pulses applied to the stepping motor to drive the latter and a position determining signal from the position detecting means. According to this feature, since the position of the slide shutter according to the number of pulses applied to the stepping motor and that according to the output from the position detecting means are doubly managed, the accuracy of the gas flow control can be increased to assuredly interrupt the supply of gas to ensure the safety factor.

Preferably, the drive control unit is operable to add a predetermined number of pulses to be applied to the stepping motor to drive the latter to a position determining output of the position detecting means to define a predetermined gas power position, so that a highly accurate gas flow control and interruption can be performed in a simple manner.

In a different aspect of the present invention, there is provided a gas flow control apparatus which comprises a gas flow control unit having a gas flow adjusting capability and a gas closing capability of selectively opening and closing a gas; a stepping motor for driving the gas flow control unit; and a drive control unit for controlling the stepping motor. The drive control unit includes a burner drive determining unit for adjusting a speed of a drive unit from a flow control position of the flow control unit. In this embodiment, at least when a gas flow control valve of the flow control unit is positioned at a position adjacent the minimum flow position, the drive speed is reduced and, therefore, any possible abrupt extinction resulting from an abrupt adjustment to the low flame position can be avoided, allowing the gas flow control apparatus to gain reliability from the user. Also, a red-hot phenomenon which would otherwise result from an abrupt adjustment to the high flame potion can also be avoided and, therefor, no snoot will deposit on a pan, allowing the gas flow control apparatus to gain reliability from the user.

Preferably, the burner drive determining unit is operable to reduce the drive speed when the drive unit is moved to at least a position adjacent a minimum flow position of the flow control unit. In this case, since the gas flow adjusting unit is actuated at a high speed other than at the minimum flow position during the extinction, the extinction can take place quickly. In addition, since the length of time during which the drive unit is driven is reduced, the electricity saving can be achieved and the user can be ensured as to the reliability in operation.

In a further aspect of the present invention, there is provided a gas flow control apparatus which comprises a gas flow control unit having a gas flow adjusting capability and a gas closing capability of selectively opening and closing a gas; a stepping motor for driving the gas flow control unit; and a drive control unit for controlling the stepping motor. The drive control unit is operable to perform a variable speed control by determining a correlation with a flow control position of the flow control unit without an electric power being supplied for a predetermined cycle while the frequency of power supply pulses is fixed, to thereby vary a drive speed. According to this embodiment, the speed can be varied depending on the combustion power and also on the purpose of operation such as, for example, ignition, extinction and a gas power adjustment.

In one aspect of the present invention, there is also provided a gas flow control apparatus which comprises a gas flow control unit having a gas flow adjusting capability and a gas closing capability of selectively opening and closing a gas; a stepping motor for driving the gas flow control unit; and a drive control unit for controlling the stepping motor. The drive control unit includes a voltage determining means, an electricity saving means for performing a duty control according to a level of voltage by fixing the frequency of pulses to be applied to the drive unit according to a level of a power source voltage, a position determining means for determining a correlation with a flow control position of the flow control unit, and a motor speed control means for supplying no electric power for a predetermined cycle by fixing the frequency of the power supply pulses; whereby an electric power to be supplied is leveled by converting the level of the power source voltage into a level of a duty ratio. Accordingly, the level of the power source voltage can be converted into the level of the duty ratio to thereby level the electric power to be supplied.

The drive control unit may be of a design capable of selecting one of a plurality of combinations in which no electric power is supplied for each cycle for speed control so that the stepping motor can have its speed controllable as desired.

According to a still different aspect of the present invention, there is provided a gas flow control apparatus which comprises a gas flow control unit having a gas flow adjusting capability and a gas closing capability of selectively opening and closing a gas; a stepping motor for driving the gas flow control unit; and a drive control unit for controlling the stepping motor. The drive control unit may include a voltage determining means for a drive control battery power source and an electricity saving determination means for leveling an electric supply power. This is particularly advantageous in that even when variation takes place in the power source voltage, the electric supply power can be leveled to accomplish the energy saving feature.

The electricity saving determining means may be so designed as to vary a frequency of the pulses to be applied from the power source to the drive unit and is operable to level the electric supply power by converting a level of the power source into a level of the frequency. This feature makes it possible to accomplish the gas power adjustment with the constant torque of the stepping motor and, therefore, even at a low voltage, an abnormal operation will hardly occur. In other words, the lifetime of the battery constituting the power source can be extended.

Alternatively, the electricity saving determining means may be so designed as to perform a duty control according to a level of voltage by fixing the frequency of the pulses to be applied to the drive unit based on the power source voltage and is operable to level the electric supply power by converting the level of the power source voltage into a level of a duty ratio. This feature makes it possible to provide a gas appliance in which even when the voltage varies (the voltage of the battery decreases), the gas power can be adjusted at a constant speed.

A still further aspect of the present invention provides a gas flow control apparatus which comprises a gas flow control unit having a gas flow adjusting capability and a gas closing capability of selectively opening and closing a gas; a stepping motor for driving the gas flow control unit; and a drive control unit for controlling the stepping motor. The drive control unit is operable to measure a frequency of drive of the drive unit and to increase a torque of the drive unit when the measurement is performed for the first time. According to this structure, the gas flow control apparatus can be operated with the power source saved to extend the lifetime of the battery and with the stepping motor operated with high torque.

Furthermore, according to a still further aspect of the present invention, there is provided a gas flow control apparatus which comprises a gas flow control unit having a gas flow adjusting capability and a gas closing capability of selectively opening and closing a gas; a stepping motor for driving the gas flow control unit; a position detecting means for detecting a flow control position of the gas flow control unit and a gas interrupted condition; and a drive control unit for driving the stepping motor and for determining a position with reference to a signal from the position detecting means. The drive control unit may include a position determining means for controlling the gas flow control unit to a predetermined position by means of the number of pulses to be applied to the stepping motor to thereby correct a movement of a pulse drive at the predetermined position of the position detecting means. According to this construction, even though variations occur in component parts of the gas flow control unit and/or the stepping motor, the position can be corrected by a position detector and, therefore, the component parts may not be severely managed as to their precision and an accurate predetermined flow can be secured.

The drive control unit may also include a position determining means for increasing an accuracy of a gas flow adjustment by counting the number of pulses necessary for the position detecting means to return to the predetermined position by accomplishing a reverse rotation after a predetermined number of pulses has been supplied to the stepping motor, determining an error peculiar to the apparatus by determining a difference between the numbers of pulses during reciprocating motions, and by adding or subtracting the peculiar error of the apparatus to or from the number of pulses at a desired position in the event that a direction of rotation differs. In this embodiment, the error peculiar to the apparatus is determined in terms of the difference between the number of pulses during movement in one direction and that during movement in the opposite direction. When the direction of rotation differs, this error is added or subtracted to or from the number of pulses required to move towards the desired position to thereby increase the gas flow adjusting accuracy.

Preferably, the drive control unit may detect the error peculiar to the apparatus at the time of igniting operation, so that detection of the error need not be performed each time the igniting operation is performed. It is to be noted that the error may be stored in the drive control unit.

According to an alternative aspect of the present invention, there is provided a gas flow control apparatus which comprises a gas flow control unit having a gas flow adjusting capability and a gas closing capability of selectively opening and closing a gas; a stepping motor for driving the gas flow control unit; a position detecting means for detecting a flow control position of the gas flow control unit and a gas interrupted condition; and a drive control unit for driving the stepping motor and for determining a position based on an output from the position determining means. The drive control unit is operable to supply an electric power by increasing an electric supply power to increase a torque of the stepping motor in the event that the position determining means fails to reach the predetermined position even though a predetermined number of pulses is supplied to the stepping motor.

The drive control unit may be so designed as to supply the electric power by increasing the electric supply power to increase the torque of the stepping motor at a first time of abnormality in the event that the position determining means fails to reach the predetermined position even though the predetermined number of pulses is supplied to the stepping motor, but causing the position determining means to reach the predetermined position by effecting an operation reverse to a predetermined position direction and then reversing in a direction back to the predetermined position in the event that the position determining means fails to reach the predetermined position even though the increased electric power is supplied.

Preferably, the drive control unit is of a structure effective to accomplish a supply power control under a duty control by fixing a frequency of applied pulses and to increase the electric supply power by increasing a duty ratio in order to increase a torque of the stepping motor. Also, the drive control unit may be of a structure operable to perform the supply power control under a level control of the frequency by rendering the frequency of the applied pulses to be variable and to increase the electric supply power by lowering the frequency in order to increase the torque of the stepping motor.

The present invention also provides a gas appliance utilizing a gas flow control apparatus of the structure described hereinabove. This gas appliance comprises a control panel for issuing an instruction to the drive control unit of the flow control apparatus and including a gas control key and a gas power adjusting key and wherein the drive unit of the flow control unit has a plurality of stepwise variable flow characteristics each having a linearly variable flow portion, in which the gas flow varies according to pulses for driving the drive unit, and a flat portion in which the gas flow does not vary, and wherein the drive control unit is of a structure wherein depending on contents of a signal input from the gas power adjusting key a decision is made to determine whether a stepwise gas power change or a linear gas power change is desired and a selection instruction of one of the linear gas power change and the stepwise gas power change is issued.

In this gas appliance, the drive control unit may include a motor speed control means for changing a drive speed of the drive unit and wherein depending on the contents of the signal input from the gas power adjusting key a decision is made to determine whether the stepwise gas power change or the linear gas power change is desired and the selection instruction of one of the linear gas power change and the stepwise gas power change is issued and, when the linear gas power change is selected, a gas power adjusting speed is slowed as compared with the stepwise gas power change.

When a period during which the gas power adjusting key is depressed is shorter than a predetermined value, a gas power may be switched stepwise, but when the period during which the gas power adjusting key is depressed is longer than the predetermined value, the gas power is changed linearly. Moreover, the drive control unit may include a key input trouble determining means and wherein a length of time during which a trouble of the gas power adjusting key is determined is set to be longer than a length of time during which a gas power switching selection is carried out.

Preferably, the drive control unit includes a position detecting means for detecting a position of a flow control unit and wherein when the gas power is changed linearly, a maximum gas power and a minimum gas power causes a display means to be switched on according to the position of the position detecting means, but a display position is changed in case of a medium gas power according to a number of pulses. Alternatively, the drive control unit may include a position detecting means for detecting a position of a flow control unit and wherein when the gas power is changed linearly, a maximum gas power and a minimum gas power causes a display means to be switched on according to the position of the position detecting means, but when the gas power is changed stepwise, a specified display is switched on and displays at respective above and low positions are switched on or blinked in case of a medium gas power according to a number of pulses.

The comprises a plurality of gas burners and wherein when some of the gas burners are activated, the drive control unit drives in succession stepping motors associated with such some of the gas burners without them being activated simultaneously. In such case, the drive control unit may be so designed as to drive the stepping motors by giving the highest priority to a gas extinguishing operation, the second highest priority to a gas igniting operation, the third priority to a manual gas power adjusting operation and the fourth priority to an automatic gas power adjusting operation.

DESCRIPTION OF THE DRAWINGS

FIG. 3A is a plan view of a gas control block shown in FIG. 2:

FIG. 3B is a sectional view of the gas control block shown in FIG. 3A;

FIG. 7A is a chart showing a relation between gas power adjustable positions and tracks in an encoder according to a further embodiment of the present invention;

FIG. 7B illustrates a drive table for a stepping motor which corresponds to the chart shown in FIG. 7A;

FIG. 11 is a schematic flowchart showing the igniting and extinguishing operation performed by the gas flow control apparatus;

FIG. 19 made up of FIGS. 19A and 19B is a schematic flowchart showing the operation of a power change determining means employed in the gas flow control apparatus;

FIGS. 27A, 27B and 27C are explanatory diagrams showing the sequence of the energy-saving torque control employed in the gas flow control apparatus;

FIG. 32 is a schematic flowchart showing the speed control employed in the gas flow control apparatus;

FIG. 34 is a schematic flowchart showing the speed control employed in the gas flow control apparatus.

BEST MODE FOR CARRYING OUT THE INVENTION

Hereinafter, preferred embodiment of the present invention will be described with reference to the accompanying drawings.

Figure 1A:
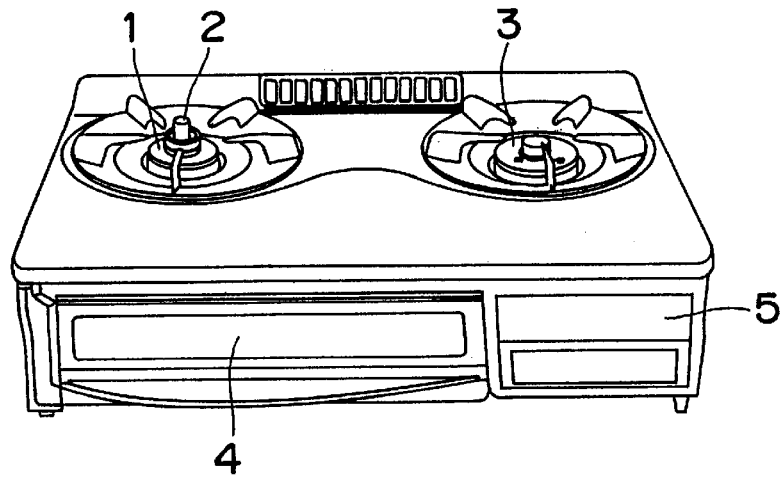
FIG. 1A is a perspective view of a gas cooker employing a gas flow apparatus according to an embodiment of the present invention.
Figure 1B:
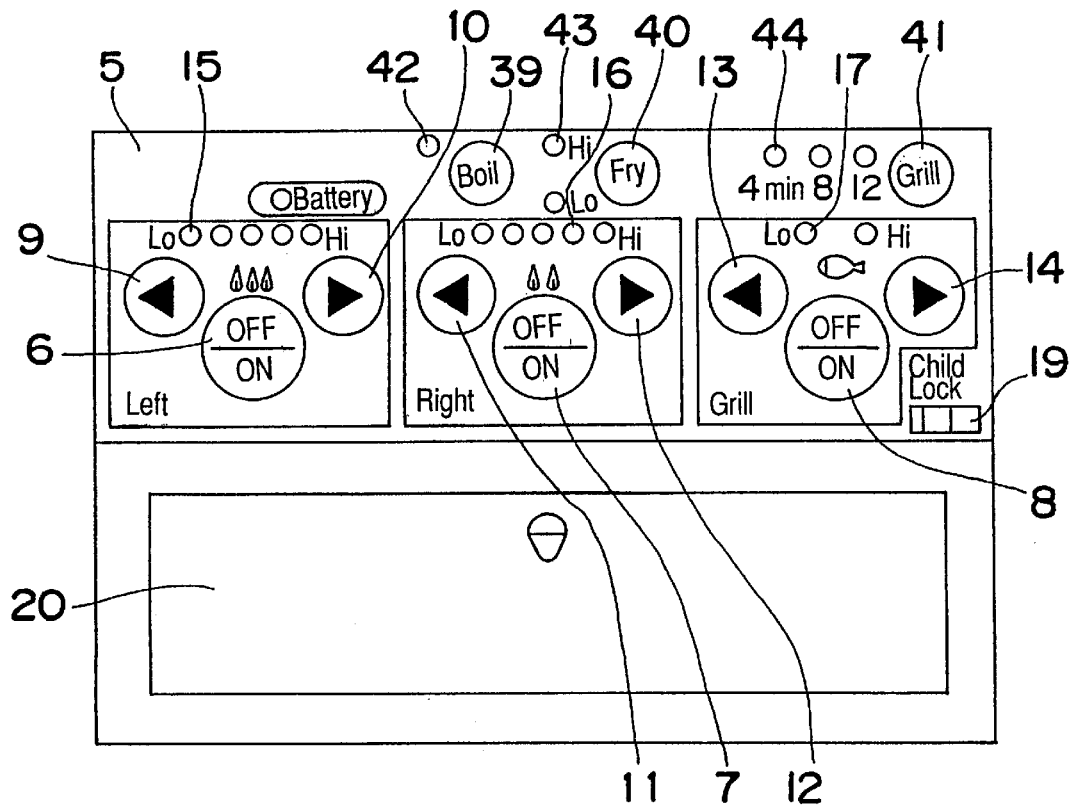
FIG. 1B is a top plan view of the gas cooker shown in FIG. 1A.

Referring to 1A, a gas cooker shown therein includes a left gas ring 1 equipped with a pan-bottom temperature sensor 2, a right gas ring 3, a grill 4 and a control panel 5. As shown in FIG. 1B, the control panel 5 includes a left burner control key 6 for selectively igniting and extinguishing the left gas ring 1; a right burner control key 7 for selectively igniting and extinguishing the right gas ring 3; a grill control key 8 for selectively igniting and extinguishing the grill 4; left burner flame adjusting keys 9 and 10; right burner flame adjusting keys 11 and 12; grill flame adjusting keys 13 and 14; an array of left burner power indicators (light emitting elements) 15; an array of right burner power indicators 16; an array of grill power indicators 17; left burner cooking mode setting keys (cooking mode setting means) 39 and 40; mode indicator lamps 42 and 43 for providing a visual indication of one of the cooking modes selected; a grill timer setting key 41; an indicator lamp 44 for providing a visual indication of a parameter set in the grill timer; a child lock switch 19 for inhibiting an entire firing operation; and a battery chamber 20 defined at a lower region of the control panel 5.

Figure 2:
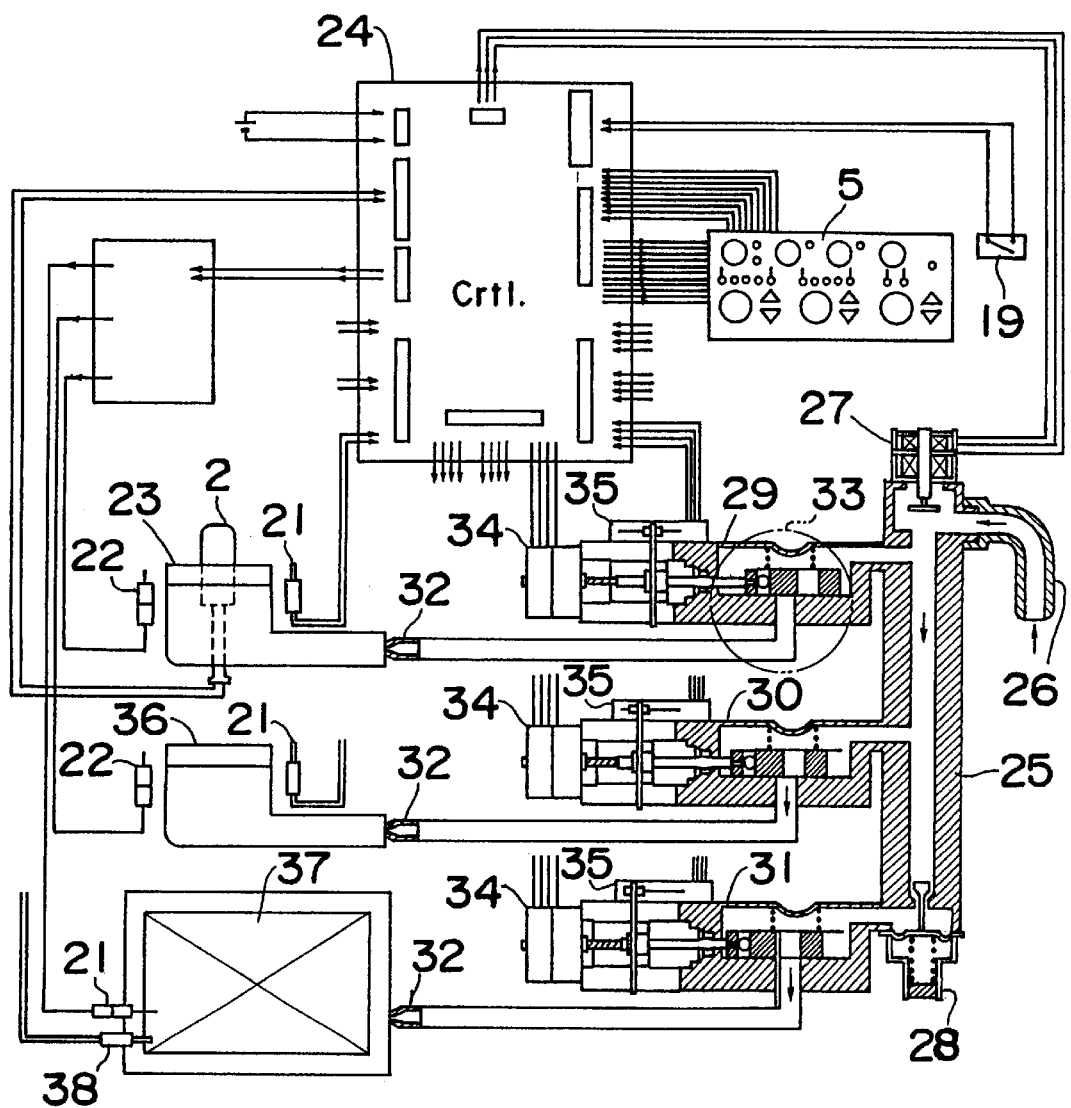
FIG. 2 is a diagram showing the entire structure of the gas flow control apparatus employed in the gas cooker shown in FIGS. 1A and 1B.

As shown in FIG. 2, the left gas ring 1 includes, in addition to the pan-bottom temperature sensor (pan-bottom temperature detecting means) 2, a thermocouple (combustion temperature detecting means) 21, and a left gas burner 23 equipped with a pilot plug 22 and to which gas is supplied from a gas control block 25 that is selectively opened and closed by a control circuit 24. The gas control block 25 is supplied with gas through an hose end 26 and supplies the gas to the left gas burner 23 through a left burner gas flow control unit 29 for selectively initiating and interrupting passage of gas therethrough and also for adjusting the flame power, by way of a main electromagnetic valve 27 common to all of the gas rings and then through a nozzle 32. Each of the gas flow control units 29, 30 and 31 of the gas flow block 25 generally comprises a flow control unit 33, a stepping motor 34 for driving the respective flow control unit 33 and an encoder 35 which serves as a position detecting means for detecting the position of the respective flow control unit 33.

With the above described construction, when the burner control key 6 is turned on after it has been affirmed that the child lock switch 19 is set in an OFF position, the control circuit is electrically powered to start up the control circuit 24 and, under the control of the control circuit 24, not only can the left burner gas flow control unit 29 be moved to an igniting flow position, but also the main electromagnetic valve 27 is opened to allow the pilot plug 22 to ignite the left gas burner 23.

The control circuit 24 is inputted with a pan-bottom temperature detected by the pan-bottom temperature sensor 2 and a combustion temperature detected by the thermocouple 21 so that based on these input data and settings provided from the control panel 5, the left burner gas flow control unit 29 can be driven and controlled to adjust the flow of gas supplied towards the left burner 23 to thereby accomplish an automatically controlled flame adjustment.

As shown in FIG. 2, the right ring 3 includes a right gas burner 36 having its combustion area provided with a thermocouple 21 and a pilot plug 22 and to which gas is supplied from a gas control block 25 that is selectively opened and closed by a control circuit 24. The gas control block 25 is supplied with gas through an hose end 26 and supplies the gas to the right gas burner 36 through a right burner gas flow control unit 30 for selectively initiating and interrupting passage of gas therethrough and also for adjusting the flame power, by way of a main electromagnetic valve 27 common to all of the gas rings and then through a nozzle 32.

With the above described construction, when the burner control key 7 is turned on after it has been affirmed that the child lock switch 19 is set in an OFF position, the control circuit 24 is electrically powered and, under the control of the control circuit 24, not only can the right burner gas flow control unit 30 be moved to an igniting flow position, but also the main electromagnetic valve 27 is opened to allow the pilot plug 22 to ignite the right gas burner 36.

The control circuit 24 is inputted with a temperature detected by the thermocouple 21 so that based on these input data and settings provided from the control pane 15, the right burner gas flow control unit 30 can be driven and controlled to adjust the flow of gas supplied towards the right burner 36 to thereby monitor a combustion taking place in the right gas burner 36 based on a heating temperature inputted.

As shown in FIG. 2, the grill 4 includes a grill burner 37 having its combustion area equipped with a thermocouple 21 and an ignition plug 38 and to which gas is supplied from the gas control block 25 that is selectively opened and closed by the control circuit 24. The gas control block 25 is supplied with gas through an hose 25 end 26 and supplies the gas to the grill burner 37 through a grill burner gas flow control unit 31 for selectively initiating and interrupting passage of gas therethrough and also for adjusting the flame power, by way of a main electromagnetic valve 27 and a governor 28 and then through a nozzle 32.

With the above described construction, when the grill control key 8 is turned on after it has been affirmed that the child lock switch 19 is set in an OFF position, the control circuit 24 is electrically powered and, under the control of the control circuit 24, not only can the grill burner gas flow control unit 31 be moved to an igniting flow position, but also the main electromagnetic valve 27 is opened to allow the pilot plug 38 to ignite the grill gas burner 37.

The control circuit 24 is inputted with a temperature detected by the thermocouple 21 so that based on these input data and settings provided from the control panel 5, the grill burner gas flow control unit 31 can be driven and controlled to adjust the flow of gas supplied towards the grill burner 37 to thereby monitor a combustion taking place in the grill gas burner 37 based on a heating temperature 10 inputted.

As can readily be understood from the structure described above, the status of combustion at each of combustion units including the left gas ring 1, the right gas ring 3 and the grill 4, respectively, can be controlled by the control circuit 24.

FIGS. 3A and 3B illustrates, in a block diagram, the gas control block 25 employed in the gas cooker of the present invention. Gas from the hose end 26 flows through the main electromagnetic valve 27 to the gas flow control units 29, 30 and 31 for the associated gas burners. Gas flowing into the gas flow control units for the individual gas burners then flows into the flow control unit 33 through a cock body 33-1 and arrives at a gas outlet 33-4 of the cock body 33-1 through a flow control plate 33-2 and then through a slide shutter 33-3, finally being supplied into a gas tube 42 leading to the nozzle.

The flow control plate 33-2 is urged against the cock body 33-1 together with the slide shutter 33-3 by means of a spring 33-5 to provide a gas sealing pressure. Also, the slide shutter 33-3 is coupled with one end of a drive connecting shaft 33-6 for slide drive, the other end of said drive connecting shaft 33-6 being coupled with a drive connecting portion 34-1 of a stepping motor 34. The drive connecting shaft 33-6 has a pin 34-2 that is engaged with a movable portion of an encoder 35 (position detecting means) secured to the cock body 33-1, so that the status of movement of the drive connecting shaft 33-6 can be transmitted to the encoder 35 to thereby detect the position.

The drive connecting shaft 33-6 has an O-ring 33-7 positioned between it and the cock body 33-1 to provide a gas seal. The encoder 35, the main electromagnetic valve 27 and the motor 34 are connected with the control circuit through lead lines 35-1, 27-1 and 34-3, respectively.

The motor 34 has a shaft on which a screw portion 49 is provided, and there is provided a female screw 50 engageable with the screw portion 49, the drive connecting shaft 33-6 being secured to a free end of the female screw 50 to thereby constitute a drive connecting portion 34-1. Accordingly, when a single drive pulse is supplied to the stepping motor 34, the stepping motor 34 is rotated an angle corresponding to one pole, accompanied by a corresponding rotation of the screw portion 49 to move the female screw 50. By way of example, assuming that the number of poles of the stepping motor is 24 and the screw has a lead of 2 mm, the single drive pulse applied to the stepping motor 34 results in a linear movement of the female screw 50 and, hence, the drive connecting shaft 33-6 over a distance of 0.08 mm (=2/24).

Accordingly, rotation of the stepping motor 34 is translated into in linear movement at the drive connecting portion 34-1 with the drive connecting shaft 33-6 moved to move the slide shutter 33-3 that is engaged with the free end of the drive connecting shaft 33-6. Since the flow control plate 33-2 is fixed in position, one hole 33a defined in an intermediate portion of the slide shutter 33-3 for the adjustment of flow of the gas is sequentially aligned with one or some of flow hole 33a defined in the gas flow control plate 33-2 to thereby change the flow of gas.

Because of the construction described above, a torque of the stepping motor 34 should be of a value sufficient to overcome the sum of the biasing force of the spring 33-5 urging the slide shutter 33-3, the slide resistance imposed by of the gas sealing O-ring 33-7 on the drive connecting shaft 33-6 and the thrust load for driving the encoder 35. However, since the biasing force of the spring 33-5 is constant at all times in a direction perpendicular to the slide shutter 33-3 and to a direction of slide and the load itself is small. Also, since the flow control system is determined by a condition in which the holes in the slide shutter 33-3 and the flow control plate 33-2 are overlapped, the flow accuracy at any of flame adjusting positions can be improved in precision as compared with a needle system.

Also, since the system is employed in which the motor is driven only when the gas flow adjustment is required, the motor is usually held inoperative unless the necessity arises.

Accordingly, the system discussed above accomplishes an energy saving and is indeed well-suited with a power source constituted by one or more dry cells or batteries.

It is, however, to be noted that even in the needle system contents described hereinafter can be embodied and are not always limited for use in association with the slide shutter.

Figure 4A:
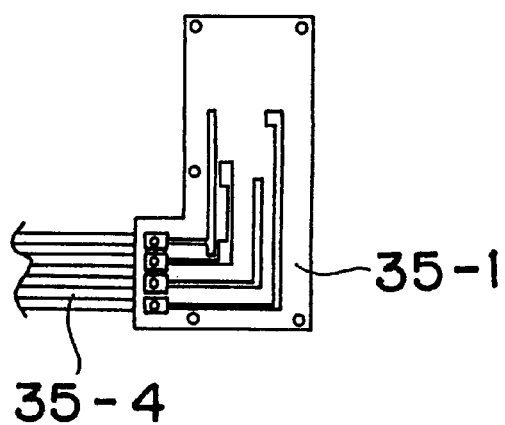
FIG. 4A is a plan view of an encoder employed in the gas flow control apparatus.
Figure 4B:
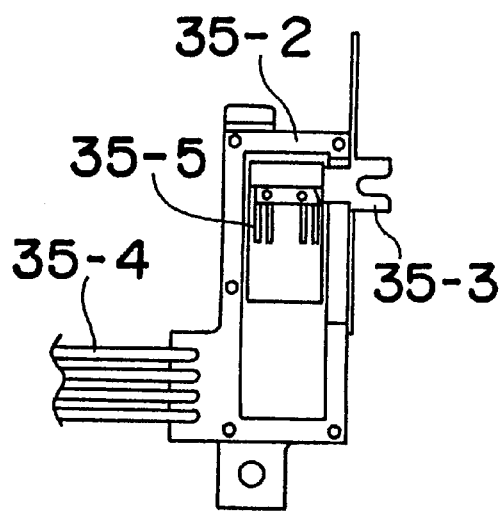
FIG. 4B is a front elevational view of the gas encoder shown in FIG. 4A.
Figure 4C:
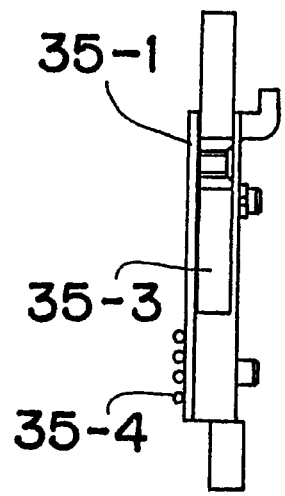
FIG. 4C is a side view of the gas encoder shown in FIG. 4A.

FIGS. 4A to 4C illustrate an outer appearance of the encoder 35. As described with reference to FIGS. 3A and 3B above, the drive connecting shaft 33-6 is provided with a pin 34-2 extending at right angles thereto, the amount of movement of which pin 34-2 is detected by the encoder 35. The encoder 35 referred to above broadly includes a substrate 35-1 printed with a patter of electroconductive tracks, a shell 35-2 forming an outer frame, a slide 35-3 having current collecting element 35-5 equal in number to the number of the tracks and operable to slide the substrate 35-1, and lead lines 35-4 for taking signals from the substrate 35-1.

FIGS. 5A to 5F are diagrams showing correlation between the pattern on the encoder 35 and the gas power according to one embodiment of the present invention, and the number of pulses to be applied to the motor 34. In this embodiment, the gas power adjustable positions are assumed to including five flame adjusting positions, i.e., closed, low flame, medium low flame, medium, medium high flame and high flame positions, each of those positions being detected by both the encoder 35 and the pulses applied to the stepping motor 34.

At a point A, a track 1 is ON (i.e., a track 4 (+COM) and the track 1 are short-circuited together by means of the corresponding current collecting element), and tracks 2 and 3 are OFF. It is to be noted that the track 4 (+COM) is a common power supply pattern. This condition represents a closed condition in which gas is interrupted (i.e., the hole 33a in the slide shutter 33-3 is aligned with none of the holes 33b in the flow control plate 33-2 and therefore no gas flows).

For safeguarding purpose, this condition enables detection of any of breakage or short-circuit of the lead lines so long as only the track 1 is ON, to thereby provide a fail safe feature (when the track 1 is ON, the remaining tracks should not be ON. In the event of breakage of the track 1, no closed position is available with the main electromagnetic valve deenergized). Also, at this position, the driving pulse of the stepping motor 34 is zero and a pulse counter as will be described later is reset.

A B-zone represents all of tracks 1, 2 and 3 being OFF, representing a transit from a condition, in which gas is interrupted, towards a valve open condition. During this transit, all of the tracks are OFF and, even though the pulse counter counts a predetermined number of the driving pulses, an abnormal condition in which a predetermined position is not attained by reason of, for example, freezing of the drive unit with the stepping motor 34 consequently not rotating, can be recognized for safety purpose.

Figures 5A, 5B:
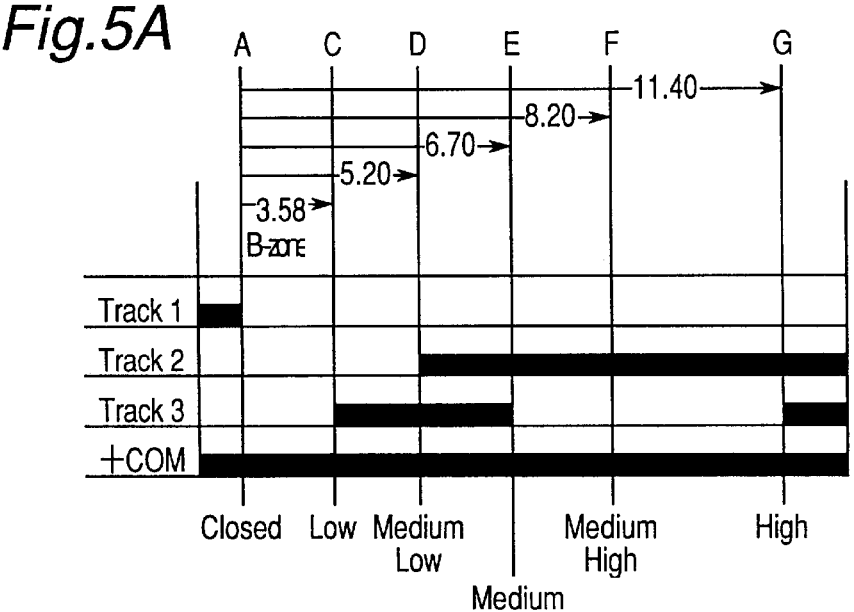
FIG. 5A is a chart showing a relation between gas power adjustable positions and tracks in an encoder according to one embodiment of the present invention.
FIG. 5B illustrates a drive table for a stepping motor which corresponds to the chart shown in FIG. 5A.
Figure 5C:
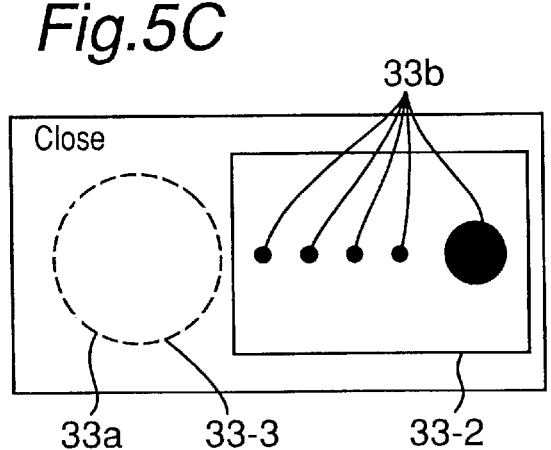
FIGS. 5C to 5F are diagrams showing a flow control hole defined in a slide shutter that is positioned at closed, low flame, high flame, and medium high flame positions, respectively.
Figure 5E:
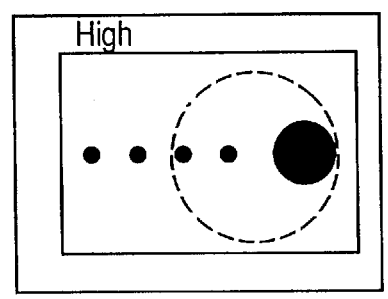
Figure 5D:
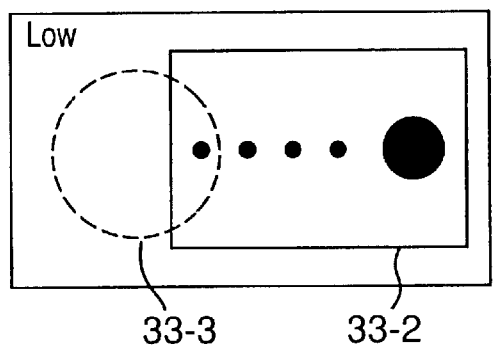
Figure 5F:
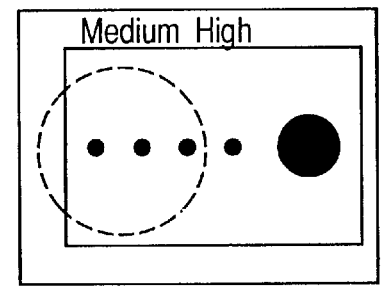

A point C represents the low flame position in which the tracks 1 and 2 are OFF and the track 3 is ON. Gas inflows from only the smallest through-hole of the flow control plate 33-2 and is then supplied to the nozzle 32 through a gas tube 42 (At the low flame position, the hole 33a in the slide shutter 33-3 is aligned with the smallest one of the hole 33b in the flow control plate 33-2 as shown in FIG. 5D with the gas flow being consequently minimum).

The number of the drive pulses for the stepping motor 34 starting from the point A is 45 (=the requires distance of movement of the slide shutter (3.58) divided by 0.08 mm which represents the distance of movement of the slide shutter per pulse). As far as this minimum flow position is concerned, since arrangement has been made that if movement is done from this position towards the closed position, a temporarily closed position is established with the gas flow interrupted and, when the movement is done in a direction required to open again, a raw gas will flow, detection of the minimum flow position is affirmed by the count of the counter for counting the pulses and the encoder 35 to secure the safety feature.

A point D represents the medium low flame position in which the track 1 is OFF and the tracks 2 and 3 are ON. At this medium low flame position, gas inflows from two holes position of the flow control plate 33-2 and is supplied to the nozzle 32 through the gas tube 42. The number of the drive pulses for the stepping motor 34 starting from the point A is 65 (which is equal to the required distance of movement of 5.2 divided by 0.08 mm representing the distance of movement per drive pulse).

As far as the safety feature is concerned, there is intermediate between the minimum flame position and the maximum flame position and the necessity of making a double confirmation can be relieved. On the other hand, as far as the position detection is concerned, it is carried out by the encoder 35 and the pulse counter and, therefore, there is a feature in that even though the pulse counter operates erroneously under the influence of noises, the position can be assuredly detected, thereby facilitating the ease to use.

A point E represents the medium flame position in which the track 1 is OFF, the track 2 is ON and the track 3 is being switched from ON to OFF At this medium flame position, gas inflows from three holes position of the flow control plate 33-2 and is supplied to the nozzle 32 through the gas tube 42. The number of the drive pulses for the stepping motor 34 starting from the point A is 84 (which is equal to the required distance of movement of 6.7 divided by 0.08 mm representing the distance of movement per drive pulse).

Accordingly, the position can be confirmed by the count of the pulse counter and the encoder 35 as is the case with the point D.

A point F is a medium high flame position in which the tracks 1 and 3 are OFF and the track 2 is ON. At this medium high flame position, gas inflows from four holes 33b of the flow control plate 33-2 and is supplied to the nozzle 32 through the gas tube 42. The number of the drive pulses for the stepping motor 34 starting from the point A is 102 (which is equal to the required distance of movement of 8.2 divided by 0.08 mm representing the distance of movement per drive pulse).

In this case, a pattern position of the encoder 35 is not determined and is managed by a pulse management.

The position at the point F does not coincide with the pattern of the tracks in the encoder 35 and is therefore determined by the count of the pulse counter. The reason therefor is because the number of the tracks to be employed in the encoder 35 has been reduced to reduce the cost of manufacture, but since as a description of one embodiment all of the positions can easily be achieved by the encoder 35, this point F is a mere example in which the encoder 35 is unable to detect. Particularly as far as the safety feature is concerned, there is held at an intermediate position between the minimum and maximum positions and the combustion state is such as a flame adjustment within the secured range and a somewhat variation of the pulse counter is harmless to the safety feature. Also, as far as the accuracy of position detection is concerned, the number of the pulses from previous and next positions is small and, therefore, it has now become possible to work out since a software processing is possible with no error accumulated.

A point G represents the high flame position in which the track 1 is OFF and the tracks 2 and 23 are ON. At this high flame position, gas inflows from the largest hole 33b of the flow control plate 33-2 as shown in FIG. 5E, and is supplied to the nozzle 32 through the gas tube 42. The number of the drive pulses for the stepping motor 34 starting from the point A is 143 (which is equal to the required distance of movement of 11.4 divided by 0.08 mm representing the distance of movement per drive pulse).

This high flame position can be detected by both the encoder 35 and the pulse counter. To move the slide shutter beyond the high flame position results in addition of an unreasonable load, other than that required usually, to the gas flow control mechanism and is, accordingly, necessitated in order to prevent the reliability of the mechanism from being reduced.

Figures 6A, 6B:
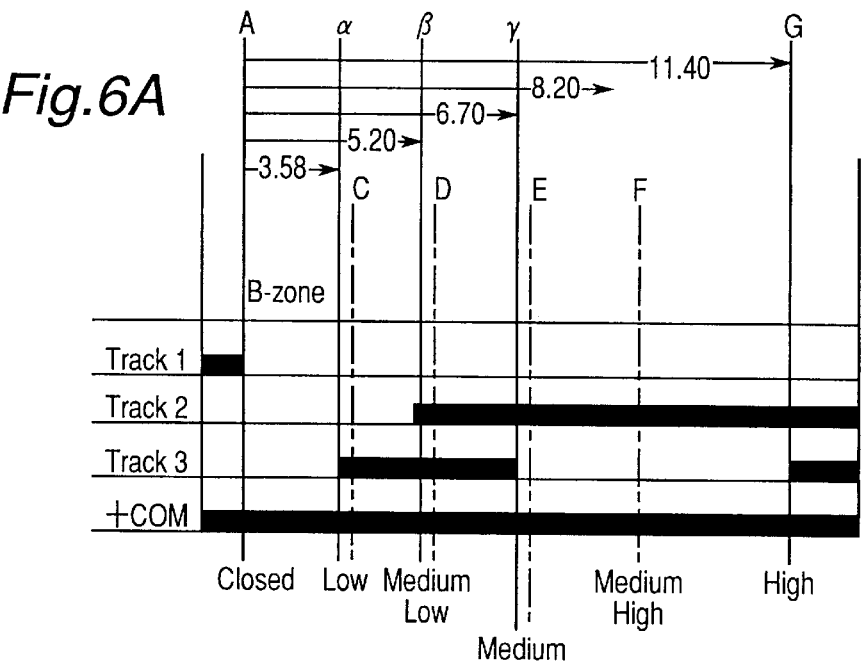
FIG. 6A is a chart showing a relation between gas power adjustable positions and tracks in an encoder according to another embodiment of the present invention.
FIG. 6B illustrates a drive table for a stepping motor which corresponds to the chart shown in FIG. 6A.

FIGS. 6A and 6B are diagrams showing correlation between the pattern on he encoder 35 and the gas power and the number of pulses, wherein the positions other than the closed position and the high flame position do not match with the encoder pattern positions and the position is therefore defined by the number of pulses while correction is made to the encoder position. (It is to be noted that the point A, the B-zone and the point G are identical with those shown in FIG. 5 and are therefore not reiterated for the sake of brevity.)

A point C represents a condition in which the tracks 1 and 2 are OFF and the track 3 is ON (a position) and the low flame position is defined at a potion spaced a two pulse count from this position. At this flame position, gas inflows from the smallest hole position of the flow control plate 33-2 and is supplied to the nozzle 32 through the gas tube 42. The number of the drive pulses for the stepping motor 34 starting from the point A is 47 which is equal to the required distance of movement of 3.78 divided by 0.08 mm representing the distance of movement per drive pulse. Accordingly, the low flame position is established if two pulses are outputted after determination (a position) by the encoder 35.

A point D represents a condition in which the track 1 is OFF and the tracks 2 and 3 are ON (β position) and the medium low flame position is defined at a potion spaced a three pulse count from this position. At this flame position, gas inflows from the two hole positions of the flow control plate 33-2 and is supplied to the nozzle 32 through the gas tube 42. The number of the drive pulses for the stepping motor 34 starting from the point A is 68 which is equal to the required distance of movement of 5.4 divided by 0.08 mm representing the distance of movement per drive pulse. Accordingly, the medium low flame position is established if three pulses are outputted after determination (β position) by the encoder 35.

A point E represents a condition in which the track 1 is OFF, the track 2 is ON and the track 3 is being switched from ON to OFF (γ position) and the medium flame position is defined at a potion spaced a two pulse count from the position at which the track 3 is switched from ON over to OFF (γ position). At this medium flame position, gas inflows from the three hole positions of the flow control plate 33-2 and is supplied to the nozzle 32 through the gas tube 42. The number of the drive pulses for the stepping motor 34 starting from the point A is 84 which is equal to the required distance of movement of 6.7 divided by 0.08 mm representing the distance of movement per drive pulse. Accordingly, the low flame position is established if three pulses are outputted after determination (γ position) by the encoder 35.

A point F represents a condition in which the track 1 is OFF, the track 2 is ON and the track 3 is being switched from ON to OFF (γ position) and the medium high flame position is defined at a position spaced a 21 pulse count from the position at which the track 3 is switched from ON over to OFF. At this medium high flame position, gas inflows from the four hole positions of the flow control plate 33-2 and is supplied to the nozzle 32 through the gas tube 42. The number of the drive pulses for the stepping motor 34 starting from the point A is 105 which is equal to the required distance of movement of 8.4 divided by 0.08 mm representing the distance of movement per drive pulse. Accordingly, the low flame position is established if 21 pulses are outputted after determination (γ position) by the encoder 35.

As described above, an advantage brought about by the arrangement in which the low flame position, the medium low flame position, the medium flame position and the medium high flame position are not matched with the encoder pattern is to allow any possible variation of the various component parts during assembly to be absorbed by a software for a microcomputer and, for example, although if they are not supported by a microcomputer software, an adjustment of the pattern of the encoder 35 and an adjustment in position of small holes in the flow control plate 33-2 are required, this system allow them to be supported by a software processing, accompanied by reduction in time required to accomplish a fine adjustment and of the cost required for repair.

FIGS. 7A and 7B are diagrams showing correlation between the pattern on the encoder 35 and the gas power and the number of pulses according to a further embodiment of the present invention, wherein only the closed position is detected by the encoder 35 while the low flame position, the medium low flame position, the medium flame position, the medium high flame position and the high flame position are controlled in position by the driving pulses for the stepping motor 34 without the encoder 35 being used.

A point A represents a condition in which the track 1 is ON (the pattern 2 and the track 1 are in a conducting state by the current collecting elements), representing the closed position in which the gas is interrupted. Also, this position is such that the moving pulse of the stepping motor 34 is zero and the pulse counter (as will be described later) is reset to zero.

At a point C, gas inflows from the smallest hole of the flow control plate 33-2 and is supplied to the nozzle 32 through the gas tube 42. The number of the drive pulses for the stepping motor 34 starting from the point A is 47 which is equal to the required distance of movement of 3.78 divided by 0.08 mm representing the distance of movement per drive pulse. Accordingly, the low flame position is established at a position counted 47 pulses from the point A.

A point D represents the medium low flame position at which gas inflows from the two holes of the flow control plate 33-2 and is supplied to the nozzle 32 through the gas tube 42. The number of the drive pulses for the stepping motor 34 starting from the point A is 65 which is equal to the required distance of movement of 5.2 divided by 0.08 mm representing the distance of movement per drive pulse. Accordingly, the medium low flame position is established at a position counted 65 pulses from the point A.

A point E represents the medium flame position at which gas inflows from the three holes of the flow control plate 33-2 and is supplied to the nozzle 32 through the gas tube 42. The number of the drive pulses for the stepping motor 34 starting from the point A is 84 which is equal to the required distance of movement of 6.7 divided by 0.08 mm representing the distance of movement per drive pulse. Accordingly, the medium low flame position is established at a position counted 84 pulses from the point A.

A point F represents the medium high flame position at which gas inflows from the four holes of the flow control plate 33-2 and is supplied to the nozzle 32 through the gas tube 42. The number of the drive pulses for the stepping motor 34 starting from the point A is 102 which is equal to the required distance of movement of 8.2 divided by 0.08 mm representing the distance of movement per drive pulse. Accordingly, the medium low flame position is established at a position counted 102 pulses from the point A.

A point G represents the high flame position at which gas inflows from the largest hole of the flow control plate 33-2 and is supplied to the nozzle 32 through the gas tube 42. The number of the drive pulses for the stepping motor 34 starting from the point A is 143 which is equal to the required distance of movement of 11.4 divided by 0.08 mm representing the distance of movement per drive pulse. Accordingly, the medium low flame position is established at a position counted 143 pulses from the point A.

This system is advantageous in that the encoder 35 has a simplified structure, a minimum warranty of the safety is ensured and the structure can provided at a low cost. However, as far as the flow accuracy is concerned, the extent to which variation occurs is large because of accumulation of errors brought about by switching the gas power and the structure is sensible to noises and, therefore, unless extinguished often, the flow accuracy cannot be ensured at each of the flame positions.

Figures 8A, 8B:
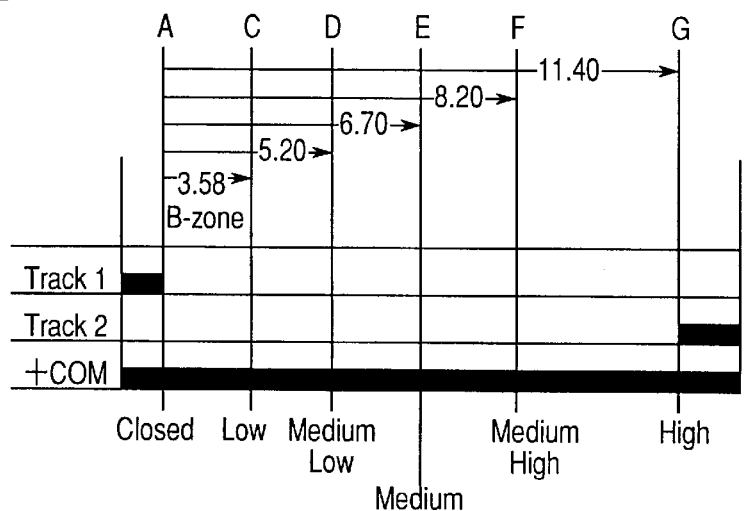
FIG. 8A is a chart showing a relation between gas power adjustable positions and tracks in an encoder according to a still further embodiment of the present invention.
FIG. 8B illustrates a drive table for a stepping motor which corresponds to the chart shown in FIG. 8A.

FIGS. 8A and 8B are diagrams showing correlation between the pattern on the encoder 35 and the gas power and the number of pulses according to a still further embodiment of the present invention, and are applicable wherein only the closed position and the high flame position are detected by the encoder 35 while the low flame position, the medium low flame position, the medium flame position and the medium high flame position are controlled in position by the driving pulses for the stepping motor 34 without the encoder 35 being used.

A point A is such that the track 1 is ON (the track 4 (+COM) and the track 1 are short-circuited together by the current collecting element) and the patterns 2 and 3 are OFF. It is to be noted that the track 4 (+COM) is a common electric power supply pattern. This condition is illustrative of the closed position in which gas is interrupted.

At a point C, gas inflows from the smallest hole of the flow control plate 33-2 and is supplied to the nozzle 32 through the gas tube 42. The number of the drive pulses for the stepping motor 34 starting from the point A is 47 which is equal to the required distance of movement of 3.78 divided by 0.08 mm representing the distance of movement per drive pulse. Accordingly, the low flame position is established at a position counted 47 pulses from the point A.

A point D represents the medium low flame position at which gas inflows from the two holes of the flow control plate 33-2 and is supplied to the nozzle 32 through the gas tube 42. The number of the drive pulses for the stepping motor 34 starting from the point A is 65 which is equal to the required distance of movement of 5.2 divided by 0.08 mm representing the distance of movement per drive pulse. Also, the length from the low flame position is 1.62 and the number of pulses from the low flame position is 20. Accordingly, the medium low flame position is established at a position counted 65 pulses from the point A.

A point E represents the medium flame position at which gas inflows from the three holes of the flow control plate 33-2 and is supplied to the nozzle 32 through the gas tube 42. The number of the drive pulses for the stepping motor 34 starting from the point A is 84 which is equal to the required distance of movement of 6.7 divided by 0.08 mm representing the distance of movement per drive pulse. Also, the length from the medium low flame position is 1.5 and the number of pulses from the medium low flame position is 19. Accordingly, the medium flame position is established at a position counted 84 pulses from the point A.

A point F represents the medium high flame position at which gas inflows from the four holes of the flow control plate 33-2 and is supplied to the nozzle 32 through the gas tube 42. The number of the drive pulses for the stepping motor 34 starting from the point A is 102 which is equal to the required distance of movement of 8.2 divided by 0.08 mm representing the distance of movement per drive pulse. Also, the length from the medium flame position is 1.5 and the number of pulses from the low flame position is 19. Accordingly, the medium high flame position is established at a position counted 102 pulses from the point A.

A point G represents the high flame position in which the track 1 is OFF and the tracks 2 and 3 are ON. At this high flame position, gas inflows from the largest hole of the flow control plate 33-2 and is supplied to the nozzle 32 through the gas tube 42. The number of the drive pulses for the stepping motor 34 starting from the point A is 143 which is equal to the required distance of movement of 11.4 divided by 0.08 mm representing the distance of movement per drive pulse. Also, the length from the medium low flame position is 4.2 and the number of pulses from the medium low flame position is 59. Accordingly, the high flame position can be confirmed by the count of the pulse counter and the encoder 35.

This system is a compromise in which the closed position and the high flame position are detected by both the pulse counter and the position detection, and since by making a position confirmation of the high flame position, any error in position of the pulse counter can be corrected at the high flame position, elimination of an approximate error in the flow accuracy (a deviation will occur from a predetermined position as a result of approximation of an error brought about by reciprocal slide between high and low positions) and any possible reduction in reliability of the mechanism which would be brought out by addition of an unnecessary load to the gas flow control mechanism other than that required usually can be achieved.

Figure 9A:
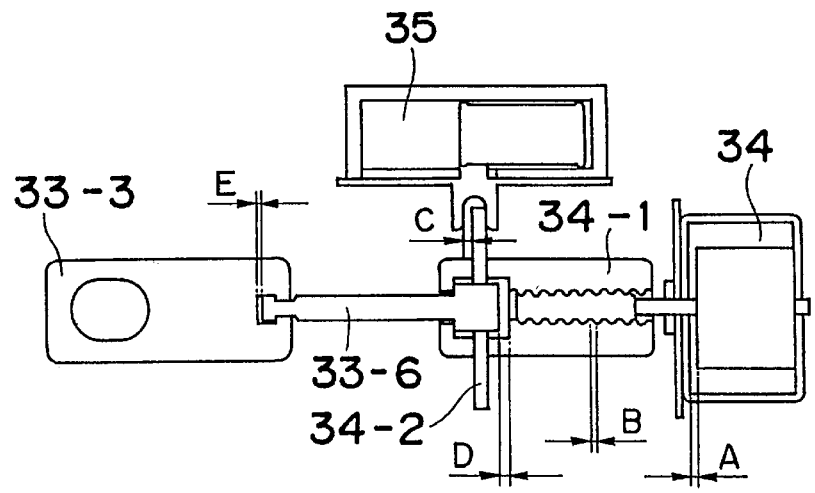
FIGS. 9A and 9B are explanatory diagrams, respectively, showing a rattling motion occurring in a flow control mechanism of the gas flow control apparatus.
Figure 9B:
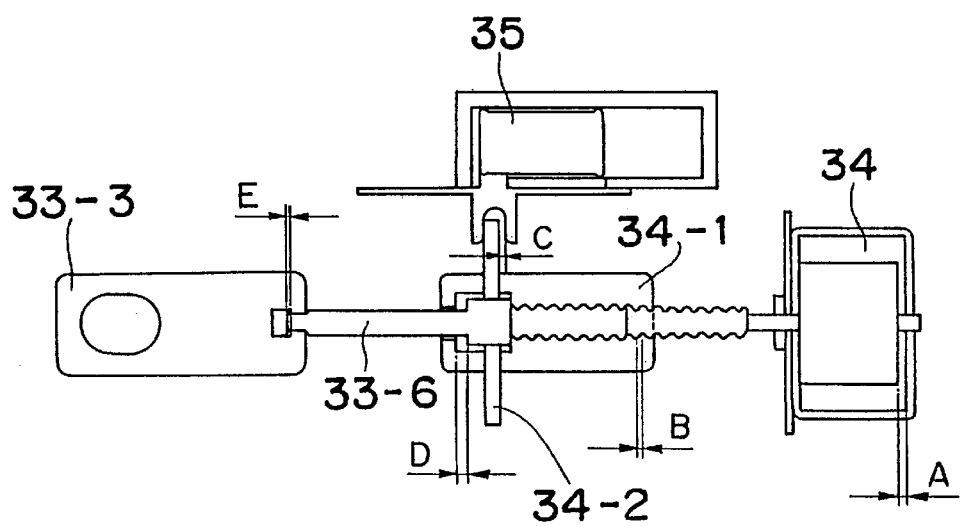

FIGS. 9A and 9B illustrate a rattling motion of flow control elements in each gas flow control unit 29 in a thrust direction and are used to explain an inter-transmission error during a sliding motion of the slide shutter 33-3, engaged with the free end of the drive connecting shaft 33-6, which is caused as a result of rotation of the stepping motor 34 that is transmitted thereto through the drive connecting portion 34-1. Also, since the drive of the encoder 35 is connected with the drive connecting shaft 33-6 through the pins 34-2, a positional error will occur during a reciprocating movement of the slide shutter 33-3 and the encoder 35. This will be explained to provide means for correcting the error with the use of a microcomputer software and to secure a correct position at all times.

The stepping motor 34 has a drive shaft tending to undergo a rattle A in the thrust direction; the drive connecting portion 34-1 for converting the rotation of the motor in the thrust direction has a rattle B between lead and screw; a connection between the pin 34-2 of the drive connecting portion 34-1, that is press-fitted into the drive connecting shaft 33-6, and the encoder 35 has a rattle C; a rattle D exists between the female screw and the drive connecting shaft 33-6; and a rattle E exists between the slide shutter 33-3 and the free end of the drive connecting shaft 33-6. Those rattles will increase with increase of the number of change of the gas power as an error in sliding distance in opening and closing directions of the slide shutter. By way of example, if the magnitude of each of the rattle is expressed in terms of the number of driving pulses required by the stepping motor to move the slide shutter, and assuming that A=0.5, B=0.1, C=0.2, D=0.1 and E=0.2, the total magnitude of the rattles is 1.1. As discussed hereinbefore, assuming that the distance of movement per pulse of the motor is 0.08, the error will correspond to 14 pulses. In other words, in order to absorb all those rattles, that is, to compensate for the error, the slide shutter has to be moved a distance of 0.08 mm×14 pulses. This error will occur each time the direction of rotation is changed between the closing direction and the opening direction.

By way of example, FIG. 9A illustrates the condition in which the power adjustable position is the high flame position whereas FIG. 9B illustrates the condition in which the power adjustable position is the low flame position. When the condition (the high flame position) shown in FIG. 9A is switched over to the condition (the low flame position) shown in FIG. 9B, that is, the high flame position is switched over to the low flame position, the drive shaft of the stepping motor will undergo a rattling motion over a distance corresponding to 6 pulses (=Rattle A/0.08); a rattling motion over a distance corresponding to 1 pulse (=Rattle B/0.08) will take place in the screw; a rattling motion over a distance corresponding to 3 pulses (=Rattle C/0.08) will take place between the encoder 35 and the pin; a rattling motion over a distance corresponding to 3 pulses (=Rattle D/0.08) will take place between the female screw and the drive connecting shaft 33-6; and the slide shutter 33-3 will undergo n rattling motion over a distance corresponding to 1 pulse (=Rattle E/0.08). These rattles are not fixed, but vary in a certain range as a result of variation in manufacture.

On the other hand, the pitch of the four small holes in the flow control plate 33-2 for changing the gas flow is 1.62 mm between the low flame position and the medium low flame position and corresponds 20 pulses when expressed in terms of the number of pulses applied to the stepping motor, and considerably deviates from the position accuracy of the flow control and the error which varies for each manufacture. To eliminate this problem, improvement is required in accuracy of the individual component parts and this is not totally suited to the gas range in terms of costs.

In the present invention, however, in order to make the gas flow control apparatus useable even though such a considerable error occurs in the gas flow control apparatus, comparison between the position indicated by the encoder 35 and the count of the pulse counter is utilized and the error is compensated for by the use of a computer software program in the form as installed in the appliance. In other words, the difference between the number of driving pulses, for example, 10 pulses, required for the slide 35-3 of the encoder 35 to move from one end towards the opposite end, and the number of driving pulses, for example, 20 pulses, required for the slide 35-3, once moved to the opposite end, to return to such one end will be an error peculiar to the specific appliance. Where the direction of movement differs, a proper gas power position can be set by adding this error. This correction is carried out by the use of a computer software program, the details of which will be described later.

Figure 10:
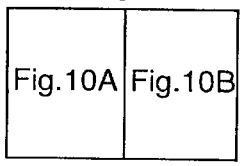
FIG. 10 made up of FIGS. 10A and 10B is a block diagram showing the gas flow control apparatus.
Figure 10A:
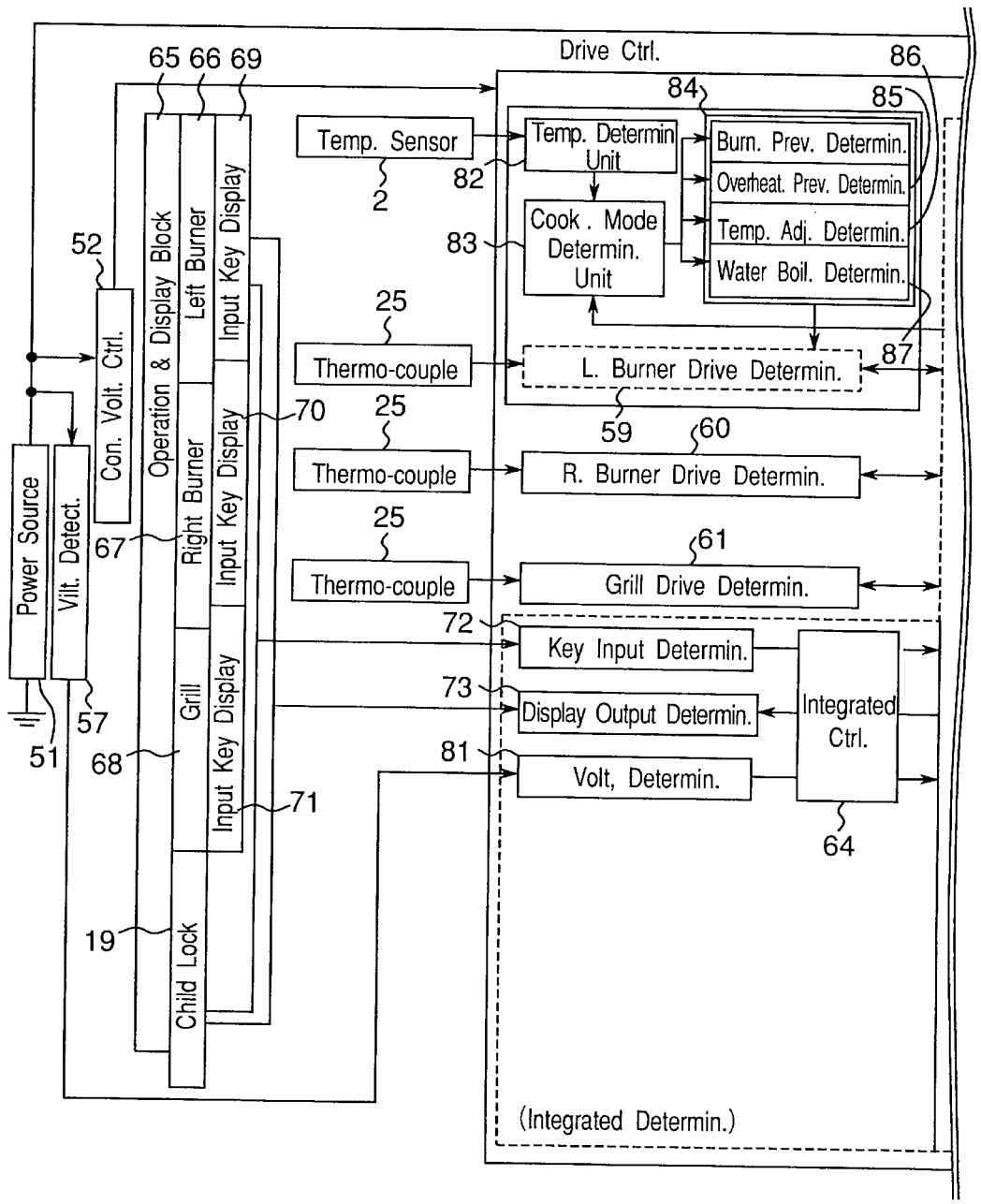
Figure 10B:
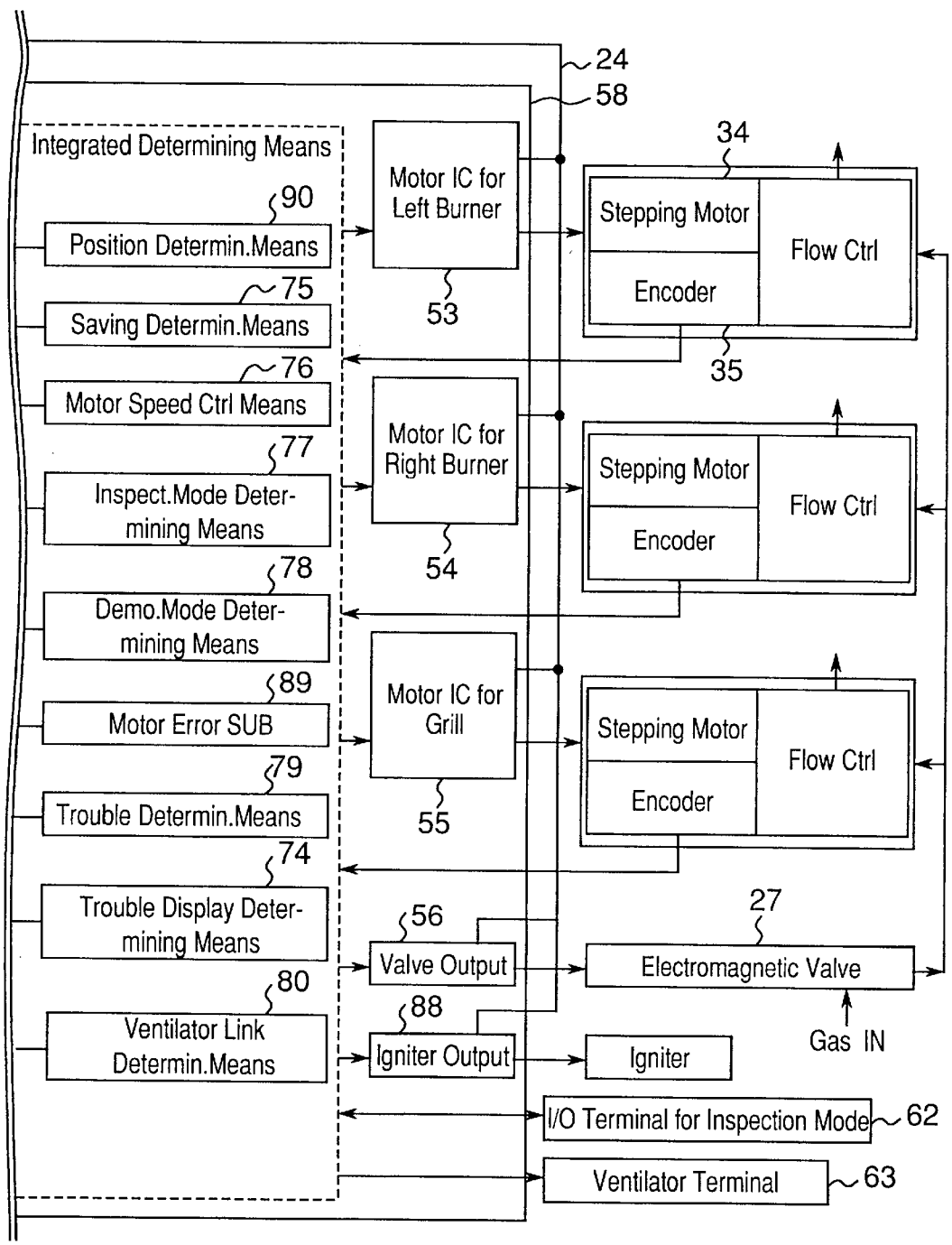

The control circuit is shown in detail in FIG. 10. Referring to FIG. 10, the control circuit 24 is so designed that a constant voltage can be supplied from the battery power source 51 to the control circuit 24 through a constant voltage control means 52 and also directly to the stepping motor 34 through motor integrated circuits (motor ICs) 53, 54 and 55. The power source 51 feeds the electromagnetic valve 27 through a main electromagnetic valve output 56. A signal indicative of the battery voltage measured by a voltage detecting means 57 for detecting the voltage of the battery 51 is supplied from the voltage detecting means 57 to a drive control unit 58.

The drive control unit 58 includes a key input determining means 72 for determining an input key from an input key & displays 69, 70, 71 for left, right and grill burner units 66, 67 and 68 in an control & display block 65 and an input key from the child lock switch 19, an output stage 73 for various displays, and an integrated control means 64 responsive to an instruction from the key input to drive only one of the three stepping motors 34 in view of the capability of power supply because of the battery power source, but for sequentially driving the stepping motors 34 when these stepping motors 34 are desired to be driven simultaneously in the event of depression of the power control keys in a quick succession. The drive control unit 58 also includes a left burner drive determining unit 59 for the left gas ring 1 that is activated by an instruction from the key input determining means fed through the integrated control means 64, a right burner drive determining unit 60 for the right gas ring 3 that is activated by an instruction from the key input determining means fed through the integrated control means 64, and a grill drive determining unit 61 for the grill 4 that is activated by an instruction from the key input determining means fed through the integrated control means 64. The drive control unit 58 again includes a gas power saving determining means 75 that is activated by an instruction from the various drive determining units for varying an electric power supply condition to the left burner motor IC 53, the right burner motor IC 54 and the grill motor IC 55 based on a voltage determining means 81 for determining the power source voltage, to thereby accomplish an electric energy saving, and a motor speed control means 76 responsive to an instruction from the various drive determining units for controlling a speed changing output to be applied to the left burner motor IC 53, the right burner motor IC 54 and the grill motor IC 55 depending on the power adjustable position of the respective gas flow control unit 29, 30 and 31 and gas power setting conditions.

In addition, the drive control unit 58 furthermore includes a demonstration mode determining means 78 for performing a demonstration mode (explaining the user how to use the gas appliance) in response to a particular inputting of the key input (for example, when the same key is continuously depressed); an inspection mode determining means 77 for determining whether component parts of the flow control block are inspected in the form of component parts or whether they are inspected in the form of a complete product; a ventilation linkage determining means 80 for varying a ventilating condition according to the gas power used in any one of the left, right and grill burners; a ventilator connecting terminal 63; a trouble determining means 79 for determining any of various failures of the control circuit 24, the gas flow control units 29 to 31 and an electromagnetic valve output circuit 56 and for determining whether or not the individual component parts or the whole should be halted; and a trouble display determining means 74 for displaying the failure in a display unit for facilitating servicing of the gas appliance.

The left burner drive determining unit 59 includes a temperature determining unit 82 for determining the temperature in reference to temperature data inputted from the temperature sensor 2; a cooking mode determining unit 83 for determining a cooking mode in combination with a setting input of a cooking mode designation inputted from the control panel 5 through the temperature determining means 82; a burn prevention determining unit 84 for avoiding a burning according to a cooking mode; an overheat prevention determining unit 85; a temperature adjustment determining unit 86; and a water boiling determining means 87.

The left, right and grill burner drive determining units 50, 60 and 61 does not only monitor combustion with reference to detected temperature data inputted from the thermocouples 25, but also performs a control to close one of the gas flow control units 29, 30 and 31 based on time count date from a timer indicative of passage of time subsequent to ignition to meet with an emergency situation brought about by abrupt extinction or failure to extinguish.

A method of controlling the gas cooking range by means of the control circuit 24 of the circuit configuration described above will now be described with reference to flowcharts.

FIG. 11 illustrates a key input condition for extinction, and when the child lock switch 19 in the control panel 5 is switched OFF as determined at step S1, and when while in a condition ready to accept various operating keys the ignition key is depressed a length of time greater than 0.3 second as determined at step S2, the key input determining means 72 determines the presence of a key input and then determines that the key input is associated with the left burner at step S3, the right burner at step S4 or the grill burner at step S5 and stores it at step S6, followed by step S7 at which a decision is made to determine if such burner is in use. Where such burner is in use, an extinguishing operation and the priority No. 1 are instructed to the integrated control means 64 at step S8, storage of such burner is erased at step S9, and a decision is then made at step S10 to determine if the same key is continuously depressed a length of time greater than a predetermined length of time. Where the sake key is continuously depressed, an instruction representative of failure of the ignition key is given to the trouble determining means 79 at step S11.

The significance of the use of priorities to activate the stepping motor is that, in the case of the electric power source is constituted by a battery, there is a possibility of an extreme voltage drop, accompanied by abrupt drop of the voltage supplied to the microcomputer, which leads to halt, if a large load is imposed at a time. To avoid this possibility, due regards have been paid to avoid simultaneous activation of the plural stepping motors and, instead, priorities are given to the stepping motors according to ease and events of use: Priority No. 1 represents an extinguishing operation, Priority No. 2 represents an igniting operation, Priority No. 3 represents a manual gas power adjustment, and Priority No. 4 represents an automatic gas power adjustment.

Continued depression of the ignition key is taken into consideration for avoiding a hazardous condition in which water droplets or debris undesirably enter the key or the key is accidentally depressed. For the same reason, a safety timer is provided for the gas power adjusting keys.

Figure 12:
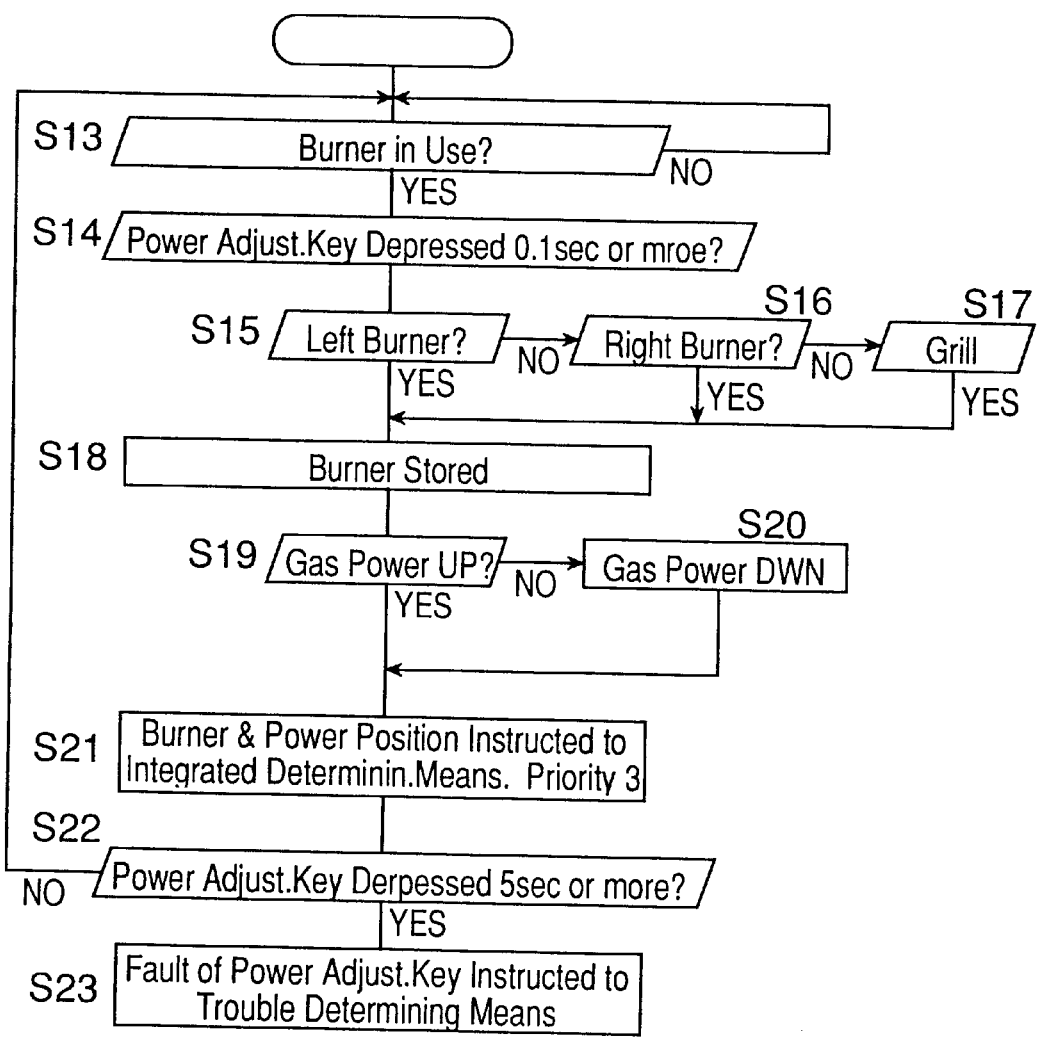
FIG. 12 is a schematic flowchart showing the operation of a key input determining means employed in the gas flow control apparatus.
Figure 13:
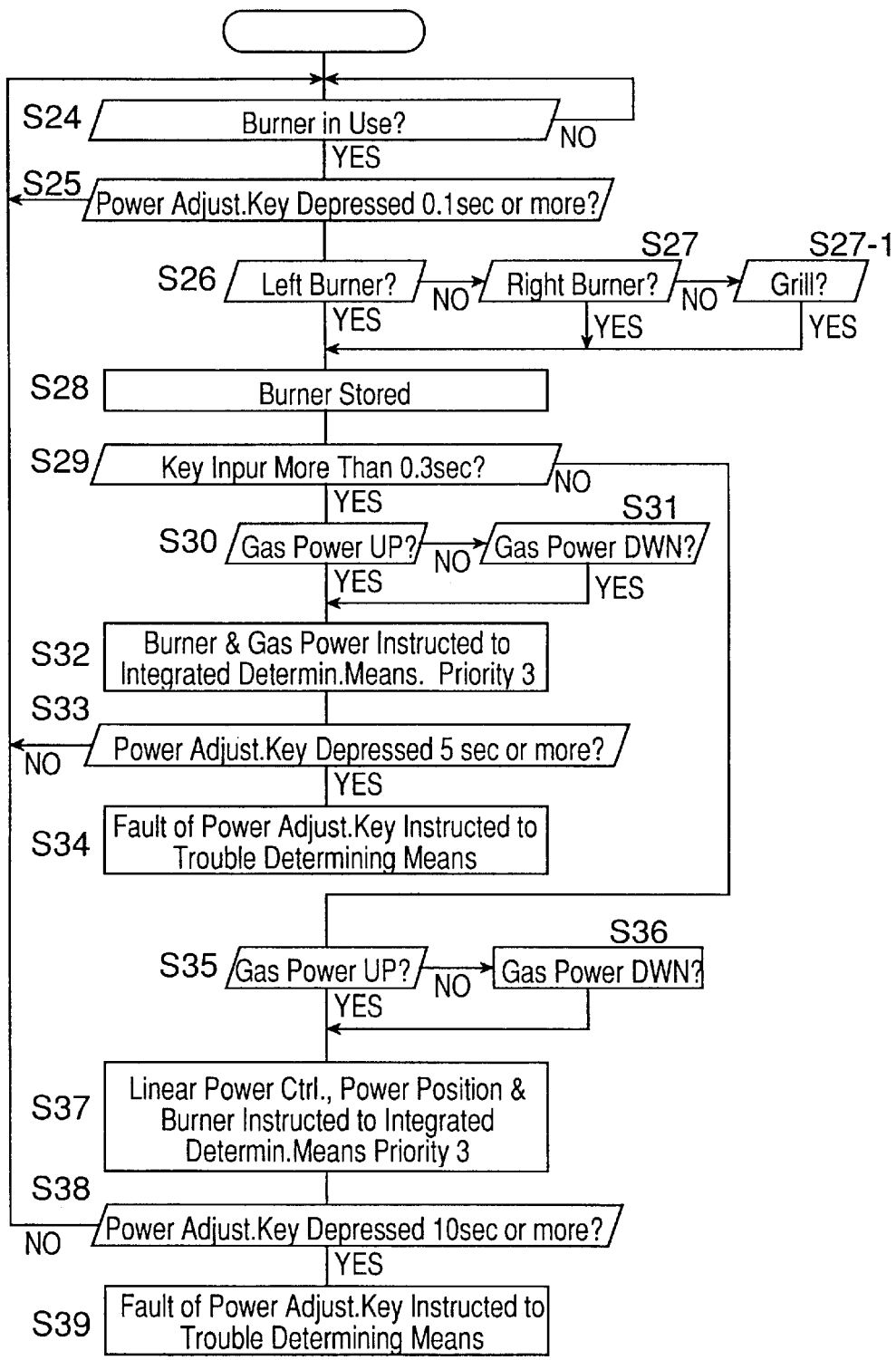
FIG. 13 is a schematic flowchart showing the operation of a key input determining means employed in the gas flow control apparatus.

FIGS. 12 and 13 illustrates an key input condition for gas power adjustment, wherein FIG. 12 shows a key input method for a simple five-step gas power adjustment whereas FIG. 13 shows an example of the key input for gas power adjustment in which an operation is performed to switch a linear gas power control.

Referring to FIG. 12, the key input determining means 72 determines at step S13 if the burner is in use and, when the burner is in use, then determines at step S14 if an input from the gas power adjusting key continues longer than 0.1 second. If a result of decision at step S14 indicates YES, a decision is made at step S15 if the left burner is in use, at step S16 if the right burner is in use or at step S17 if the grill burner is in use, followed by storage of such burner at step S18. Thereafter, decision is made at step S19 if the gas power should be increased (UP) or at step S20 if the gas power should be reduced (DWN), and at step S21, an instruction together with Priority No. 3 is given to the integrated control means 64, followed by a decision at step S22 to determine if the same key is continuously depressed a length of time greater than a predetermined value. In the event that the same key is continuously depressed, an indication of failure of the gas power adjusting key is provided to the trouble determining means 79 at step S23.

On the other hand, in the flowchart of FIG. 13, the key input determining means 72 determines at step S24 if the burner is in use and, when the burner is in use, then determines at step S25 if an input from the gas power adjusting key continues longer than 0.1 second. In such case, a decision is made at step S26 if the left burner is in use, at step S27 if the right burner is in use, or at step S27-1 if the grill burner is in use, followed by storage of such burner at step S28. Thereafter, decision is made at step S29 if the gas power adjusting key is depressed a length of time longer than 0.3 second. If the length of time is shorter than 0.3 second, as is the case with FIG. 12, a decision is made at step S30 if the gas power should be increased (UP) or at step S31 if the gas power should be reduced (DWN), and at step S32, an instruction together with Priority No. 3 is given to the integrated control means 64. Thereafter, a decision is made at step S33 to determine if the same key is continuously depressed a length of time greater than a predetermined value. In the event that the same key is continuously depressed, an indication of failure of the gas power adjusting key is provided to the trouble determining means 79 at step S34.

On the other hand, if a result of decision at step S29 indicates that the gas power adjusting key is depressed the length of time longer than 0.3 second (linear gas power control), decision is performed at step S35 or S36 to determine if the gas power should be UP or DWN, an instruction of the linear gas power control together with Priority No. 3 is given to the integrated control means 64 at step S37, and a decision is made at step S38 to determine if the same key is continuously depressed a length of time longer than a predetermined value (10 seconds). If it is continuously depressed, an indication of failure of the gas power adjusting key is provided to the trouble determining means 79 at step S39.

Since the gas power adjusting key for the linear gas power adjustment is depressed a length of time longer than that for the stepwise gas power adjustment, the safety timer is set to such a long time at step S38.

Figure 14:
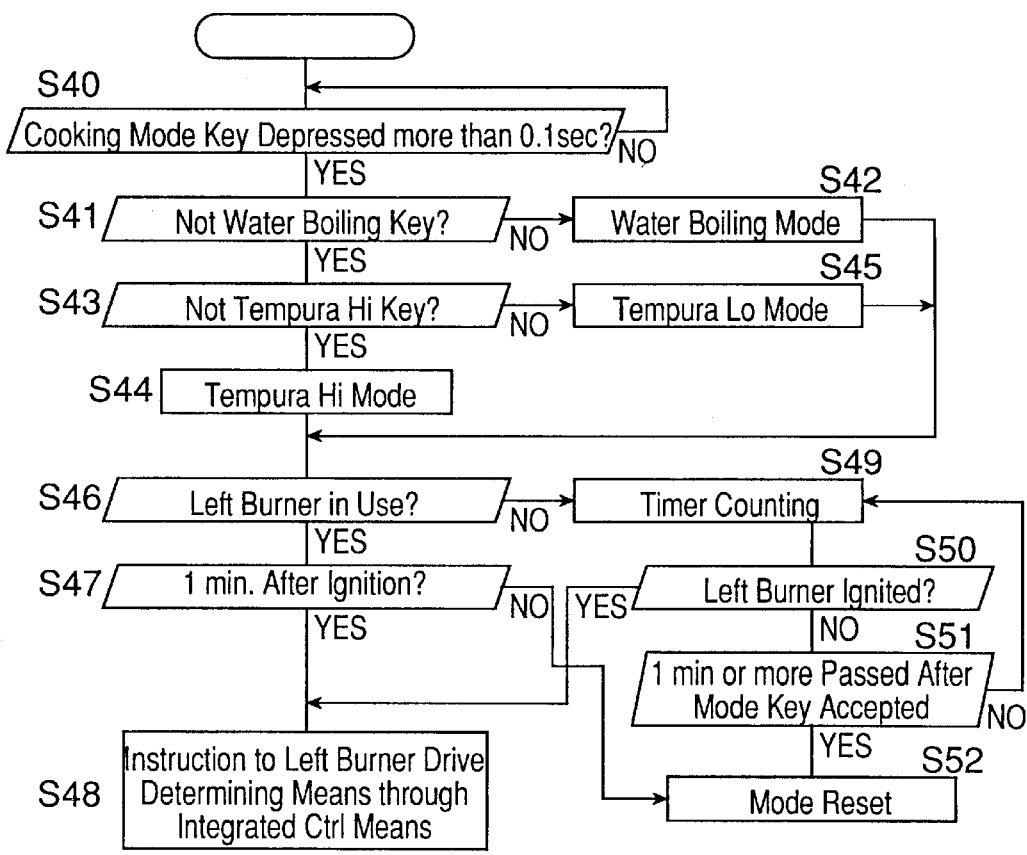
FIG. 14 is a schematic flowchart showing the operation of a cooking mode key input determining means for a left-hand gas burner, which is employed in the gas flow control apparatus.

FIG. 14 illustrates the operation of the key input determining means 72 during the various cooking mode keys for the left burner provided at the control panel 5. In the event of an input of the cooking mode key at step S40, a decision is performed at step S41 to determine if it is not a water boiling key and, in such case, a water boiling mode is chosen at step S41, but if it is not the case, a decision is made at step S43 to determine if it is a Tempura high key. If it is not the case, a decision at step S45 determines it is a Tempura low key, but if it is the case, the Tempura high mode is selected at step S44. Thereafter, a decision is made at step S46 to determine if the left burner is in use, and if it is in use, a decision is made at step S47 to ascertain one minute has not yet passed since ignition. If one minute has not passed yet, an instruction is given at step S48 to the left burner drive determining unit 59 through the subsequent stage occupied by the integrated control means 64. If a result of decision at step S47 indicates that one minute has already passed, step S52 takes place at which an input condition is reset to the initial condition. Also, if a result of decision at step S46 indicates non-use, the timer is activated at step S49. Thereafter, step S50 is performed to ascertain if the igniting operation is carried out within a predetermined length of time and, in the event that the igniting operation takes place within the predetermined length of time, an instruction is given at step S48 to the left burner drive determining unit 59 through the integrated control means 64, but in the event that the igniting operation does not take place, step S52 is performed to reset to the initial condition.

While the cooking mode input is possible within one minute before and after the ignition, it is a rule to set the cooking mode before the ignition, but in the event that the cooking mode input is forgot, it can be accepted so long as the cooking mode input is made within one minute subsequent to the ignition. Should a time longer than one minute have been passed, the cooking mode input is no longer accepted because a cooking software appropriate to the cooking mode is executed and any possible change on the way would deteriorate the cooking work. By way of example, although not shown, it can be shifted from Tempura low to Tempura high to enhance the handling ease. The foregoing is an explanation associated with the setting of the cooking mode key.

Figure 15:
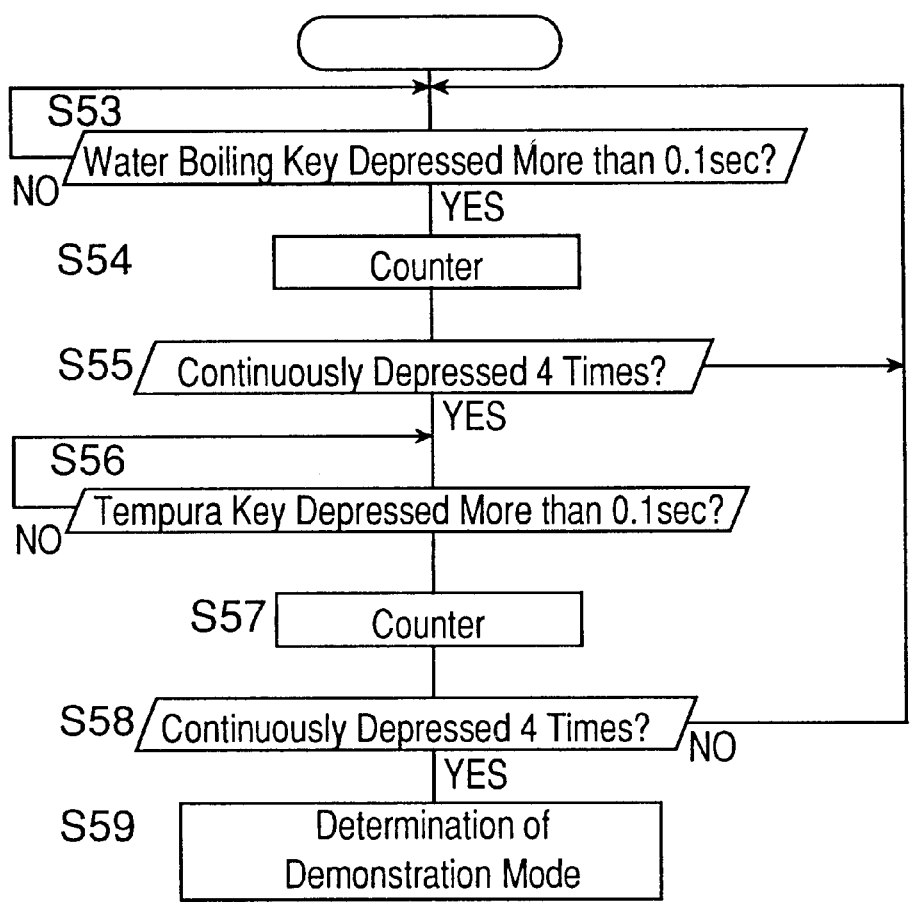
FIG. 15 is a schematic flowchart showing the operation of a demonstration mode key input determining means employed in the gas flow control apparatus.

FIG. 15 illustrates contents of the key input determining means 72 associated with a demonstration mode different from a generally used mode. The demonstration mode is a mode during which how to use the gas cooking range is explained, the contents to be demonstrated are not always fixed and, therefore, description is made in connection with determination of the key input.

The demonstration mode is instructed to the integrated control means 64 at step S59 after the water boiling key 39 has been determined at step S53 as depressed a length of time longer than 0.1 second, the frequency of depression of the key 39 has been counted by a counter at step S54, the Tempura high key 40 has been determined at step S56 as depressed a length of time longer than 0.1 second where the decision at step S55 indicated that the key 39 had been depressed four times in succession, the frequency of depression of the key 40 has been determined at step S57, and finally the key 40 has been determined at step S58 as depressed four times in succession.

The foregoing is an example of the specific contents of the key input determining means.

The contents of the integrated control means 64 in a stage following the key input determining means will now be described.

Figure 16:
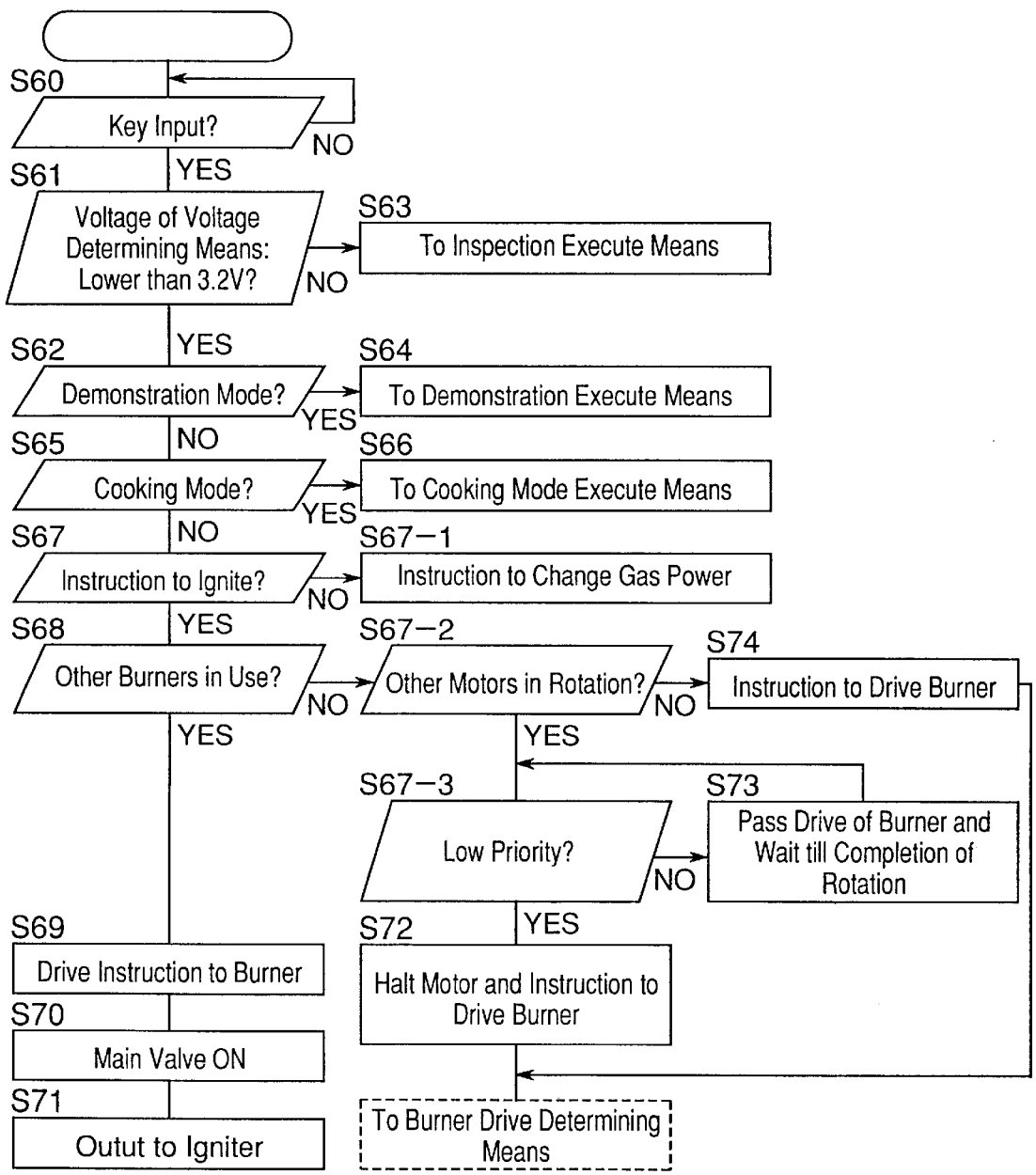
FIG. 16 is a schematic flowchart showing the operation of an over-all operation determining means employed in the gas flow control apparatus.

Referring to FIG. 16, whether or not there is an ignition key input is determined at step S60, followed by a decision performed at step S61 by the voltage determining means 81 to determine if the voltage of the voltage detecting means 57 for detecting the voltage of the battery is lower than 3.2 volts. If it is lower than 3.2 volts, step S62 is performed to determine the demonstration mode as a normally used mode, but if it is higher than 3.2 volts, step S63 is performed to execute an inspection mode determining means 77. The inspection mode determining means 77 will be described later. Should a result of decision at step S62 indicate the demonstration mode, a demonstration mode determining means 78 is executed at step S64. The demonstration mode determining means 78 will be described later.

If the decision at step S62 indicates that it is not the demonstration mode, whether or not it is a cooking mode instruction is determined at step S65 and, if it is the cooking mode instruction, contents are instructed at step S66 to the cooking mode setting means of the left burner drive determining unit. If it is not the cooking mode instruction as determined at step S65, whether or not it is an ignition instruction is determined at step S67 and, if it is the ignition instruction, a decision is made at step S68 to determine if any other burners are in use. If no other burner is in use, a drive instruction is given to the left burner at step S69, followed by opening of the main electromagnetic valve 27 at step S270. Hence, at step S71, an igniter output 88 is issued.

Where a result of decision at step S67 indicates that it is not the ignition instruction, and in the event of an extinction or a gas power adjustment instruction at step S67-1, a decision is made at step S67-2 to determine if any other motor is being rotated (even where any other burner is used as a result of ignition as determined at step S68, step S67-2 follows). If any other motor is being rotated as determined at step 67-2, whether or not the priority of the motor being rotated is earlier than the priority of the relevant burner is determined at step S67-3. Where it is determined earlier, the motor being rotated is brought to a halt, followed by step S72 at which a drive instruction is given to the relevant burner. If it is not as determined at step S67-3, a wait is made until the rotation terminated while the relevant burner is prevented from being driven and, after the motor is brought to a halt, a drive of the relevant burner is given at step S73. Where a result of decision at step S67-2 indicates that none of the other motors is driven, a drive of the relevant burner is instructed at step S74.

Figure 17B:
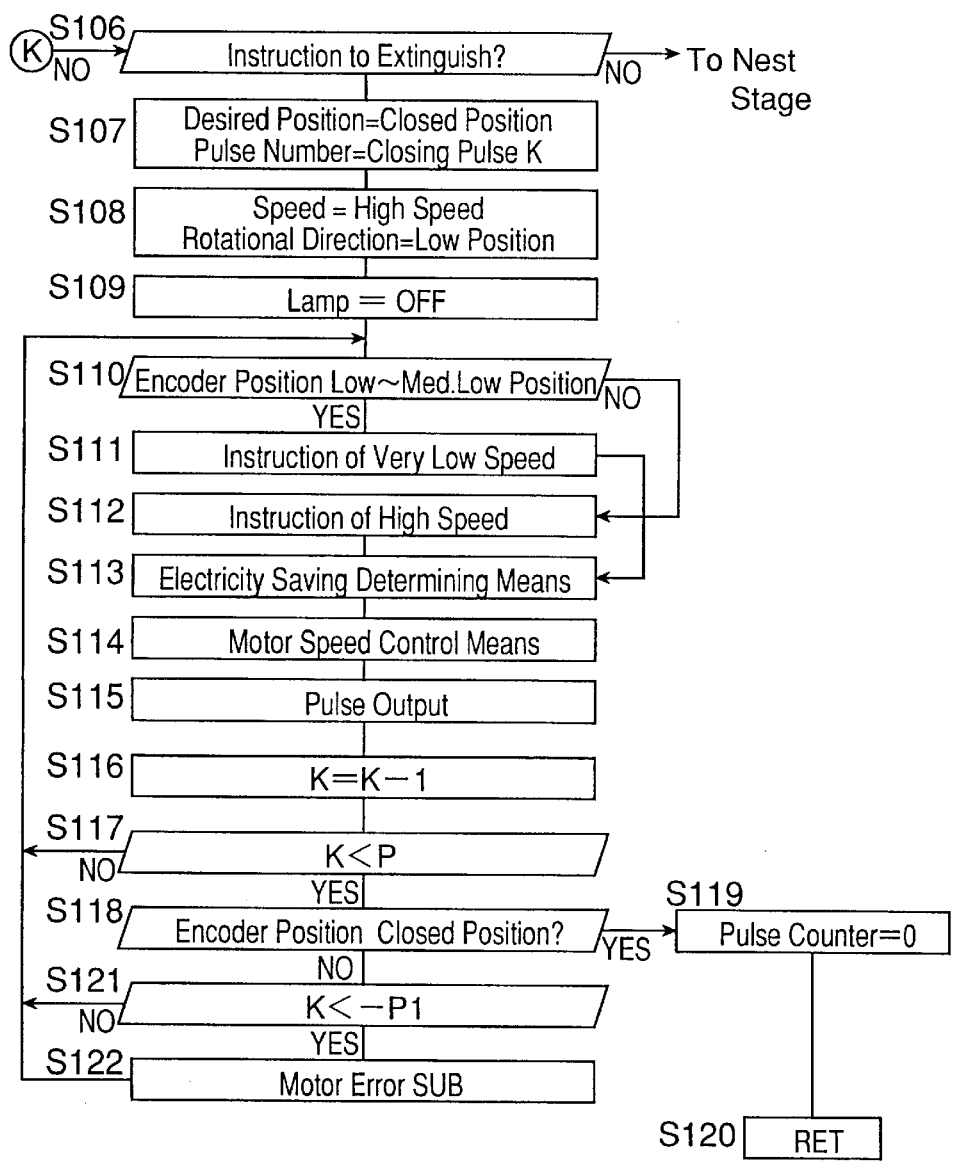
FIG. 17 made up of FIG. 17A to FIG. 17C is a schematic flowchart showing the operation of a gas burner drive determining means employed in the gas flow control apparatus.
Figure 17C:
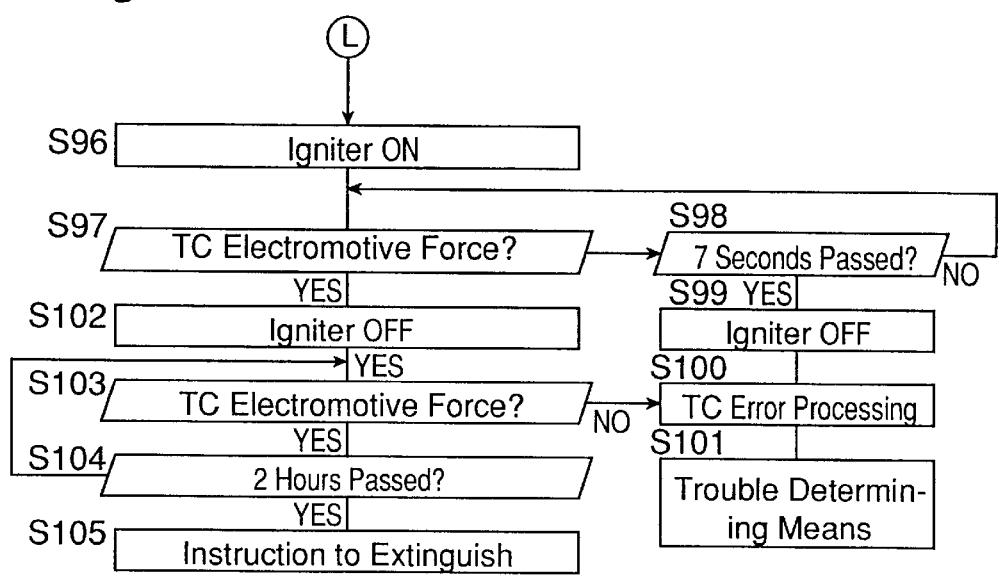

FIG. 17 illustrates contents of the burner drive determining unit that is operated upon instruction from the integrated control means 64. A condition of the encoder 35 is first read by a position determining means 90 (a correlation table shown in FIG. 5) to establish a current position at step 75 and, subsequently, a decision is made at step S76 to determine if it is a closure instruction. In the event of the closure instruction, the closed position is confirmed at step S77, but if it is not the closed position (the position of the encoder is not 100), the program flow goes to step S78 at which a motor error SUB is executed, but if it is the closed position, the program flow returns to step S76.

If it is not the closure instruction as determined at step S76, whether or not it is an ignition instruction is determined at step S79, and in the event of the ignition instruction, a two-hour timer is set ON at step S80, a desired gas power position is set to the medium high flame position, the number of pulses is set to 102 at step S81, the speed and the direction of rotation are set to high and towards the high flame position at step S82, followed by step S83 at which lighting of a lamp is set to a medium high intensity position. Thereafter, the pulses are outputted at step S86 through an electricity saving determining means (7) and a motor speed control means (76) both within the drive control unit 58 and then through the motor IC, to thereby rotate the motor, while the number of pulses outputted to the motor is counted by a counter at step S87 (N=N+1). When the count N of the pulse counter reaches a value smaller than counts (20<N) at step S88, a decision is made at step S89 to determine if the encoder position is the B-zone ([000]) and, it if is not the B-zone, the program flow goes to step S90 to execute the motor error SUB as will be described later, but if it is the B-zone, a decision is made at step S91 to determine if the count N of the pulse counter reached a value (102+M<N) that is M pulses preceding the medium high flame position 102 which is the desired position. Only when it is reached, a decision is made at step S92 to determine if the encoder has arrived at the medium high flame position [010] which is the desired position. If the encoder 35 is determined having not reached the desired position, a decision is made at step S93 to determine if the count N of the pulse counter is of a value (102+M<N) equal to the sum of M added to the number of pulses 102 representative of the medium high flame position and, if it is not, the program flow returns to step S84, but if it is the program flow goes to step S94 to execute the motor error SUB (as will be described later).

On the other hand, if the decision at step S92 indicate that the encoder position attained the desired medium high flame position, the number of pulses is modified at step S95 to a reference medium high pulse number (102), the igniter is then switched ON at step S96, and a decision is made at step S97 (TC Electromotive Force?) to determine a thermal electromotive force is generated indicative of ignition of the burner. If the thermal electromotive force is not generated, a decision is made at step S98 to determine if seven seconds has passed, and if the seven seconds has already passed, the igniter is switched OFF at step S99, followed by a TC error processing at step S100 and a subsequent instruction to the trouble determining means 79 at step S101. On the other hand, if the decision at step S97 indicates that the thermal electromotive force is generated within the seven seconds, the igniter is switched OFF at step S102, and a decision is made at step S103 to determine if the thermal electromotive force is again generated. In the event of the presence of the thermal electromotive force, a decision is made at step S104 to determine if two hours has passed, and, if the two hours is already passed, an extinction instruction is given at step S105. In the absence of the thermal electromotive force as determined at step S103, the program flow goes to step S100 to execute the TC error process.

Figure 18:
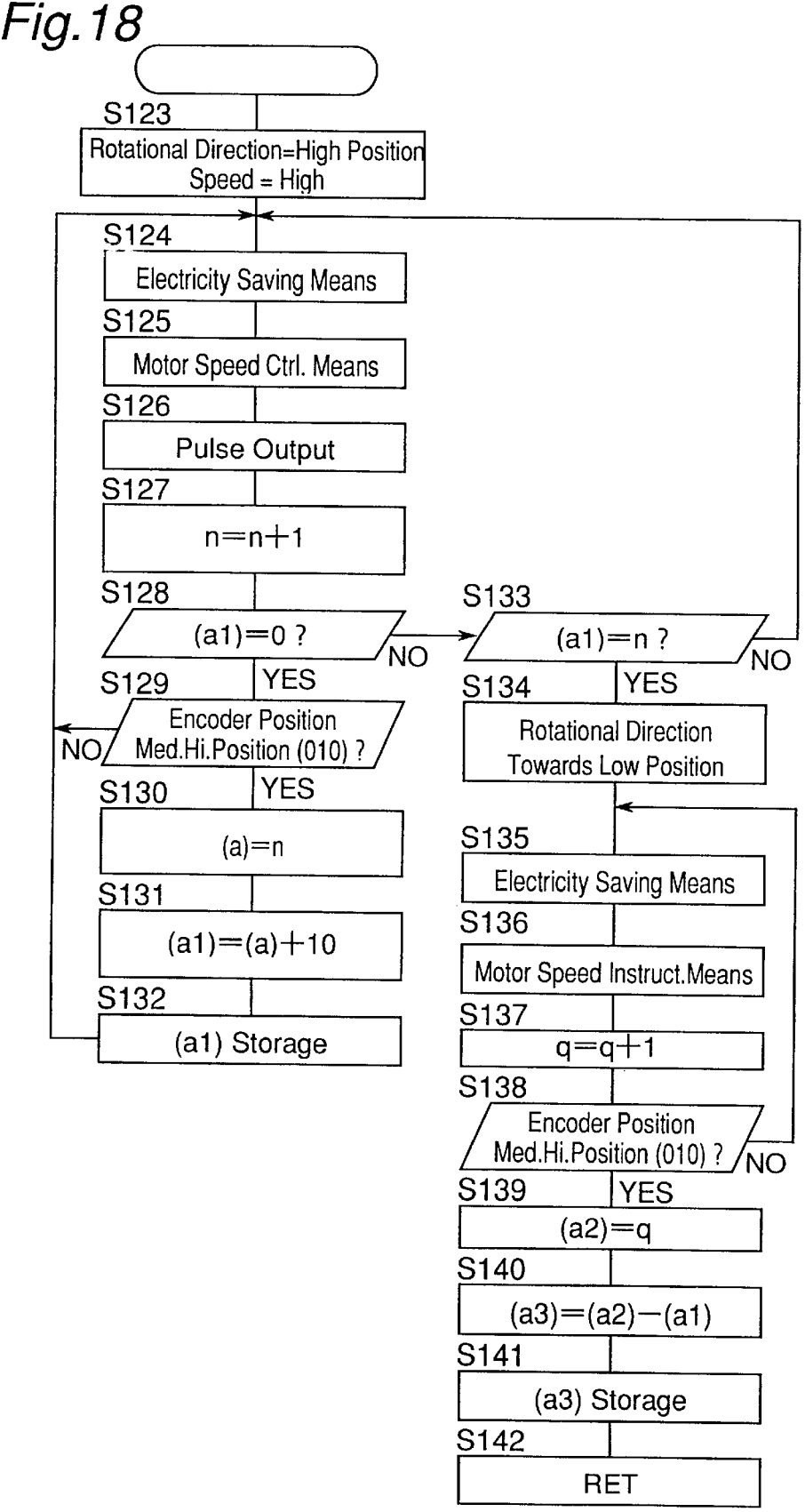
FIG. 18 is a schematic flowchart showing the operation of an error detection processing means employed in the gas flow control apparatus.

If a result of decision at step S79 indicates that it is not the ignition instruction, a decision is made at step S106 to determine if it is an extinction and, if it is determined not the extinction, a gas power adjustment takes place (as shown in FIG. 18). In the case of the extinction, the desired position is set to the closed position and the desired encoder position is set to the closed position [100] at step S107, and the number of pulses is set to a shutter drive pulse K (the number of pulses from the current position to the closed position is calculated and then substituted for K (See the correlation table shown in FIG. 5.)). Then at step S108 the speed is set to a high speed and the direction of rotation is set to a direction towards the low flame position, and at step S109 the lamp is instructed to switch off. Thereafter, a decision is made at step S110 to determine if the encoder position is a position between the low flame position and the medium low flame position and, in such case, the motor speed is set to a very slow speed at step S111, but if it is not the case, the motor speed is set to a high speed at step S112.

Thereafter, pulses are outputted at step S115 through the electricity saving determining means (75) within the drive control unit 58 at step S113, then through the motor speed control means (76) at step S114 and finally through the motor IC at step S115, to thereby drive the motor at step S116, followed by counting of the number of pulses outputted to the motor by means of a counter (K=K–1). A decision is then made at step S117 to determine if the count of the pulse counter reached a value (K<P) that is P pulses preceding K which is the desired position. Only when it is reached, a decision is made at step S118 to determine if the encoder 35 has arrived at the closed position [100] which is the desired position, and in such case, the number of pulses of the encoder position at that time is substituted by 0 at step S119, followed by step S120 at which an indication of the end of the extinction position setting is given to the drive control unit 58. In the event that the decision at step S118 indicates that the encoder 35 is not at the closed position [100] which is the desired position, and also in the event that the count of the pulse counter is not a value equal to the desired pulse number K less P1 (K<–P1) as determined at step S121, the program flow returns to step S110 to repeat step S121. If it is the case, the program flow goes to step S121 at which the motor error SUB is executed (as will be described later).

The current position is ascertained at all times to ensure that while one of the burners is in use, the remaining burners are held at the closed position for safety purpose. Also, the reason that the ignition position is chosen to the medium high flame position is to avoid the fear brought about a blast of gas flame that will often occur when the burner is ignited at the medium flame position. The two-hour timer is a hidden timer for avoiding failure to extinguish the burner and is used for safety and energy saving purposes.

The position of the encoder 35 is ascertained at the time of ignition with the use of the output of 20 pulses to ascertain if due to lack of a sufficient torque the slide shutter is in motion at the initial operation. If the slide shutter is not in motion, the motor is rotated with an electric power sufficient to increase the torque as will be described later, but for the purpose of saving the electricity, the slide shutter is operated with low torque at the initial stage.

If repeated use is made in a direction from the high flame position towards the low flame position and from the low flame position towards the high flame position, the mechanism will rattle and will not match in position with the number of the pulses as hereinbefore described with reference to FIG. 9. A process in which a software process of means for absorbing the error is executed once before the gas power adjustment and also after the ignition will now be described with reference to FIG. 18.

FIG. 18 illustrates an error detecting process, and at step S123 the speed and the direction of rotation are set to a high speed and a direction towards the high flame position, respectively, and pulses are outputted at step S126 through the electricity saving determining means (75) at step S124, then through the motor speed control means (76) at step S125. At subsequent step S127, the number of pulses is counted (N=N+1), followed by step S128 at which a decision is made to determine if any value is substituted for (a1). If it is not substituted, a decision is made at step S129 to determine if the encoder position represents the medium high flame position [010] and the program flow returns to step S124 before the medium high flame position is assumed, but if the medium high flame position is assumed as determined at step S129, the number of the pulses is stored in (a) at step S130 which is subsequently changed at step S131 to a value (a)+10 which is in turn stored in (a1) at step S132 before the program flow returns to step S124. When a decision at step S128 indicates that (a1) is not 0, steps S133, S124 and S133 are repeated until (a1) attains a value equal to N.

When the decision at step S133 indicates (a1)=1, instruction is given at step S134 to render the direction of rotation to reverse to a direction towards the low flame position, and the number of pulses is counted by a pulse counter (q=q+1) at step S137 through the electricity saving means (75) at step 135 and then through the motor speed control means (76) at step S136. A decision is then made at step S 138 to determine if the encoder position is the medium high flame position [010] and, if the medium high flame position is assumed as determined at step S138, the number of pulses is stored in (a2) at step S139, an error peculiar to the machine is calculated at step S140 according to (a3)=(a2)−(a1) and (a3) is then stored as an error during the reciprocating motion so that each time the reverse is made it is added to increase the accuracy of the gas power adjustment.

The foregoing operation is carried out once at the time of ignition and, by this operation, it is possible to eliminate variations of the component parts. The foregoing is an event occurring when the battery power source is used and when the power source is interrupted each time the appliance is used, but where a storage element is employed, setting may be done during the manufacture and where a home AC power source is used, the foregoing operation may be carried out once at the time the power is turned on.

Figure 20B:
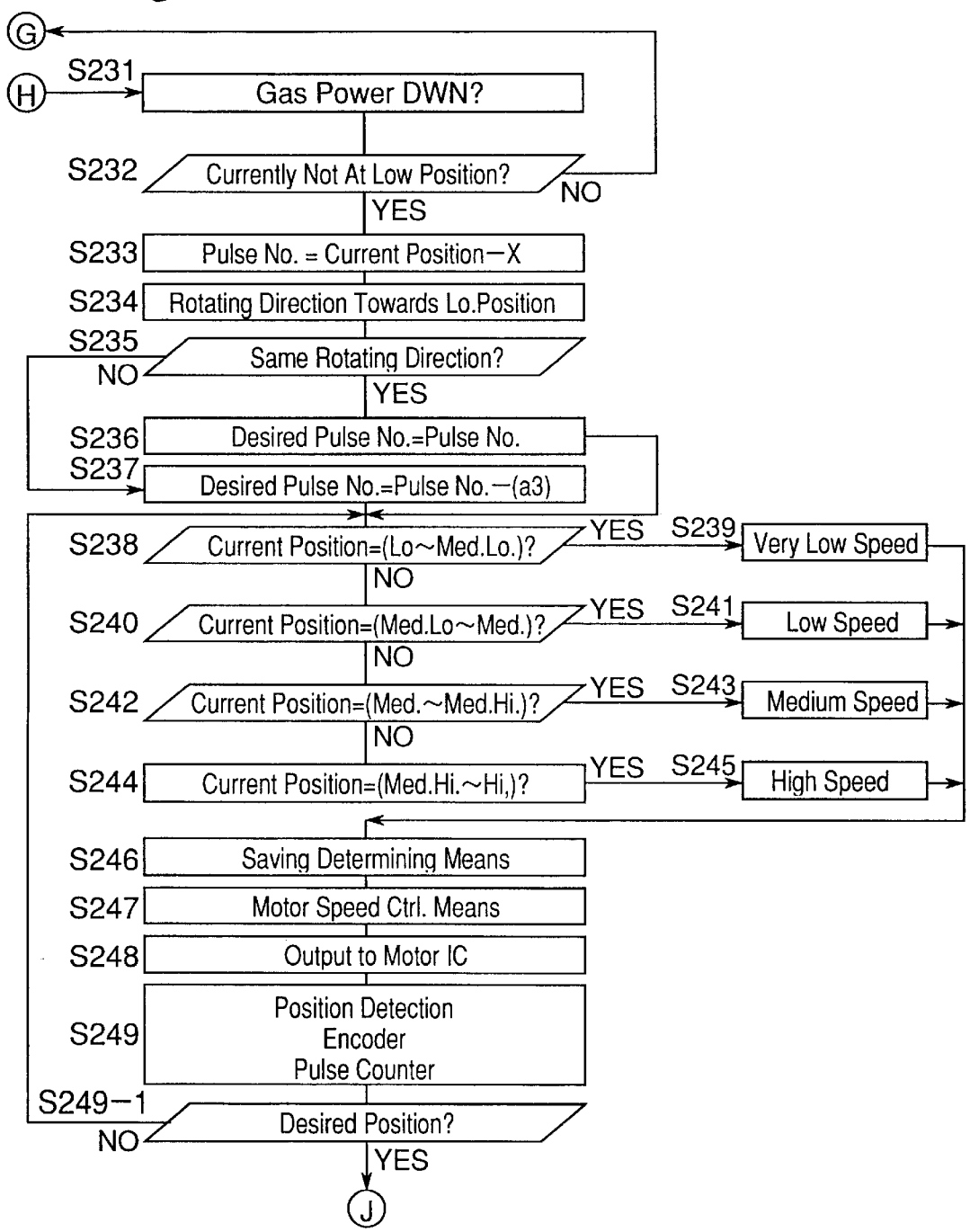
FIG. 20 made up of FIGS. 20A to 20C is a schematic flowchart showing the operation of the power change determining means employed in the gas flow control apparatus.

The operation of the burner drive determining means 50 when an instruction to change the gas power is given from the integrated control means in the drive control unit 58 will be shown. The gas power adjustment is available in two methods, i.e., a five-step power adjustment method and a five-step plus linear power adjustment method. FIG. 19 illustrates the gas power adjustment based on the five-step power adjustment method whereas FIG. 20 illustrates the gas power adjustment based on the five-step plus linear power adjustment method.

Referring to FIG. 19, a decision is made at step S143 to determine if the instruction to change the gas power is to increase it and if it is to increase the gas power; the current position if set to the high flame position is not accepted at step S144; but if it is not the high flame position, the desired position is set to the current gas power +1 at step S145; one or more of the lamps are switched on at step S146; the current encoder position is changed to an encoder position E spaced one place from the current encoder position at step S147 based on FIG. 5; the number of pulses P for driving the motor is selected at step S148 (the number of pulses=the current number of pulses (G)+P); and finally the direction of rotation is instructed to be a direction towards the high flame position at step S149. At step 150, a decision is made to determine if the current direction of rotation is the same as before, and if it is determined to be the same direction, the desired number of pulses is rendered to be equal to the number of pulses at step S151. However, if it is not the same direction, a value which is the sum of a correction (a3) plus the number of pulses is rendered to be the desired number of pulses at step S152.

When the encoder position is within the range between the low flame position and the medium low flame position for the speed instruction at step S153, the speed is instructed to be a very low speed at step S154. When the encoder position is within the range between the medium low flame position and the medium flame position, a low speed is instructed at step S156; when the encoder position is within the range between the medium flame position to the medium high flame position at step S157, a medium speed is instructed at step S158; and when the encoder position is within the range between the medium high flame position and the high flame position at step S159, a high speed is instructed at step S160. Thereafter, pulses are outputted to the motor at step S162 through the electricity saving means (75) of the drive control unit 58 at step S161 and then through the motor speed determining means (76) at step S161-1; determination of the position of the encoder 35 and the counting of the number of pulses are carried out at step S163; a decision is then made at step S164 to determine (desired pulses−S<(G)+(a3)+N) S pulses preceding from the desired pulses; if the condition establishes, a decision is made at step S165 to determine if the encoder position E is a designated position; if the condition establishes the number of pulses are modified to a reference position based on FIG. 5 at step S167; the current direction of rotation is stored at step S168; and finally the program flow returns at step S169. If the condition establishes as determined at step S164, if the encoder position E is not the designated position as determined at step S165, and when the number of pulses attains at step S170 a value equal to (the number of pulses+ S<(G)+(a3)−N) S pulses exceeding the desired number of pulses, the motor error SUB is executed at step S171.

In the case of the instruction to reduce the gas power as determined at step S172, the current position if set to the low flame position will not be accepted at step S173; but if it is not the low flame position, the desired position is set to the current gas power −1 at step S174; the lamp is changed to a position reduced one place from the current position at step S175; the current encoder position is changed to an encoder position E reduced one place from the current encoder position at step S176 based on FIG. 5; the number of pulses for driving the motor is selected at step S177 (the number of pulses the current number of pulses (G)−P); and finally the direction of rotation is instructed to be a direction towards the low flame position at step S178. At step 179, a decision is made to determine if the current direction of rotation is the same as before, and if it is determined to be the same direction, the desired number of pulses is rendered to be equal to the number of pulses at step S180. However, if it is not the same direction, a value which is the sum of a correction (a3) plus the number of pulses is rendered to be the desired number of pulses added with a correction value (a3) at step S181.

When the encoder position E is within the range between the low flame position and the medium low flame position for the speed instruction at step S182, the speed is instructed to be a very low speed at step S183. When the encoder position is within the range between the medium low flame position and the medium flame position at step S184, a low speed is instructed at step S185; when the encoder position is within the range between the medium flame position to the medium high flame position at step S186, a medium speed is instructed at step S187; and when the encoder position is within the range between the medium high flame position and the high flame position at step S188, a high speed is instructed at step S189. Thereafter, pulses are outputted to the motor at step S192 through the electricity saving means (75) of the drive control unit 58 at step S190 and then through the motor speed determining means (76) at step S191; determination of the position of the encoder 35 and the counting of the number of pulses are carried out at step S193; a decision is then made at step S194 to determine (desired pulses+S<(G)+(a3)+N) S pulses preceding from the desired pulses; if the condition establishes, a decision is made at step S195 to determine if the encoder position E is a designated position; if the condition establishes the number of pulses are modified to a reference position based on FIG. 5 at step S196; the current direction of rotation is stored at step S197; and finally the program flow returns at step S196. If the condition establishes, if the encoder position E is not the designated position as determined at step S195, and when the number of pulses is greater by S than the desired number of pulses (the number of pulses−S<(G)+(a3)−N) as determined at step S199, the motor error SUB is executed at step S171.

FIG. 20 illustrates the contents for the gas power adjustment for the five-step plus linear gas power adjustment, in which a decision is made at step S199 to determine if the gas power adjustment is a five step adjustment and, if it is the five-step adjustment, the contents shown in FIG. 19 are executed as hereinbefore described. If it is not the five-step adjustment as determined at step S199, it means that the gas power adjustment is a linear power adjustment. In the event of the linear gas power adjustment, and if the gas power adjustment is to increase it as determined at step S201, a decision is made at step S202 to determine if the current position is the high flame position; if it is the high flame position, the program flow returns at step S199, but if it is not the high flame position, the number of pulses required to move is set at step S203 to a value equal to the current number of pulses plus X (where X represents a value within the range of 2 to 5 which is determined for each combustion site to such an extent as to enable the user to grasp change in gas power); and then at step S204 the direction of rotation is instructed to be a direction towards the high flame position. At step S205 a decision is made to determine if the instructed direction of rotation is the same as before. If it is the same direction, the desired number of pulses is set at step S206 to a value equal to the number of pulses, but if it is not the same direction, the desired number of pulses is set at step S207 to a value equal to the sum of the number of pulses plus (a3). (a3) represents the number of pulses necessitated to eliminate play occurring in the mechanism when the direction of rotation is changed by means of a software processing as hereinbefore described.

Once the desired number of pulses required to move has been determined, when the position of the encoder 35 is within the range between the low flame position and the medium low flame position at step S208, the speed is instructed to be a very low speed at step S209; when the encoder position is within the range between the medium low flame position and the medium flame position at step S210, a low speed is instructed at step S211; when the encoder position is within the range between the medium flame position to the medium high flame position at step S212, a medium speed is instructed at step S213; and when the encoder position is within the range between the medium high flame position and the high flame position at step S214, a high speed is instructed at step S215. Thereafter, pulses are outputted to the motor at step S218 through the electricity saving means (75) of the drive control unit 58 at step S216 and then through the motor speed determining means (76) at step S217. Then, determination of the position of the encoder 35 and the counting of the number of pulses are carried out at step S219; when the desired position is assumed at step S219-1, as far as the lamp indicative of the gas power is concerned, a lamp representative of the medium low flame position is chosen at step S221 when the power control key is within the range between the low flame position and the medium low flame position at S220, a lamp indicative of the medium flame position is chosen at step S223 when it is within the range between the medium low flame position and the medium flame position at step S222, a lamp indicative of the medium high flame position is chosen at step S225 when it is within the range between the medium flame position and the medium high flame position at step S224, a lamp indicative of the medium high flame position is chosen at step S227 when it is within the range between the medium high flame position and the high flame position at step S226, or a lamp indicative of the high flame position is chosen at step S229 when it is at the high flame position at step S228; and if the gas power adjusting key is continuously depressed or if the gas power adjusting key is not continuously depressed, the program flow goes to step S230 and step S201, respectively. The purpose of instruction of the lamps is that the lamp indicative of the low flame position is lit only when the gas power control key is set to the low flame position to thereby secure a minimum gas power.

In the event that the decision at step S231 indicates that the gas power adjustment is to reduce the gas power, a decision is made at step S232 to determine if the current position is the low flame position and the program flow returns to step S199 if it is the low flame position. However, if it is not the low flame position, the number of pulses required to move is set at step S233 to a value equal to the current number of the pulses less X (where X represents a value within the range of 2 to 5 which is determined for each combustion site to such an extent as to enable the user to grasp change in gas power); the direction of rotation is instructed to be a direction towards the low flame position at step S234; and a decision is made at step S235 to determine if the instructed direction of rotation is the same as before. If it is the same direction, the number of pulses is set at step S236 to render the desired number of pulses to be equal to the number of pulses, but if it is not the same direction, the desired number of pulses is rendered to be equal to the sum of the number of pulses plus (a3) at step S237. It is to be noted that (a3) represents the number of pulses necessitated to eliminate play occurring in the mechanism when the direction of rotation is changed by means of a software processing as hereinbefore described.

Once the desired number of pulses required to move has been determined, when the position of the encoder 35 is within the range between the low flame position and the medium low flame position at step S238, the speed is instructed to be a very low speed at step S239; when the encoder position is within the range between the medium low flame position and the medium flame position at step S240, a low speed is instructed at step S241; when the encoder position is within the range between the medium flame position to the medium high flame position at step S242, a medium speed is instructed at step S243; and when the encoder position is within the range between the medium high flame position and the high flame position at step S244, a high speed is instructed at step S245. Thereafter, pulses are outputted to the motor at step S248 through the electricity saving means (75) of the drive control unit 58 at step S246 and then through the motor speed determining means (76) at step S247. Then, determination of the position of the encoder 35 and the counting of the number of pulses are carried out at step S249; when the desired position is assumed at step S249-1, as far as the lamp indicative of the gas power is concerned, a lamp representative of the medium low flame position is chosen at step S251 when the power control key is within the range between the low flame position and the medium low flame position at S250, a lamp indicative of the medium flame position is chosen at step S253 when it is within the range between the medium low flame position and the medium flame position at step S252, a lamp indicative of the medium high flame position is chosen at step S255 when it is within the range between the medium flame position and the medium high flame position at step S254, a lamp indicative of the medium high flame position is chosen at step S257 when it is within the range between the medium high flame position and the high flame position at step S256, or a lamp indicative of the high flame position is chosen at step S259 when it is at the high flame position at step S258; and if the gas power adjusting key is continuously depressed as determined at step S230 or if the gas power adjusting key is not continuously depressed, the program flow returns at step S230-1 and step S230-2, respectively.

The purpose of instruction of the lamps is to that the lamp indicative of the high flame position is lit only when the gas power control key is set to the high flame position, to thereby ensure a maximum gas power.

Also, with respect to the display of the lamps, for example, only the lamp indicative of the low flame position is turned on at the low flame position and a lamp indicative of the medium low flame position is lit at the medium low flame position, but these two lamps are lit when the gas power control key is set in between the low and medium low flame positions. This system is effective as a second embodiment of the present invention.

By the foregoing, it is possible to accomplish both the stepwise gas power adjustment and the linear gas power adjustment that can be selected one at a time depending on the purpose of cooking.

In particular, when the gas power is desired to be adjusted linearly, the stepwise adjustment is carried out to choose a rough gas power and, by continuously depressing the key at this time, the gas power can be changed linearly, accompanied by increase in ease to use.

Figure 21B:
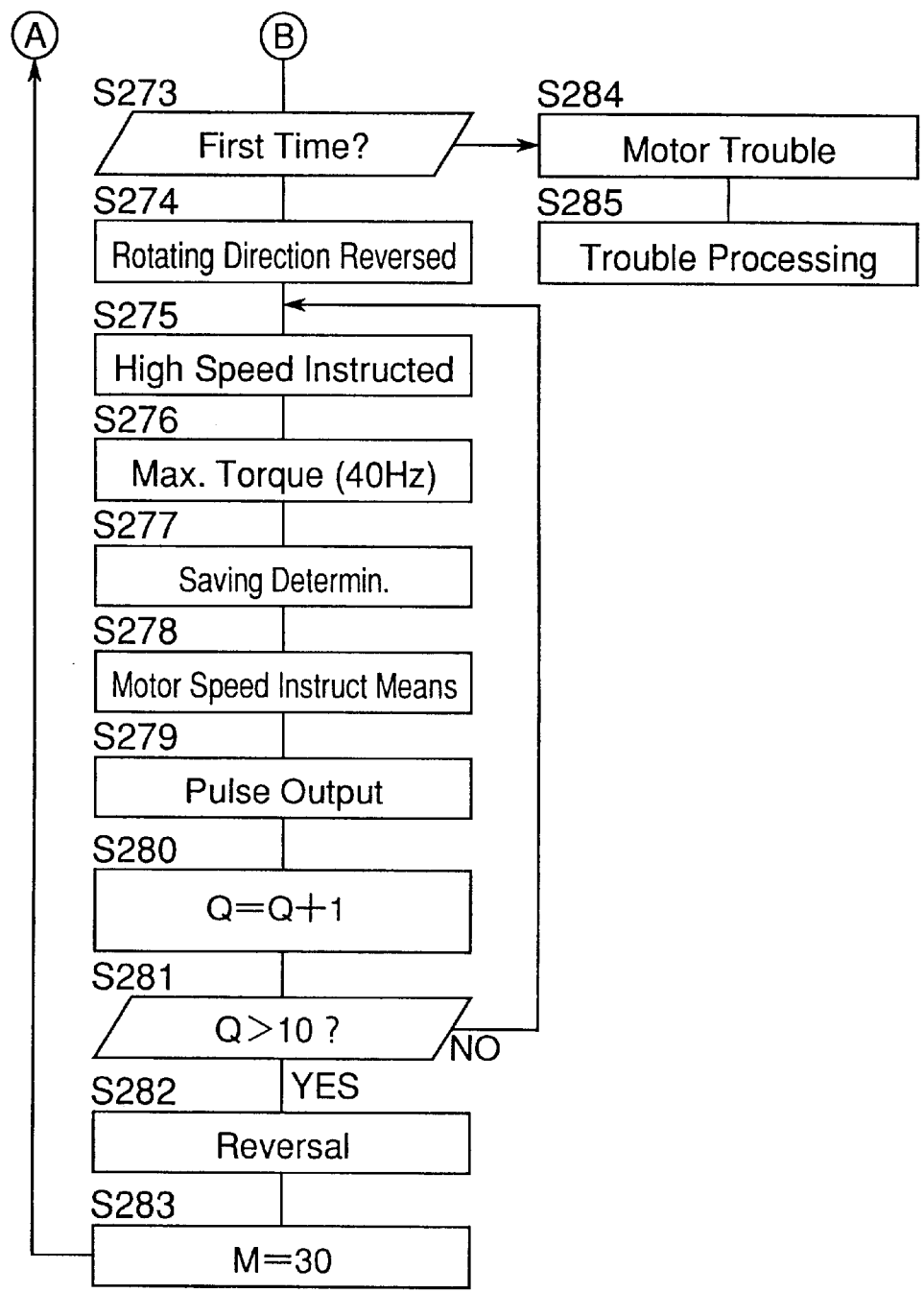
FIG. 21 made up of FIGS. 21A and 21B is a schematic flowchart showing the operation of a motor error processing means employed in the gas flow control apparatus.

The motor error SUB which is an erroneous motor operation process within each of the burner drive determining units 50, 60 and 61 will now be described. FIG. 21 illustrates a schematic flowchart thereof. After initiation of this routine which takes place in the event of occurrence of a motor error, the motor speed is set to a high speed at step S260; a maximum torque is instructed at step S261; the direction of rotation is set at step S262 to the same direction which has been assumed before the error processing; the desired position is set at step S263 to the same position which has been assumed before the error processing; and pulses are outputted to the motor at step S266 through the electricity saving determining means S264 within the drive control unit 58 and then through the motor speed determining means 76 at step S267. This means that when the motor is not operated at an usual torque, the motor is restarted at a high torque.

When the direction of rotation is the direction towards the high flame position at step S267, the number of pulses is counted by a pulse counter at step S268 (N=N+1); a decision is made at step S269 to determine if the encoder 35, the position of which has been detected, is held at the desired position; the number of pulses is modified according to FIG. 5 at step S270 when the encoder 35 is at the desired position; and the program flow returns to the original flow at step S271. In the event that the desired encoder position cannot be found, and that the decision at step S272 indicates that the value equal to the sum of the previous desired number of pulses plus a predetermined value M has not yet been attained N (desired pulse+M>N), the program flow returns to step S263. However, if it has attained N as determined at step S272, a decision is made at step S273 to determine if it is the first time. In the case of the first time, the direction of rotation is set at step S274 to the direction towards the low flame position; the motor speed is set to a high speed at step S275; a maximum torque is instructed at step S276; and pulses are outputted to the motor at step S279 through the electricity saving determining means at step S277 and the motor speed determining means 76 at step S278 within the drive control unit 58.

When the count of the pulses counted by a pulse counter 2 attains (Q=Q+1) at step S281 and a decision at step S 281 indicated that Q>10 is established, the direction of rotation of the motor is reversed at step S281, M is rendered to be equal to 30 at step S283 and the program flow returns to step S263. This means that the motor is driven in a reverse direction to eliminate an obstruction. The same process is carried out according to the flow from step S263, and if desired encoder position is not found at step S269; a decision is made at step S272 to determine (desired number of pulse+M (M being chosen to be a large value)>N); in such case a decision is made at step S273 to determine if it is the first time, but since it is the second time, step S284 determines a motor trouble, followed by a trouble processing at step S285.

Also, when the decision at step S267 indicates that the motor rotation is in a direction towards the low flame position, the following contents changes for the convenience of processing, which will now be described. Step S268 (N=N+1) at which the number of pulses is counted is replaced by step S286 (N=N−1) and step S271 (desired number of pulse+M>N) at which the decision is made to determine if the value equal to the sum of the desired number of pulses plus the predetermined value M is replaced by step S287 (desired number of pulses−M<N). Other program flow steps than those flow steps remain identical. This reflects the consideration in which without the motor being determined as out of order at a time the motor is operated at a normal torque and in the event that no desired position is available after all, the motor is driven in a reverse direction to detour the obstruction before the desired position is attained. On account of the foregoing, in the event of occurrence of the motor error, any possible waste of electric power which would occur when the motor is operated at an excessive torque to overcome the viscosity of grease at the time of initial movement, freezing of the seal or any other cause of lack of torque and, even so, any possible claim that no operation take place even though carefully handled can be resolved.

The foregoing gas power adjustment can be equally applicable to the automatic cooking mode, and the relationship between the automatic cooking mode and the gas power adjustment will be described with reference to FIG. 10, FIGS. 22A to 22C, and FIGS. 23 and 24.

The cooking mode selection within the left burner drive determining unit 59 and the automatically determined cooking mode in which no mode selection is made will be described. In the case of the left-hand burner 1, there is two cases in which when a cooking mode designation is given from the control panel 5 and in which no cooking mode instruction is given from the control panel 5. Therefore, a cooking mode determining unit 83 within the left burner drive determining unit 59 executes one of two processing flows shown in FIGS. 22A to 22C and FIGS. 23 and 24.

Figure 22A:
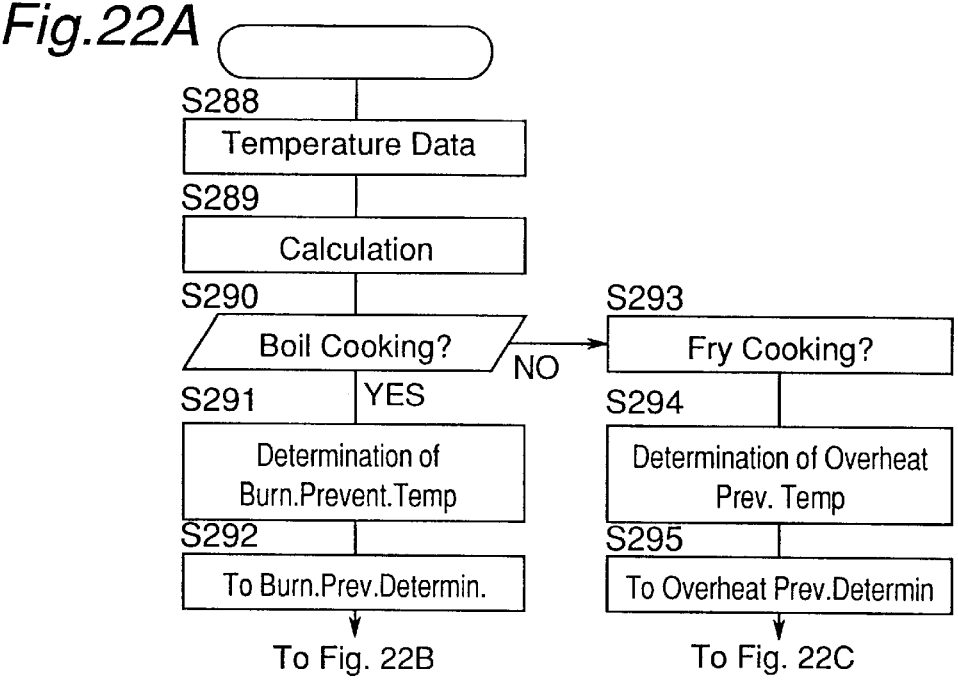
FIGS. 22A, 22B and 22C are schematic flowcharts showing the operation of an automatically determined cooking mode employed in the gas flow control apparatus.
Figure 22B:
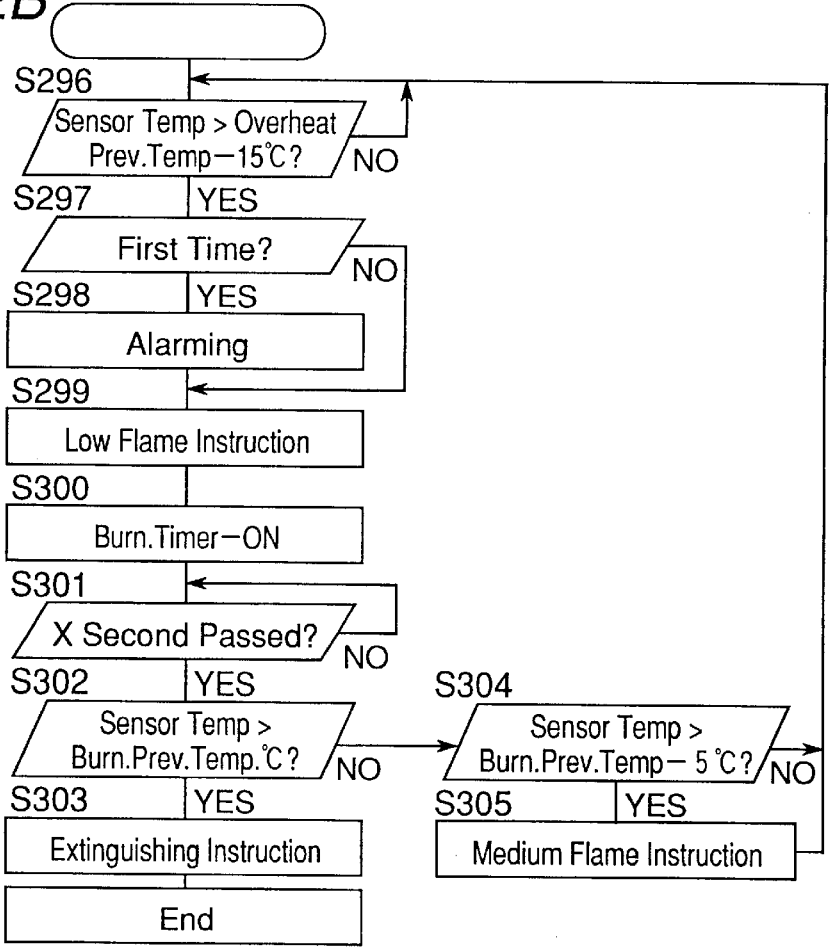
Figure 22C:
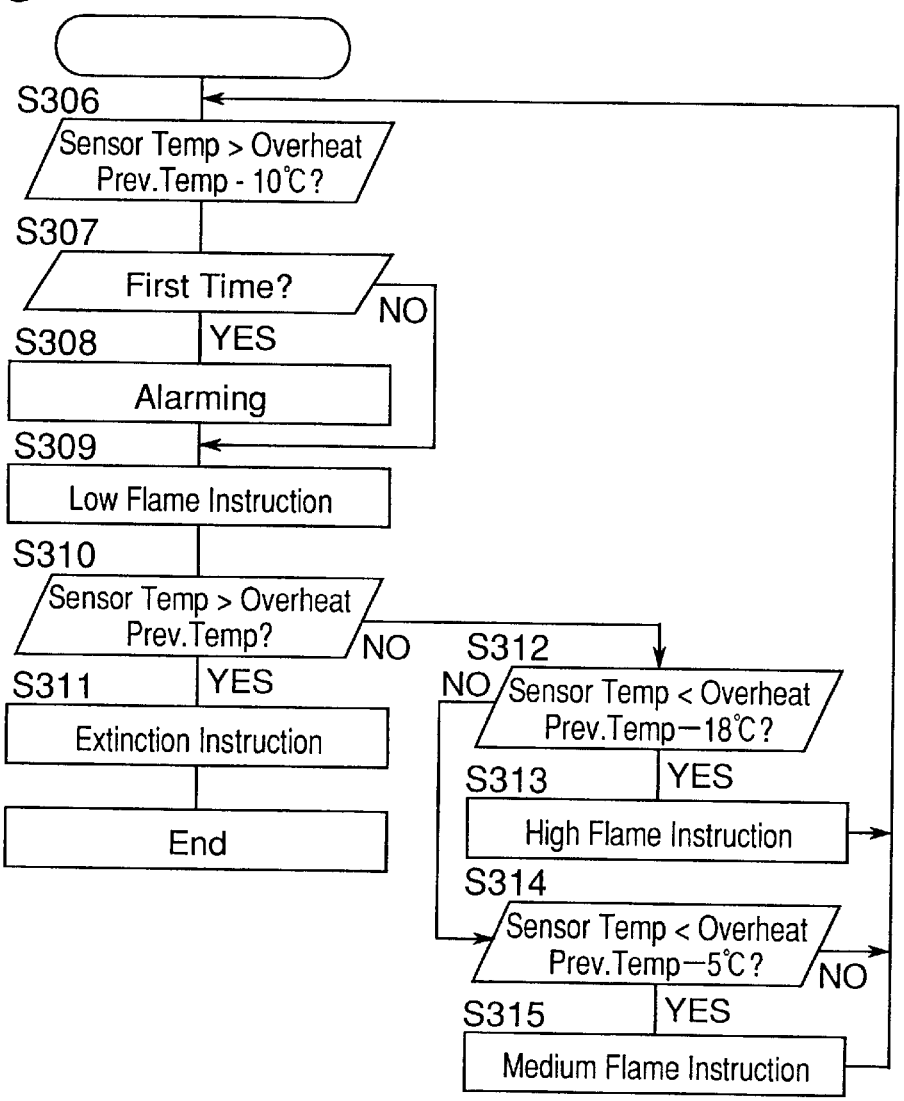

When in the absence of the cooking mode designation from the control panel 5 the left-hand burner 1 is ignited, the program flow shown in FIGS. 22A to 22C is executed.

Referring to FIG. 22A, the temperature determining unit 82 reads at step S288 the temperature detected by the pan bottom temperature sensor 2, performs a calculation of the temperature data at step S289 and inputs a result of the calculation into the cooking mode determining unit 83. The cooking mode determining unit 83 determines at step S290 based on the result of the calculation if it is a boil cooking and, in the event of the boil cooking, a bum preventive temperature is determined at step S291 based on the boiling temperature, followed by a process performed at step S292 by a burn prevention determining unit 84.

In the event that the decision at step S290 indicates that it is not the boil cooking, a fry cooking is determined at step S293 and an overheat preventive temperature for the fry cooking is determined at step S294 for monitoring any possible overheating of the food being fried, followed by a process performed at step S295 by the overheat prevention determining unit 85.

Thereafter, operation of various parts after the process has been transferred from the cooking mode determining unit 83 will now be described.

The sequence of operation of the burn prevention determining unit 84 that takes place after step S292 of the process of the cooking mode determining unit 83 is shown in FIG. 22B. At step S296, a determination of a condition (Sensor Temperature>Bum Preventive Temperature −15° C.), wherein the sensor temperature represents the temperature detected by the pan bottom temperature sensor 2, is made at step S296, followed by a decision at step S297 to determine if this condition has been established for the first time. Should this condition have been established for the first time, an alarm is given by, for example, a buzzer. On the other hand, if it is not for the first time, it means that burning would eventually occur, but since it is suspected that some time would require before the burning takes place actually and, therefore, a command necessary to set the left burner gas flow control unit 29 to the low flame position is outputted at step S299 to the left burner drive determining unit 59. The left burner drive determining unit 59 causes the flow control mechanism 33 to be driven by the motor 34 to thereby performs a control of lowering the combustion power so that the gas power adjustment can be set at the low flame position.

Then, at step S300, the bum prevention timer is activated, followed by step S301 at which a decision is made to determine a length of time X (second) has already passed. If the length of time X has already passed, a decision of a condition (Sensor Temperature>Burning Preventive Temperature) is carried out at step S302. If this condition establishes it can be determined that burning takes place and, therefore, the left burner gas flow control unit 29 is closed (OFF) at step S303 under the control of the left burner drive determining unit 59.

In the event that the condition (Sensor Temperature>Burn Preventive Temperature) as determined at step S302 does not establish and the sensor temperature is therefore still lower than the temperature at which burning takes place, a decision of another condition (Sensor Temperature>Burn Preventive Temperature −5° C.) is carried out at step S304 and, if this condition establishes, a command for setting the gas flow control unit 33 to the medium flame position is outputted to the drive determining unit 59 at step S305, but if that condition does not establish, the program flow returns to step S296.

By the process performed by the bum preventive determining unit 84, a process for preventing a burning during the boil cooking can be performed based on the detection of the temperature of the bottom of a pan detected by the pan bottom temperature sensor 2 and, therefore, the user left distant from the gas cooking range, a process for interrupting combustion at the left-hand burner 1 can be executed before the burning takes place actually.

The sequence of operation of the overheat preventive determining unit 85 that takes place subsequent to step S295 of the process of the cooking mode determining unit 83 is shown in FIG. 22C.

At step S306, a decision of a condition (Sensor Temperature>Overheat Preventive Temperature −10° C.) is carried out and, if this condition establish, another decision is made at step S307 to determine whether or not it is for the first time. If it is for the first time, a buzzer is activated to give an alarm at step S308 and a command necessary to drive the gas flow control unit 29 to the low flame position is outputted to the left burner drive determining unit 59. On the other hand, if the decision at step S307 indicates that it is not for the first time, the program flow goes to step S309 without the buzzer being activated. Thereafter, a decision of another condition (Sensor Temperature>Overheat Preventive Temperature) is carried out at step S310 and if the condition establishes, it means that overheating occurs and, therefore a command necessary to close the gas flow control unit 33 is outputted to the left burner drive determining means 50 at step S311 with the program flow subsequently terminating.

On the other hand, if the condition as determined at step S310 does not establish, a decision of a condition (Sensor Temperature<Overheat Preventive Temperature −18° C.) is carried out at step S312. If this condition establish, a command necessary to control the gas flow control unit 29 to the high flame position is outputted to the left burner drive determining unit 59 at step S313 and the program flow subsequently returns to step S306. If the condition does not establish, another decision of a condition (Sensor Temperature<Overheat Preventive Temperature −5° C.) is carried out at step S314 and a command necessary to control the gas flow control unit 29 to the medium flame position is outputted to the left burner drive determining unit 59 at step S315 and the program flow subsequently return to step S306.

By the foregoing sequence of operation, it is possible to avoid any possible hazardous situation in which if the user making Tempura leaves distant from the gas cooking range, Tempura oil may be overheated to such an extent as to result in a fire.

Hereinafter, the case in which the cooking mode setting is carried out will be descried with reference to FIGS. 23 and 24.

Even when the cooking mode setting input is effected with the cooking mode setting key, the program flow from step S288 to step S295 that take place when no cooking mode setting input is not effected is carried out so that the cooking mode determining unit can set a cooking mode based on the temperature of a pan, detected by the pan bottom temperature sensor 2, and a cooking mode instruction inputted from the control panel 5. The bum prevention determining unit 84 in the case of the boil cooking, or the overheat prevention determining unit 85 in the case of the fry cooking, or the water boiling determining unit 87 in the case of the water boiling is activated. Also, as regards the temperature adjustment during the cooling mode set in the manner described above, a temperature management is executed by activating the temperature adjustment determining unit 86.

Figure 23:
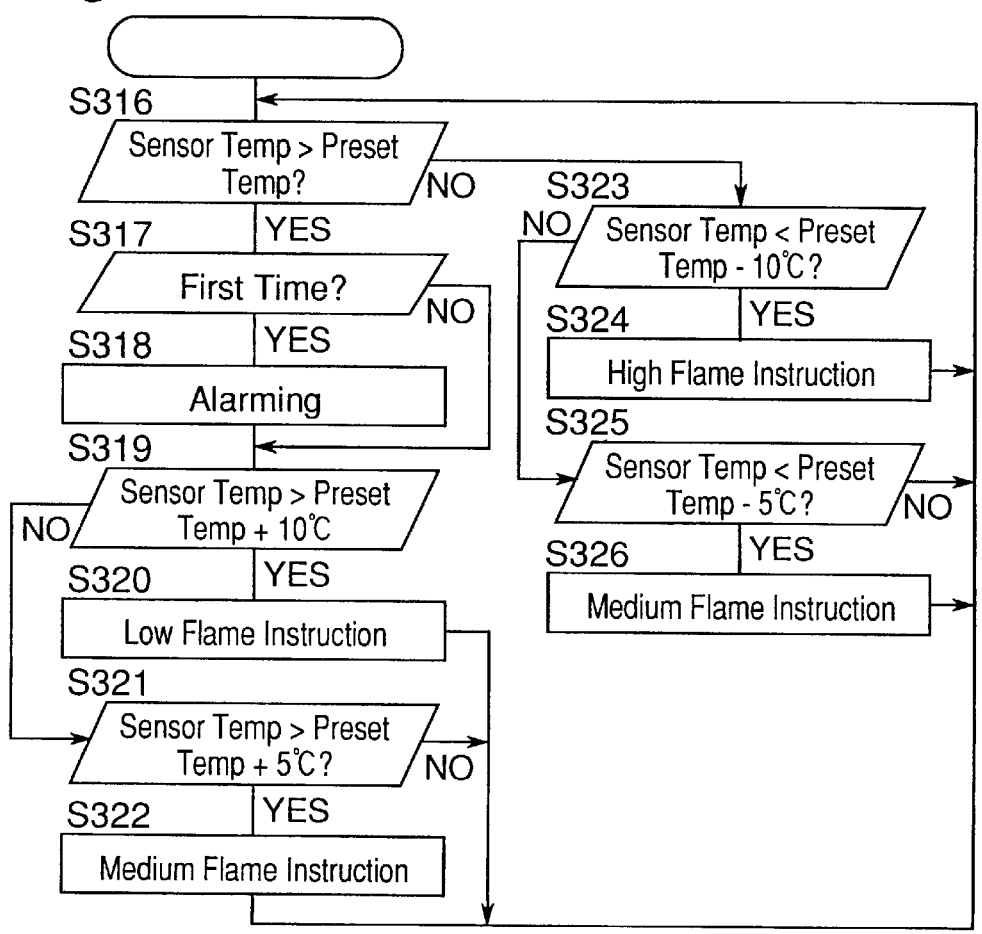
FIG. 23 is a schematic flowchart showing the operation of the automatically determined cooking mode employed in the gas flow control apparatus.

The sequence of operation of the temperature adjustment determining unit 86 for the Tempura mode, which takes place subsequent to step S48 of the process of the cooking mode determining unit 83 is shown in FIG. 23. At the outset, a decision of a condition (Sensor Temperature>Preset Temperature) is made at step S316. If this condition establishes, a decision is made at step S317 to determine whether or not it is for the first time and, in the event of the first time, a buzzer is activated at step S318 to give an alarm. Then, if it is not for the first time, a decision of a condition (Sensor Temperature>Preset Temperature +10° C.) is carried out at step S319. When this condition establish, a command necessary to accomplish a drive control to bring the gas flow control unit 29 to the low flame position is outputted to the left burner drive determining unit 34 at step S320 and the program flow returns to step S316. Conversely, if the condition does not establish, a decision of a condition (Sensor Temperature>Preset Temperature +5° C.) is carried out at step S321 and, if this condition establishes, a command necessary to accomplish a drive control to bring the gas flow control unit 29 to the medium flame position is outputted to the left burner drive determining unit 59 at step S322, the program flow subsequently returning to step S316.

Should the condition as determined at step S316 not establish, a decision of a condition (Sensor Temperature<Preset Temperature −10° C.) is carried out at step S323 and, if this condition establish, a command necessary to accomplish a drive control to bring the gas flow control unit 29 to the high flame position is outputted to the left burner drive determining unit 59 at step S324, but if the condition does not establish, a decision of a condition (Sensor Temperature<Preset Temperature −5° C.) is carried out at step S325 and if this condition establish, a command necessary to accomplish a drive control to bring the gas flow control unit 29 to the medium flame position is outputted to the left burner drive determining unit 59 at step S326, the program flow subsequently returning to step S316.

By the foregoing sequence of operation, it is possible to provide the gas appliance in which the oil temperature can be controlled to a preset temperature and tasteful fried foods can be prepared at a temperature controlled to a value suitable for Tempura cooking.

Figure 24:
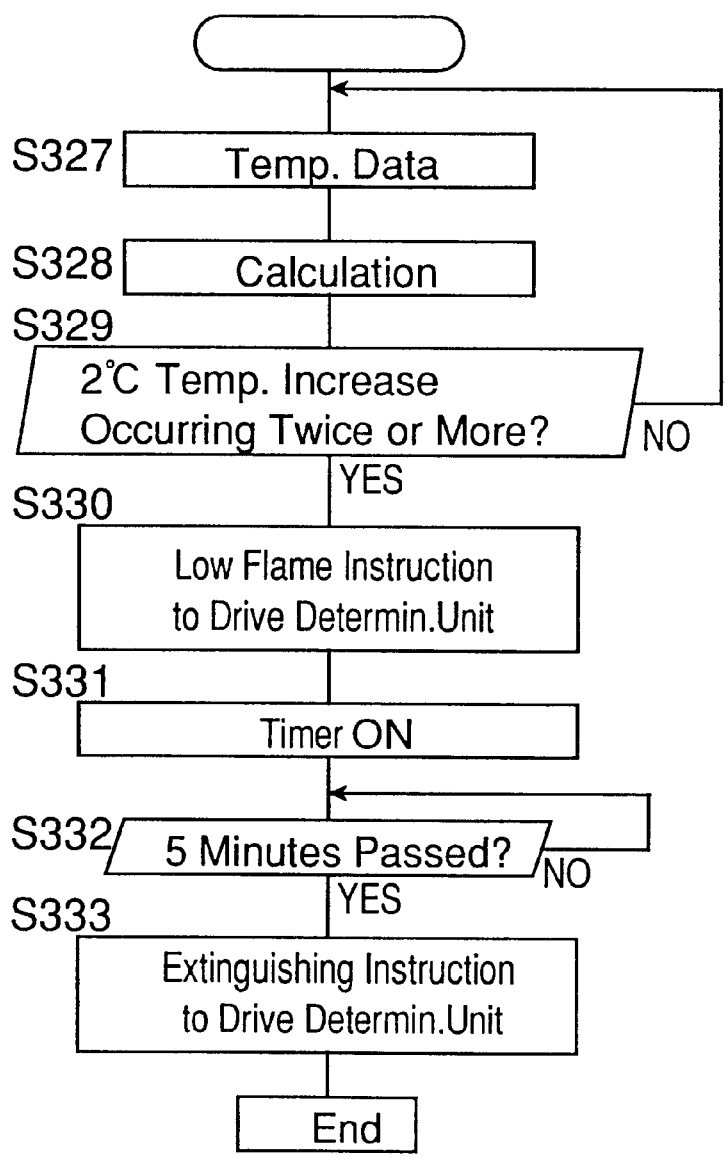
FIG. 24 is a schematic flowchart showing the operation of the automatically determined cooking mode employed in the gas flow control apparatus.

The process of the water boiling determining unit 87 which takes place subsequent to step S48 of the process of the cooking mode determining unit 83 is shown in FIG. 24. Temperature data from the temperature determining unit 82 are acquired at step S327 and are then calculated at step S328. At subsequent step S329, a decision at step S329 is made to determine whether or not, based on a result of the calculation, a condition in which 2° C. increase of temperature as compared with the temperature exhibited 60 second preceding the measurement takes place twice continuously. Since the temperature increase occur little when the water boiling temperature attains a boiling point, establishment of this condition means that boiling takes place and, thereafter, a command necessary to accomplish a drive control to bring the gas flow control unit 29 to the low flame position is outputted to the left burner drive determining unit 59 at step S330. At step S331, a timer is activated to could time, passage of five minutes is then counted at step S332, and the gas flow control unit 29 is closed at step S333 to accomplish an automatic extinction at the time five minutes has passed.

By the foregoing sequence of operation, it is possible to provide a convenient water boiling function in which after water has been boiled, the gas power can be automatically set to the low flame position that lasts for five minutes to remove smell of chlorine before the automatic extinction.

As described above, in the case of the left-hand burner 1, combustion taking place in the left-hand burner 1 incident to each of the processes starting from the cooking mode determining unit 83 can be automatically controlled by the left burner drive determining unit 59.

Figure 25A:
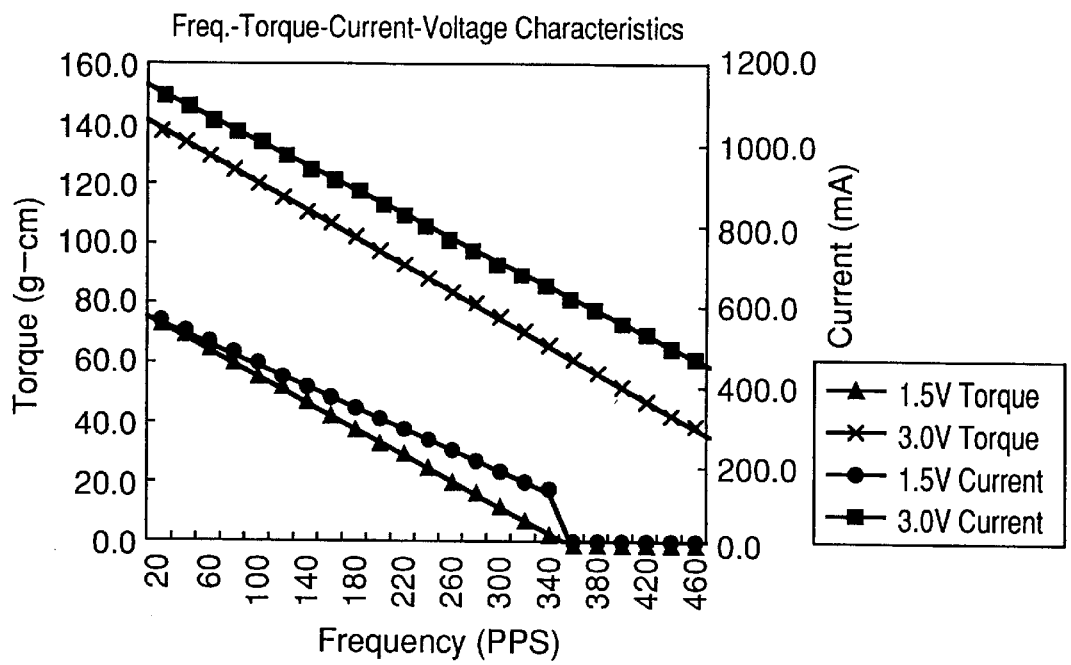
FIGS. 25A and 25B are characteristic charts of a stepping motor employed in the gas flow control apparatus.

The electricity saving determining means 57 and the motor speed control means 76 will now be described. FIG. 25A illustrates a general characteristics of the stepping motor 34 wherein the axis of abscissas represents torque and current and the axis of ordinates represents the frequency of pulses for the motor drive and wherein curves represent torque and consumed current at 1.5 volt and 3.0 volts, respectively. Assuming that the torque necessary to drive the mechanism of the gas flow control unit 29 is 50 g-cm, the stepping motor 34 would consume 410 mA at 1.5V and 120 Hz and 554 mA at 3.0V and 52.4 g-cm. (It is however to be noted that depending on the motor that is a limitation that the motor can no longer operate at a frequency higher than that frequency characteristic.) Detailed numerals are tabulated in Table 1 below.

TABLE 1

(Unit: mA)

| Freq. | 1.5 V Torque | 3.0 V Torque | 1.5 V Current | 3.0 V Current |
|---|---|---|---|---|
| 20 | 72.5 | 137.2 | 542.5 | 1109.5 |
| 40 | 68.2 | 132.8 | 517.1 | 1080.3 |
| 60 | 63.9 | 128.3 | 491.6 | 1051.1 |
| 80 | 59.6 | 123.8 | 466.2 | 1021.9 |
| 100 | 55.3 | 119.4 | 440.7 | 992.6 |
| 120 | 50.9 | 114.9 | 415.3 | 963.4 |
| 140 | 46.6 | 110.4 | 389.8 | 934.2 |
| 160 | 42.3 | 106.0 | 364.4 | 905.0 |
| 180 | 38.0 | 101.5 | 338.9 | 875.8 |
| 200 | 33.7 | 97.1 | 313.5 | 846.6 |
| 220 | 29.4 | 92.6 | 288.0 | 817.4 |
| 240 | 25.1 | 88.1 | 262.6 | 788.2 |
| 260 | 20.8 | 83.7 | 237.1 | 758.9 |
| 280 | 16.5 | 79.2 | 211.6 | 729.7 |
| 300 | 12.2 | 74.8 | 186.2 | 700.5 |
| 320 | 7.9 | 70.3 | 160.7 | 671.3 |
| 340 | 3.6 | 65.8 | 135.3 | 642.1 |
| 360 | 0.0 | 61.4 | 0.0 | 612.9 |
| 380 | 0.0 | 56.9 | 0.0 | 583.7 |
| 400 | 0.0 | 52.4 | 0.0 | 554.5 |
| 420 | 0.0 | 48.0 | 0.0 | 525.2 |
| 440 | 0.0 | 43.5 | 0.0 | 496.0 |
| 460 | 0.0 | 39.1 | 0.0 | 466.8 |

Also, the lower frequency at which the maximum torque can be obtained, the higher the torque, and in the case of 1.5V, there is a difference of a magnitude of 1.42 times (=72.5/05.9) at 20 Hz and 120 Hz and, therefore, how the pulse output is dealt whit during a normal use it is an important problem in terms of the consumed current and the characteristic. Also, the current varies in proportion thereto and, in the case where the power source is constituted by a battery, unless the consumed current is minimized, the battery will run out quickly, making it impossible for the gas cooking range of the present invention to be accepted in the market.

Figure 25B:
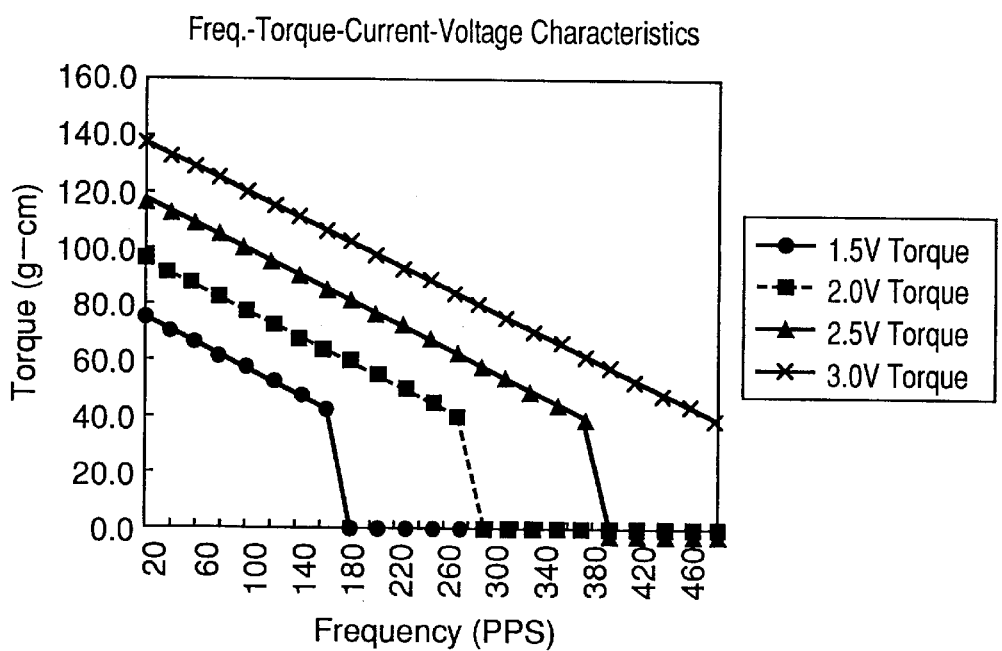

FIG. 25B illustrates a graph showing the relationship between the frequency and the torque at 1.5 to 3 volts, wherein the axis of abscissas represents the torque and the axis of ordinaries represents torque every 0.5 volt within the range of 1.5 to 3.0 volts. To secure the torque of 50 g-cm, it will readily be seen 120 PPS at1.5V, 200 PPS at 2.0V, 300 pps at 2.5V, and 400 PPS at 3.0V Accordingly, for the same torque, the frequency should be changed in unison with the voltage. Specific values are tabulated in Table 2 below.

TABLE 2

(Unit: mA)

| Freq. | 1.5 V Torque | 2.0 V Torque | 2.5 V Torque | 3.0 V Torque |
|---|---|---|---|---|
| 20 | 72.5 | 95.2 | 116.5 | 137.2 |
| 40 | 68.2 | 90.6 | 111.9 | 132.8 |
| 60 | 63.9 | 86.0 | 107.3 | 128.3 |
| 80 | 59.6 | 81.3 | 102.7 | 123.8 |
| 100 | 55.3 | 76.7 | 98.2 | 119.4 |
| 120 | 50.9 | 72.0 | 93.6 | 114.9 |
| 140 | 46.6 | 67.4 | 89.0 | 110.4 |
| 160 | 42.3 | 62.8 | 84.4 | 106.0 |
| 180 | 0.0 | 58.1 | 79.9 | 101.5 |
| 200 | 0.0 | 53.5 | 75.3 | 97.1 |
| 220 | 0.0 | 48.8 | 70.7 | 92.6 |
| 240 | 0.0 | 44.2 | 66.1 | 88.1 |
| 260 | 0.0 | 39.6 | 61.6 | 83.7 |
| 280 | 0.0 | 0.0 | 57.0 | 79.2 |
| 300 | 0.0 | 0.0 | 52.4 | 74.8 |
| 320 | 0.0 | 0.0 | 47.8 | 70.3 |
| 340 | 0.0 | 0.0 | 43.3 | 65.8 |
| 360 | 0.0 | 0.0 | 38.7 | 61.4 |
| 380 | 0.0 | 0.0 | 0.0 | 56.9 |
| 400 | 0.0 | 0.0 | 0.0 | 52.4 |
| 420 | 0.0 | 0.0 | 0.0 | 48.0 |
| 440 | 0.0 | 0.0 | 0.0 | 43.5 |
| 460 | 0.0 | 0.0 | 0.0 | 39.1 |

An example designed to accomplish electricity saving of the battery and the torque control will be demonstrated.

Figure 26A:
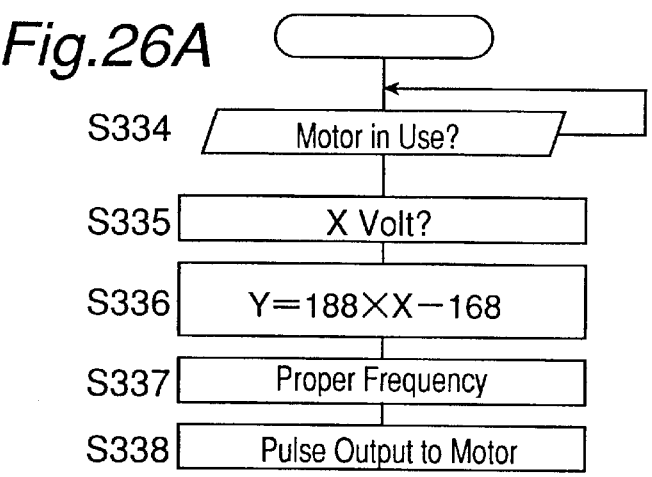
FIGS. 26A and 26B are schematic flowcharts showing the sequence of an energy-saving torque control employed in the gas flow control apparatus.

Referring to FIG. 26A, at step S334 a decision is made by a means for using 3 to 1.5 volts at a constant torque to determine if the motor is in use and, if it is in use, a decision is made at step S335 to determine if the battery voltage detected by the voltage detecting means 57 and determined by the voltage determining means 81 is XV, so that in order to calculate a proper motor pulse frequency effective to secure the torque appropriate to the voltage, the frequency appropriate to the voltage is determined by the use of a linear approximation determined with reference to FIG. 25. Specifically, at step S335, Y=188X−168 is determined and the determined frequency is formulated at step S337 by the use of a microcomputer, followed by outputting of pulses to the motor at step S338. It is to be noted that Y represents an output frequency and X represents a voltage applied to the motor.

However, means for linearly varying the output frequency requires the use of a separate frequency converter and, in the event that the use of the separate frequency converter in the gas cooking range is not cost-effective, it is preferred to employ a stepwise frequency control system in which, without the separate frequency converter used, the frequency is divided by clocks used in the microcomputer. The method based on this stepwise frequency control system is schematically shown in FIG. 26B.

Figure 26B:
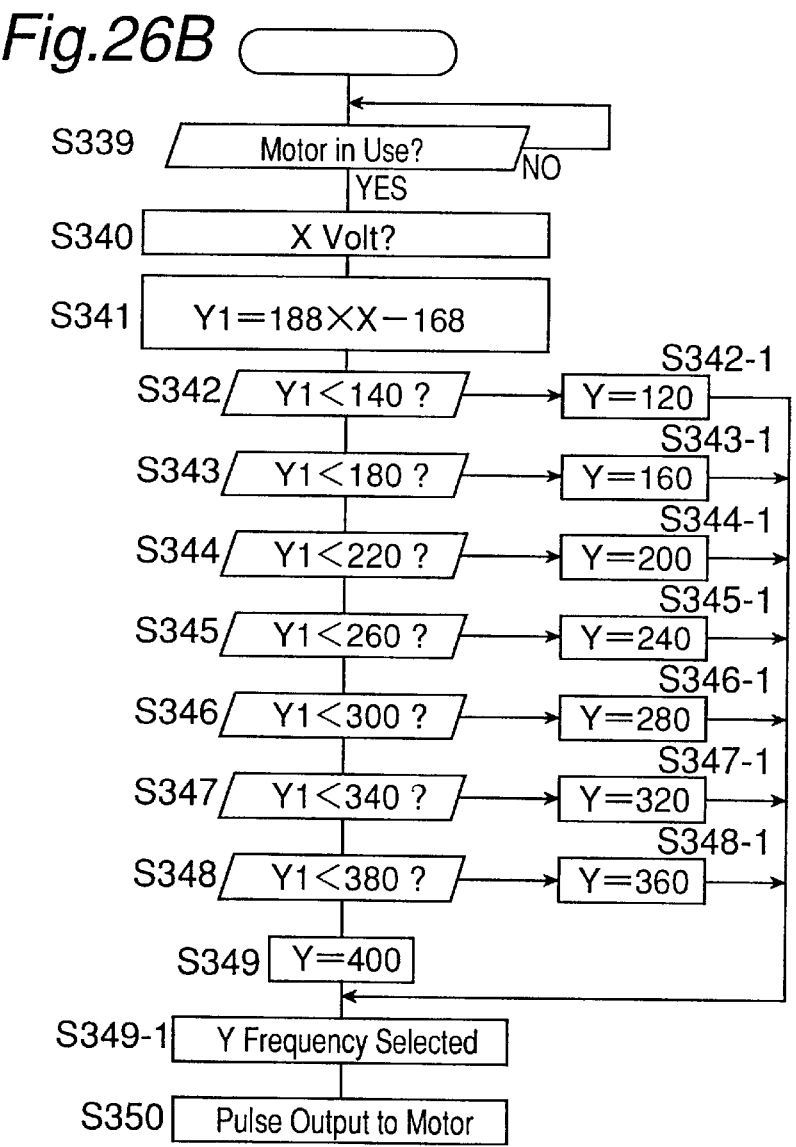

Referring to FIG. 26B, a decision is made at step S339 to determine by a means for using 3 to 1.5 volts at a constant torque to determine if the motor is in use and, if it is in use, a decision is made at step S340 to determine if the battery voltage detected by the voltage detecting means 57 and determined by the voltage determining means 81 is XV. If the battery voltage is found to be XV as determined at step S340, the linear approximation determined with reference to FIG. 25 is used to determine the frequency appropriate to the voltage so that a proper motor pulse frequency effective to secure the torque appropriate to the voltage can be calculated. In other words, Y1=188X−168 is determined at step S341 and depending on the result of this calculation, the following sequence takes place:

if Y1<140 at step S342, the flow goes to step S342-1 to render Y to be 120, if Y1<180 at step S343, the flow goes to step S343-1 to render Y to be 160, if Y1<220 at step S344, the flow goes to step S344-1 to render Y to be 200, if Y1<260 at step S345, the flow goes to step S345-1 to render Y to be 240, if Y1<300 at step S346, the flow goes to step S346-1 to render Y to be 280, if Y1<340 at step S347, the flow goes to step S347-1 to render Y to be 320, if Y1<380 at step S348, the flow goes to step S348-1 to render Y to be 360, and other than that, the flow goes to step S349 to render Y to be 400, and the frequency specified by the microcomputer is set at step S349-1, followed by outputting of pulses to the motor at step S350.

By the foregoing sequence, operation is possible by the frequency division of the clock pulses of the microcomputer and the driving mechanism using simplified and inexpensive circuits and capable of accomplishing an electricity saving at the constant torque can be assembled.

The following is an example of electricity saving and is illustrative of means utilizing change in voltage in the form of change in duty while the frequency is fixed, and in the characteristic chart shown in FIG. 25, assuming that the torque required at 1.5V is 50 g-cm, the required frequency is 120 Hz and, similarly, the frequency is 400 Hz when at 3V.

In order to render the frequency to be constant, 120 PPS is fixed at 1.5V and the required torque can be secured if the electric power of only ⅓ thereof is supplied at 3V. In other words, the duty ratio is 30%. This system is featured in that the control of the gas power adjustment is possible with the speed fixed regardless of the battery voltage, that is, at a constant speed regardless of whether the battery is new or old, thereby accomplishing the electricity saving feature.

FIG. 27A illustrates the pulse output at 1.5V, in which the duty ratio is 100% and the fundamental frequency is 120 PPS. Accordingly, the electric power required to output the torque required at 1.5V can be supplied.

FIG. 27B illustrates the pulse output at 3.0V, in which the duty ratio is 30% and the fundamental frequency is 120 PPS. Since the voltage is twice that at 1.5V and the length of time during which the supply take place is reduced to ⅓, the amount of the electric power supplied is substantially the same as at 1.5V.

FIG. 27C illustrates the pulse output at 2.5V, in which the duty ratio is 40% and the fundamental frequency is 120 PPS. Since the voltage is 1.67 times that at 1.5V, the supply time is 40%.

Figure 28A:
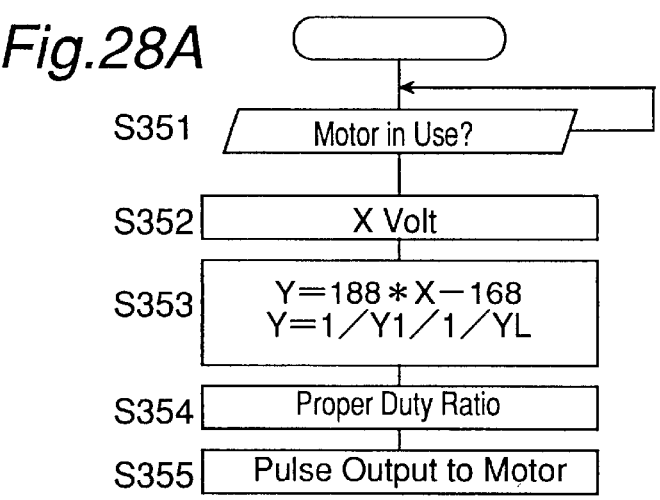
FIGS. 28A and 28B are flowcharts showing the sequence of the energy-saving torque control employed in the gas flow control apparatus.

FIG. 28A illustrates a schematic flow thereof, in which when a decision is made at step S351 to determine if the motor is in use. If the motor is in use, a decision is made at step S352 to determine if the battery voltage detected by the voltage detecting means 57 and determined by the voltage determining means 81 is X. Based on the voltage X, Y1=188X−168, (wherein Y1 represents the frequency and X represents the voltage at that time) is calculated and the duty ratio is subsequently determined followed by calculation of Y=1/Y1/1/ YL (wherein Y represents the duty ratio and YL represents the fundamental frequency (120 PPS)) to determine Y at step S354. At step S355, the pulses are outputted to the motor at the duty ratio so determined.

Figure 28B:
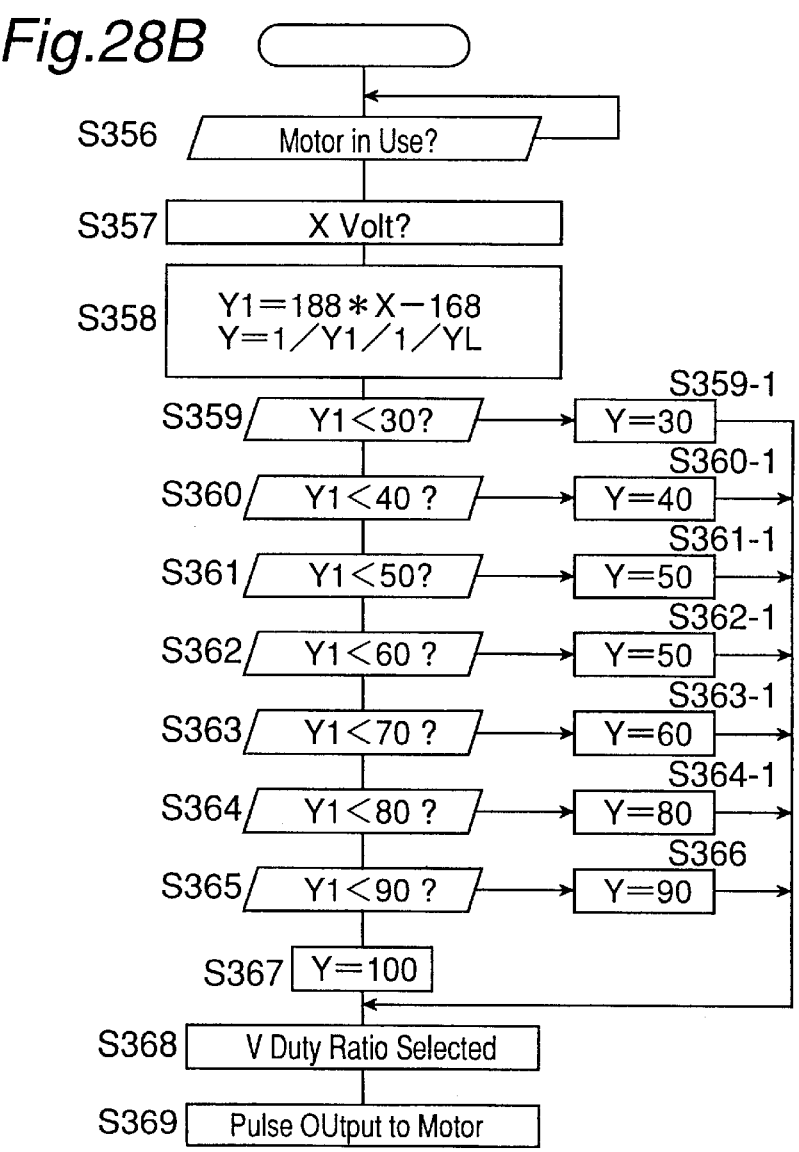

The foregoing method has a demerit in that since the duty ratio is proportioned to the voltage by means of the microcomputer software processing for the duty control the microcomputer software processing tends to become complicated with too many interruption process which would otherwise result in an erroneous operation. Means for eliminating this problem is shown in FIG. 28B. FIG. 28B illustrates a schematic flowchart showing a method in which the duty ratio referred to above is divided stepwise and the pulse output is carried out using any of the divided duty ratios. Referring to FIG. 28B, a decision is made at step S356 to determine if the motor is in use. If the motor is in use, a decision is made at step S357 to determine if the battery voltage detected by the voltage detecting means 57 and determined by the voltage determining means 81 is X. Based on the voltage X, Y1=188X−168, (wherein Y1 represents the frequency and X represents the voltage at that time) is calculated and the duty ratio is subsequently determined followed by calculation of Y=1/Y1/1/YL (wherein Y represents the duty ratio and YL represents the fundamental frequency (120 PPS)) to determine Y at step S358. The duty ratio so determined is processed in the following sequence;

if Y1<30 at step S359, the flow goes to step S359-1 to render Y to be 30, if Y1<40 at step S360, the flow goes to step S360-1 to render Y to be 40, if Y1<50 at step S361, the flow goes to step S361-1 to render Y to be 50, if Y1<60 at step S362, the flow goes to step S362-1 to render Y to be 60, if Y1<70 at step S363, the flow goes to step S363-1 to render Y to be 70, if Y1<80 at step S364, the flow goes to step S364-1 to render Y to be 80, if Y1<90 at step S365, the flow goes to step S365-1 to render Y to be 90, if Y1<90 at step S365, the flow goes to step S367-1 to render Y to be 100, and the duty ratio is selected at step S368, followed by outputting of the pulses to the motor at step S369.

This is for the purpose of minimizing the erroneous operation by means of synchronization with the frequency divided pulses of the microcomputer.

Although the foregoing has been a description associated with the electricity saving and the constant speed control, a method associated with a high torque output for avoiding an abnormality by temporarily applying a high torque during an abnormality processing in the event that the flow control unit is abnormal and does not therefore operate will now be described. The mechanism of each of the gas flow control units 29, 30 and 31 is gas-sealed by means of the O-ring mounted on the movable shaft as hereinbefore described and, in particular at the initial stage of operation, seizure of the O-ring will occur. The lower the temperature, the stronger this seizure. Also, there is a factor in which under the influence of dust and/or debris deposited on a portion of the slide shutter 33-3 of the movable unit, the movement of the slide shutter will become dull.

For these reasons, care has been paid so that the motor is driven at a torque corresponding to the normally required torque combined with a safety factor and, therefore, the motor is operated at the unnecessary torque during the normal use, accompanied by undue consumption of the electric power. The present invention provides means for actuating the motor at a proper torque by making a division between the normal use and the initial use.

Figure 29:
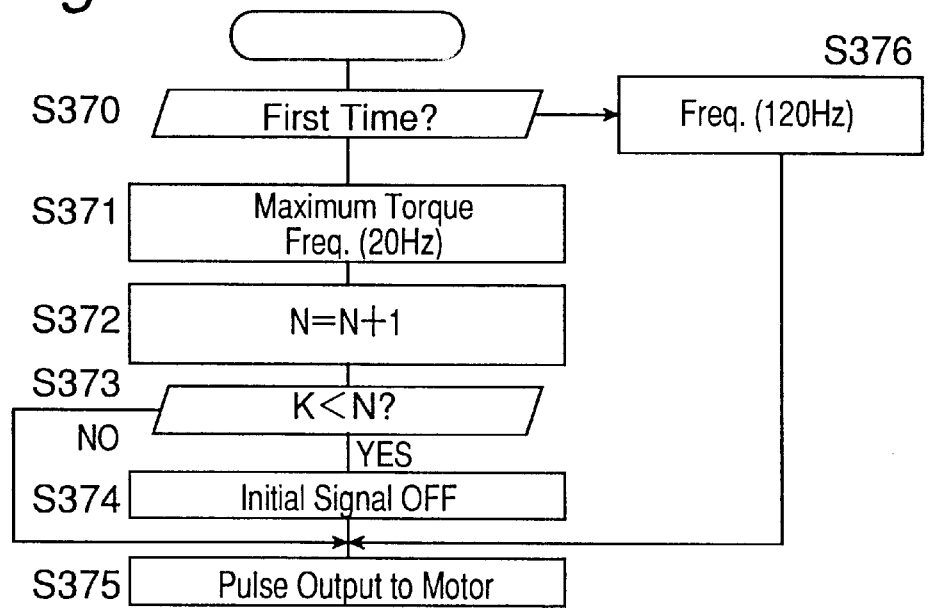
FIG. 29 is a schematic flowchart showing the sequence of a speed control employed in the gas flow control apparatus.

According to the electricity saving determining means as shown in FIG. 29, a decision is made at step S370 to determine if a motor drive instruction is given for the first time. If it is for the first time, the motor drive frequency is rendered to be a maximum torque frequency at step S371; the pulses are counted by a pulse counter at step S372; a decision is made at step S373 to determine if the pulse number N is greater than K; and if the pulse number is greater than K, an initial signal is released at step S374. If the pulse number is smaller than K, a pulse output is outputted to the motor at a maximum torque frequency at step S375. If a result of decision S370 indicates that it is not for the first time as at step S376, the pulse output is outputted to the motor at an usual, electricity saving frequency at step S375.

By the foregoing, it is possible to accomplish the electricity saving and to avoid any trouble. The reason for the necessity of a predetermined number K of outputs is because unless the number of pulses sufficient to compensate for the rattles occurring in the mechanism is secured, the object of the present invention cannot be attained.

While description has been made to the initial torque, this process can be performed even at the time of occurrence of an abnormality and the electricity saving can equally be attained.

As a second version of the embodiment although not shown, a method is also available in which the motor is operated at all times at the frequency of a maximum torque with the duty ratio utilized to achieve the above described objective. However, this method requires determination of the gas power adjusting speed to be determined to find a speed appropriate to a particular cooking in the case where the gas power adjusting speed is desired to be low.

The method of the gas power adjusting speed control will now be described. The gas power adjustment in the gas cooking range is necessitated in view of the following contents. By way of example, in view of the relation between the encoder position shown in FIG. 5 and the igniting position, ignition is effected at the medium high flame position which is the igniting position, spaced from the closed position through the low, medium low and medium flame positions. While at the medium high flame position an ignition plug 22 is discharged to ignite gas, the flow of the gas and the timing of discharge is such that when the discharge is effected while the gas flow is small, a backfiring in which combustion takes place within the interior of the burner will occur because of a lean gas. Accordingly, if the speed of movement towards the medium high flame position is low, the gas will fill up inside the burner which will eventually result in a hazardous explosion and, accordingly, it is necessary to quickly move to the igniting position at the time the gas is desired to be ignited. Also, when the strong combustion is changed to a weak combustion such as occurring when boil over is likely to occur and, hence, a low flame is desired, the high speed is preferred. However, an abrupt change in gas power will result in a backfiring and then quick extinction. If to eliminate this abrupt extinction, the speed is reduced from one place preceding the low flame position, red flames will occur as a result of a temporal lack of insufficient air, resulting in a number of claims from the users.

Figure 30:
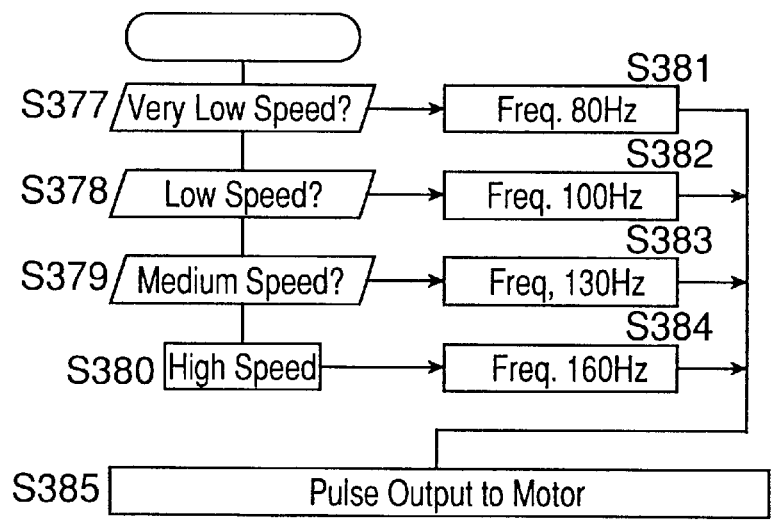
FIG. 30 is a schematic flowchart showing the sequence of the speed control employed in the gas flow control apparatus.

FIG. 30 illustrates an example of the speed control method, in which a very low speed, a low speed, a medium speed and a high speed are allocated to frequencies with reference to the characteristic chart of the motor shown in FIG. 25, By way of example, the very low speed is given 80 Hz, the low speed is given 100 Hz, the medium speed is given 130 Hz and the high speed is given 160 Hz so that one of those frequencies can be outputted according to a speed instruction to thereby accomplish the speed control.

At step S377 a decision is made if the speed instruction represents a very low speed and, it is the case, the frequency is rendered to be 80 Hz at step S381; if it is the low speed as determined at step S378, the frequency is rendered to be 100 Hz at step S382; if it is the medium speed as determined at step S379, the frequency is rendered to be 130 Hz at step S383; and if it is the high speed as determined at step S380, the frequency is rendered to be 160 Hz at step S384, the pulses being supplied to the motor at step S385 to thereby accomplish the speed control.

While in FIG. 30 the speed adjustment is effected by changing the frequency, the speed control can also be accomplished by an intermittent power supply of the frequency while the frequency is constant. This system is particularly advantageous in that the electricity saving can easily be achieved and, while the frequency conversion system can be worked out where the household AC power source is used, inconveniences would occur as a result of the change in voltage in the case of the battery power source and, therefore, where it should be used by all means, the necessity occur to employ a speed change control with torque priority and it is difficult to expect a complete speed control. To effect the speed control while the frequency is constant is an excellent system that covers up such a problem. Hereinafter a schematic method therefor will be described.

Figure 31A:
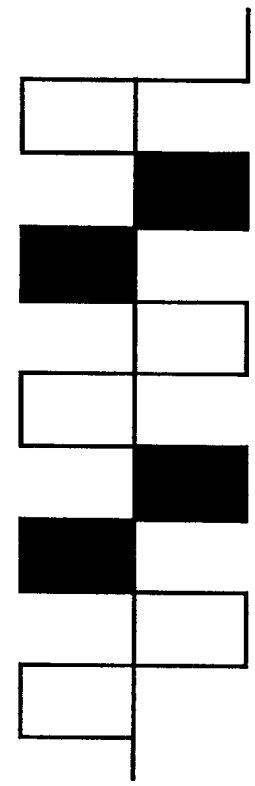
FIGS. 31A to 31D are explanatory diagrams showing the speed control employed in the gas flow control apparatus.
Figure 31C:
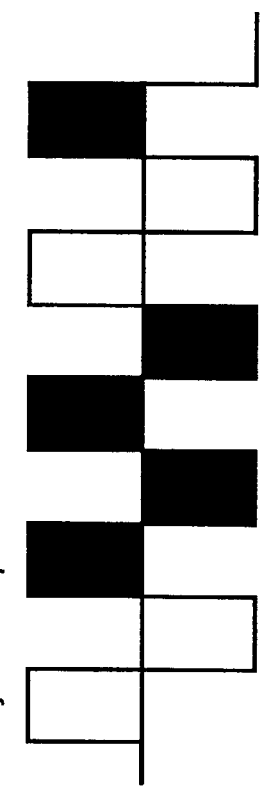
Figure 31B:
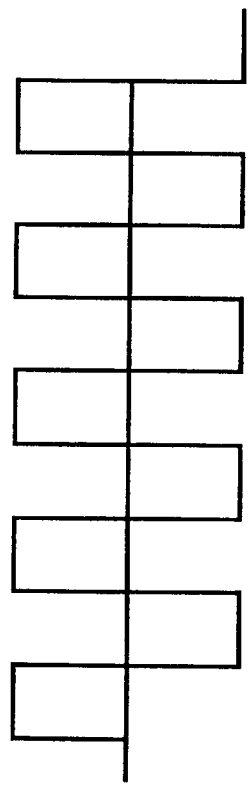
Figure 31D:
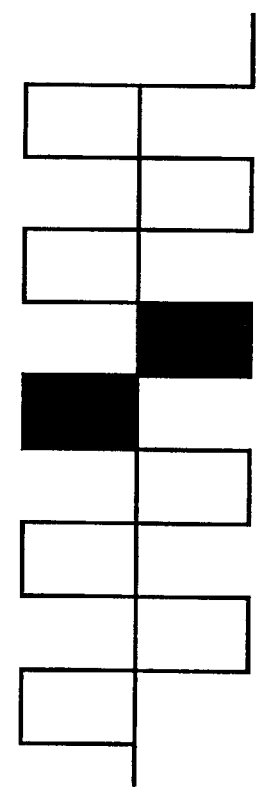

FIG. 31A illustrates a 100% (high) speed control in which the pulses are outputted at the constant frequency; FIG. 31B illustrates a 67% (medium) speed control in which the frequency is reduced by ⅓; FIG. 31C illustrates a 50% (low) speed control in which the frequency is halved (½); and FIG. 31D illustrates a 33% (very low) speed control in which the frequency is reduced by ⅔. This system brings about a merit in that since the torque can be kept constant and the speed is little of change as compared with the designated speed. The flow thereof will now be described.

Referring to FIG. 32, at step S386 a decision is made to determine if the motor speed control means 76 has issued a drive instruction and, at step S387 a decision is made to determine if the contents of the instruction from the previous state is a high speed. In the case of the high speed instruction, all pulses of the frequency are outputted at step S389 and step S386 is repeated until a halt instruction is issued. If it is not the high speed as determined at step s387, a decision is made at step S390 to determine if it is a medium speed and, if it is the medium speed, the number of pulses is counted by a counter at step S391. If the count of the counter is not 3 (or the count is 1 or 2) as determined at step S392, the pulses are outputted to the motor at step S394 and step S386 is repeated until the halt instruction is issued. If the count of the counter reads 3 as determined at step S392, the counter is initialized at step S393, followed by re-counting of the pulses at step S391. If the result of decision at step S390 indicates that it is not the medium speed, a decision takes place at step S395 to determine if it is a low speed. If it is the low speed, the pulses are counted by a counter at step S396 and, if the count of the counter is not 2 (or the count is 1) as determined at step S397, the pulses are outputted to the motor at step s399 and step S386 is repeated until the halt instruction is issued. If the count of the counter reads 2 as determined at step S397, the counter is initialized at step S398, followed by re-counting at step S396. If it is not the low speed as determined at step S395, a very low speed is determined at step S400 and, in such case, the pulses is counted by a counter at step S410. If the count of the counter at step S402 reads 3, the counter is initialized at step S403, the pulses are outputted to the motor at step S404 and step S386 is repeated until the halt instruction is issued. If the count of the counter reads 1 or 2 as determined at step S402, the pulses are again counted at step S401. By the foregoing contents, the speed adjustment for the gas power control appropriate to the cooking range can be achieved.

Figure 33:
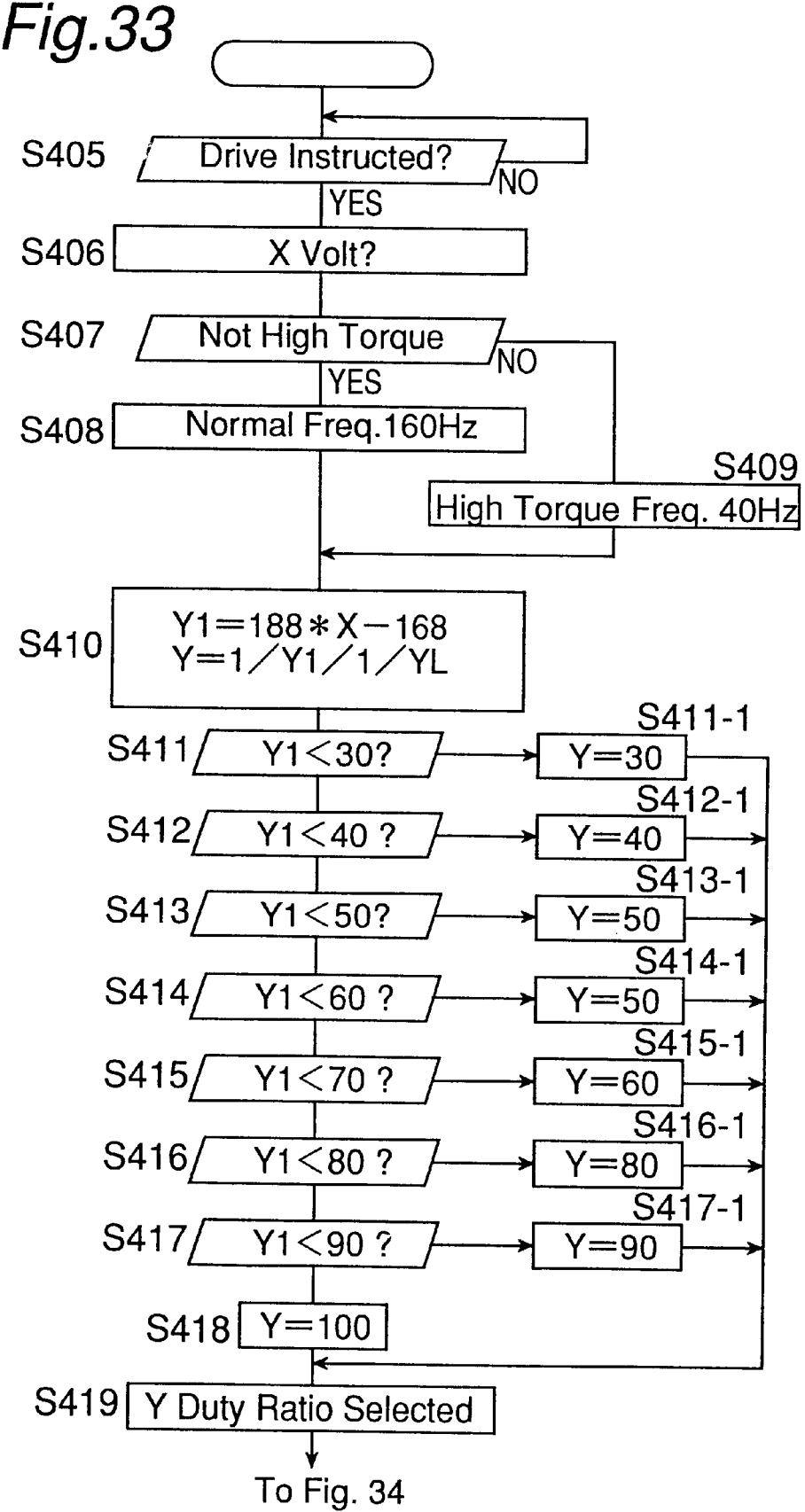
FIG. 33 is a schematic flowchart showing the speed control employed in the gas flow control apparatus.

FIGS. 33 and 34 illustrates a linkage between the motor speed control means 76 and the electricity saving determining means 75, wherein FIG. 33 illustrates a schematic flow of the electricity saving determining means 75.

At step S405 a decision is made to determine if there is a motor drive instruction. Should the motor drive instruction be issued, the voltage X is determined at step S406 by detecting the voltage with the voltage detecting means 57 and then determining it with the voltage determining means 81, followed by a decision at step S407 to determine if the contents of the drive instruction is a high torque. If it is not the high torque, designation of the normal frequency of 160 Hz is carried out at step S408, but if it is not so, designation of the high torque frequency is made at step S409. In either case, based on the voltage so determined, $Y1=188X-168$ (wherein Y1 represents the frequency and X represents the voltage at that time) is calculated and the duty ratio is then determined, followed by calculation of $Y=1/Y1/1/YL$ (wherein Y represents the duty ratio and YL represents the fundamental frequency (120 PPS)) at step S410. The duty ratio so determined is processed in the following sequence;

if Y1<30 at step S411, the flow goes to step S411-1 to render Y to be 30,
if Y1<40 at step S412, the flow goes to step S412-1 to render Y to be 40,
if Y1<50 at step S413, the flow goes to step S413-1 to render Y to be 50,
if Y1<60 at step S414, the flow goes to step S414-1 to render Y to be 60,
if Y1<70 at step S415, the flow goes to step S415-1 to render Y to be 70,
if Y1<80 at step S416, the flow goes to step S416-1 to render Y to be 80,
if Y1<90 at step S417, the flow goes to step S417-1 to render Y to be 90,
if Y1<90 at step S417, the flow goes to step S418-1 to render Y to be 100, and the duty ratio is selected at step S419, followed by delivery of the flow to the motor speed determining means in the subsequent stage.

FIG. 34 illustrates a schematic flow f the motor speed control means 46.

Since the contents are substantially identical with those shown in FIG. 32, the detail thereof will not be reiterated for the sake of brevity.

By the foregoing flows, it is possible to accomplish the drive control for the gas cooking range in which lowering of the battery voltage and, specifically, reduction of the battery voltage within the range of, for example, 1.5 to 3.0V will bring no adverse influence and the use is possible at the specified constant torque without change in designated speed being varied and the electricity saving is achieved.

As regards the speed control and the electricity saving, any other combination than that described above is possible and, where the household AC power source in which the voltage change little is desired to be used, it is possible to set an optimum condition and also to provide an optimum configuration.

The present invention having been fully described in connection with the preferred embodiments thereof is not limited to those shown and described, but may be of any time provided that the objectives of the present invention can be attained. Industrial Applicability As fully described above, the present invention brings about the following advantages.

With the gas flow control apparatus according to one embodiment of the present invention, the gas flow can be controlled according to the number of pulses used to drive the stepping motor, making it possible to achieve a fine gas flow adjustment. With the gas flow control apparatus according to another embodiment of the present invention, a possible abrupt extinction of the gas which would result from an abrupt adjustment to the low flame position can be avoided, making the user feed that the gas cooking range is reliable.

Moreover, since the drive control unit does not only determine a correlation with the flow control position of the flow control unit, but also performs a variable speed control in which no electric power is supplied every predetermined cycle while the frequency of the power supply pulses is fixed, the speed can be varied according to the combustion gas power and/or depending on the purpose of operation, thereby enhancing the ease to use and allowing the user to use the gas cooking range without anxiety.

The level of the power source voltage in the gas flow control apparatus can be converted into the level of the duty ratio to level the electric supply power to thereby prolong the lifetime of the battery.

What is claimed is:

1. A gas flow control apparatus which comprises:
   a gas flow control unit having a gas flow adjusting capability and a gas closing capability of selectively opening and closing a gas flow;
   a stepping motor for driving the gas flow control unit; and
   a drive control unit for controlling the stepping motor;
   wherein said gas flow control unit is configured to adjust the gas flow in multiple stages by selectively opening and closing a variable number of a plurality of gas flow adjusting holes and also configured to vary the gas flow in multiple stages by selectively opening and closing said one of the plurality of gas flow adjusting holes according to a number of pulses of the stepping motor.

2. The gas flow control apparatus as claimed in claim 1, wherein the gas flow control apparatus is configured to have a variable flow control capability in which the flow of gas is varied stepwise according to the number of pulses applied to the stepping motor, a constant flow control capability in which the flow of gas is not varied and a gas interrupting control capability.

3. The gas flow control apparatus as claimed in claim 1, wherein the gas flow control unit comprises:
   a slide shutter having an adjusting portion for adjusting the gas flow;
   a cock body accommodating the slide shutter;
   a flow control plate having a gas flow adjusting portion which includes the plural gas flow adjusting holes;
   a drive connection that connects the slide shutter to the stepping motor; and
   a spring for applying a load on the slide shutter and the flow control plate in a direction perpendicular to a direction of sliding of the slide shutter to thereby urge the slide shutter and the flow control plate to contact the cock body,
   whereby a relative position between the adjusting portion of the slide shutter and the gas flow adjusting portion of the flow control plate is varied in accordance with the pulses of the stepping motor to thereby accomplish a gas flow adjustment and interruption.

4. A gas appliance utilizing a gas flow control apparatus as defined in claim 1, which comprises:
   a control panel for issuing an instruction to the drive control unit of the flow control apparatus;
   said control panel including a gas control key and a gas power adjusting key,
   wherein the drive unit of the flow control unit has a plurality of stepwise variable flow characteristics each having a linearly variable flow portion, in which the gas flow does not vary, and
   wherein the drive control unit is configured such that depending on a signal input from the gas power adjusting key a decision is made to determine whether a stepwise gas power change or a linear gas power change is desired, whereby a selection instruction of one of the linear gas power change and the stepwise gas power change is issued.

5. The gas appliance as claimed in claim 4, wherein the drive control unit further includes a motor speed controller for changing a drive-speed,
   wherein depending on the signal input from the gas power adjusting key a decision is made to determine whether the stepwise gas power change or the linear gas power change is desired and the selection instruction of one of the linear gas power change and the stepwise gas power change is issued, and
   wherein when the linear gas power change is selected, a gas power adjusting speed is slower than when the stepwise gas power change is selected.

6. The gas appliance as claimed in claim 4, wherein when a period during which the gas power adjusting key is depressed is shorter than a predetermined value, a gas power is switched stepwise, but when the period during which the gas power adjusting key is depressed is longer than the predetermined value, the gas power is changed linearly.

7. The gas appliance as claimed in claim 6, wherein the drive control unit further includes a key input trouble determiner and wherein a length of time during which a trouble of the gas power adjusting key is determined is set to be longer than a length of time during which a gas power switching selection is carried out.

8. The gas appliance as claimed in claim 4, wherein the drive control unit further includes a position detector for detecting a position of a flow control unit, and
   wherein when a gas power is changed linearly, a maximum gas power and a minimum gas power causes a display device to be switched on according to the position of the position detector, and a display position is changed when there is a medium gas power according to a number of pulses.

9. The gas appliance as claimed in claim 4, wherein the drive control unit further includes a position detector for detecting a position of a flow control unit, and
   wherein when a gas power is changed linearly, a maximum gas power and a minimum gas power causes a display device to be switched on according to the position of the position detector, and when the gas power is changed stepwise, a specified display is switched on and displays at higher and lower positions are switched on or blink on and off, when there is a medium gas power according to a number of pulses.

10. A gas appliance employing a flow control apparatus as defined in claim 1, which comprises a plurality of gas burners, wherein the stepping motor comprises a plurality of stepping motors, and wherein when some of the plurality of gas burners are activated, the drive control unit drives in succession the plurality of stepping motors associated with some of the plurality of gas burners, whereby some of the plurality of gas burners are not activated simultaneously.

11. The gas appliance as claimed in claim 10, wherein the drive control unit drives the stepping motors in a manner wherein highest priority is given to a gas extinguishing function, second highest priority is given to a gas igniting function, third priority is given to a manual gas power adjusting function and fourth priority is given to an automatic gas power adjusting function.

12. A gas flow control apparatus comprising;

a gas flow control unit having a gas flow adjusting function and a gas closing function for selective opening and closing of the gas flow;

a stepping motor for driving the gas flow control unit;

a drive control unit for controlling a drive of the stepping motor; and a position detector that detects a gas flow control position, wherein the drive control unit includes a position determiner that determines the gas flow control position based on at least a signal from the position detector, and wherein the position detector is configured such that when no closing stop signal is obtained, at least during a closing state, combustion of the gas is disabled.

13. The gas flow control apparatus as claimed in claim 12, wherein the drive control unit is configured to provide a predetermined number of pulses to the stepping motor to drive the stepping motor to a position detectable by the position detector whereby a predetermined gas power position is defined.

14. A gas flow control apparatus comprising:

a gas flow control unit having a gas flow adjusting function and a gas closing function for performing selective opening and closing of the gas flow;

a stepping motor for driving the gas flow control unit;

a drive control unit for controlling a drive of the stepping motor; and a position detector that detects a gas flow control position, wherein the drive control unit has a plurality of specified stop positions determined according to the number of available gas power switching positions, and wherein at least one of the specified stop positions that is not detected by the position detector is ascertained based at least on a number of pulses for driving the stepping motor.

15. A gas flow control apparatus which comprises:

a gas flow control unit having a gas flow adjusting capability and a gas closing capability of selectively opening and closing a gas flow;

a stepping motor for driving the gas flow control unit;

a drive control unit for controlling the stepping motor; and said drive control unit including a burner drive determining unit for adjusting a speed of a drive unit from a flow control position of the flow control unit.

16. The gas flow control apparatus as claimed in claim 15, wherein the burner drive determining unit is configured to reduce the drive speed when the drive control unit is moved to at least a position adjacent a minimum flow position of the flow control unit.

17. The gas flow control apparatus as claimed in claim 15, wherein the burner drive determining unit is configured to reduce the speed during an extinguishing operation at a position other than the position adjacent the minimum flow position of the flow control unit.

18. A gas flow control 1 apparatus which comprises:

a gas flow control unit having a gas flow adjusting capability and a gas closing capability of selectively opening and closing a gas flow;

a stepping motor for driving the gas flow control unit;

a drive control unit for controlling the stepping motor; and said drive control unit being configured for variable speed control by determining a correlation with a flow control position of the gas flow control unit, wherein the drive control unit outputs pulses to the stepper motor through an electricity saver to vary a drive speed of the stepping motor.

19. The gas flow control apparatus as claimed in claim 18, wherein the drive control unit is configured to selectively supply no electric power for speed control.

20. A gas flow control apparatus which comprises:

a gas flow control unit having a gas flow adjusting capability and a gas closing capability of selectively opening and closing a gas flow;

a stepping motor for driving the gas flow control unit;

a drive control unit for controlling the stepping motor; and said drive control unit including a voltage determiner, an electricity saver for performing a duty control according to a level of voltage by fixing a frequency of pulses to be applied to the drive control unit according to a level of a power source voltage, a position determiner for determining a correlation with a flow control position of the gas flow control unit, and a motor speed controller for supplying no electric power for a predetermined cycle by fixing the frequency of the power supply pulses, whereby an electric power supplied to the drive control unit can be leveled by converting the level of the power source voltage into a level of a duty ratio.

21. A gas flow control apparatus which comprises:

a gas flow control unit having a gas flow adjusting capability and a gas closing capability of selectively opening and closing a gas flow;

a stepping motor for driving the gas flow control unit;

a drive control unit for controlling the stepping motor;

said drive control unit including a voltage determiner for a drive control battery power source and an electricity saver for leveling an electric supply power; and said electricity saver being configured to level the electric supply power of pulses based upon a variation in power source voltage.

22. The gas flow control apparatus as claimed in claim 21, wherein the electricity saver is configured to perform a duty control according to a level of voltage by fixing a frequency of the pulses to be applied to the drive control unit based on the power source voltage and is configured to level the electric supply power by converting the level of the power source voltage into a level of a duty ratio.

23. A gas flow control apparatus which comprises:

a gas flow control unit having a gas flow adjusting capability and a gas closing capability of selectively opening and closing a gas flow;

a stepping motor for driving the gas flow control unit;

a drive control unit for controlling the stepping motor; and said gas flow control unit being configured to adjust the gas flow in multiple stages by selectively opening and closing a variable number of a plurality of gas flow adjusting holes and varying the gas flow in multiple stages by selectively opening and closing said one of the plurality of gas flow adjusting holes according to a number of pulses of the stepping motor.

24. The gas flow control apparatus as claimed in claim 23, wherein the drive control unit controls an electric power supply by at least one of increasing the electric supply power, increasing the duty ratio and lowering a frequency to increase torque of the stepping motor when the frequency of drive is measured for the first time.

25. A gas flow control apparatus which comprises:
- a gas flow control unit having a gas flow adjusting capability and a gas closing capability of selectively opening and closing a gas flow;
- a stepping motor for driving the gas flow control unit;
- a position detector for detecting a flow control position of the gas flow control unit and a gas interrupted condition;
- a drive control unit for driving the stepping motor and for determining a position with reference to a signal from the position detector;
- wherein the drive control unit has a plurality of specified stop positions determined according to the number of available gas power switching positions, and
- wherein at least one of the specified stop positions is a stop position at which position detection is carried out and one of the specified stop positions is a stop position at which no position detection occurs, whereby the stop position at which no position detection occurs is ascertained based on both the number of pulses for driving the stepping motor and a position determining signal from the position detector;
- a position determiner for correcting a movement of the stepping motor; and
- the drive control unit being configured to store at least one of the specified stop positions,
- wherein the gas flow control unit is controlled by the number of pulses applied to the stepping motor.

26. The gas flow control apparatus as claimed in claim 25, wherein the position determiner is configured to increase an accuracy of a gas flow adjustment by counting the number of pulses necessary for the position detector to return to a predetermined position by accomplishing a reverse rotation after a predetermined number of pulses has been supplied to the stepping motor, and is configured to determine an error peculiar to the apparatus by determining a difference between the numbers of pulses during forward and reverse rotation motions, whereby the peculiar error of the apparatus is added or subtracted to or from the number of pulses at a desired position in the event that a direction of rotation differs from the forward rotation direction.

27. The gas flow control apparatus as claimed in claim 26, wherein the drive control unit detects the error peculiar to the apparatus at the time of ignition.

28. The gas flow control apparatus as claimed in claim 25, wherein the position determiner is configured to increase an accuracy of a gas flow adjustment by counting the number of pulses necessary for the position detector to return from the predetermined position and whereby a reverse rotation is accomplished after a predetermined number of pulses have been supplied to the stepping motor, an error peculiar to the apparatus being determined by determining a difference between the numbers of pulses during forward and reverse rotations, the error peculiar to the apparatus being stored in the drive control unit, and the peculiar error of the apparatus being added or subtracted to or from the number of pulses at a desired position in the event that a direction of rotation differs from the forward rotation direction.

29. A gas flow control apparatus which comprises:
- a gas flow control unit having a gas flow adjusting capability and a gas closing capability of selectively opening and closing a gas flow;
- a stepping motor for driving the gas flow control unit;
- a position detector for detecting a flow control position of the gas flow control unit and a gas interrupted condition;
- a drive control unit for driving the stepping motor and for determining a position based on a signal from the position detector; and
- said drive control unit being configured to supply an electric power by increasing an electric supply power to increase a torque of the stepping motor in the event that the position detector fails to reach a predetermined position even though a predetermined number of pulses is supplied to the stepping motor during gas flow adjustment subsequent to opening of the gas flow control unit.

30. The gas flow control apparatus as claimed in claim 29, wherein the drive control unit is configured to increase torque of the stepping motor in the event that the position detector fails to reach the predetermined position by movement in a predetermined direction even though the predetermined number of pulses is supplied to the stepping motor, whereby the position determiner is caused to reach the predetermined position by effecting a movement that is reverse to the predetermined direction and then by reversing the movement in the predetermined direction in the event that the position detector fails to reach the predetermined position.

31. The gas control apparatus as claimed in claim 29, wherein the drive control unit is configured to control the supply of electric power under a duty control by fixing a frequency of applied pulses and is configured to increase the supply of electric power by increasing a duty ratio whereby a torque of the stepping motor is increased.

32. The gas control apparatus as claimed in claim 29, wherein the drive control unit is configured to control the supply of electric power so a frequency of the applied pulses can be varied and whereby the supply of electric power can be increased by lowering the frequency in order to increase the torque of the stepping motor.

\* \* \* \* \*

UNITED STATES PATENT AND TRADEMARK OFFICE
CERTIFICATE OF CORRECTION

PATENT NO. : 6,619,613 B1
DATED : September 16, 2003
INVENTOR(S) : Y. Akamatsu et al.

It is certified that error appears in the above-identified patent and that said Letters Patent is hereby corrected as shown below:

Column 43,
Line 60, "a" should be -- at least a first --.
Lines 61-62, "for adjusting a speed of a drive unit from a flow control position of the flow control unit" should be replace with -- and a second burner drive determining unit, wherein the first and second burner drive determining units are configured to be activated by first and second instructions. --
Line 64, after "wherein" insert -- at least one --.
Line 64, "unit" should be -- units --.
Line 65, "the" (first occurrence) should be -- a --.

Column 44,
Line 6, after "control delete "1".
Line 2, after "wherein" insert -- at least one --.
Line 2, "unit" should be -- units --.

Signed and Sealed this

Twenty-seventh Day of April, 2004

JON W. DUDAS
*Acting Director of the United States Patent and Trademark Office*